United States Patent
Worku et al.

(10) Patent No.: US 11,451,065 B1
(45) Date of Patent: Sep. 20, 2022

(54) VOLTAGE CONTROL AND GRID SYNCHRONIZATION OF MICROGRIDS IN REAL TIME

(71) Applicant: KING FAHD UNIVERSITY OF PETROLEUM AND MINERALS, Dhahran (SA)

(72) Inventors: Muhammed Yibre Worku, Dhahran (SA); Mohamed A. Hassan, Dhahran (SA); Mohamed A. Abido, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

(21) Appl. No.: 17/742,066

(22) Filed: May 11, 2022

Related U.S. Application Data

(60) Provisional application No. 63/292,088, filed on Dec. 21, 2021.

(51) Int. Cl.
*H02J 3/46* (2006.01)
*H02J 3/08* (2006.01)
(Continued)

(52) U.S. Cl.
CPC .............. *H02J 3/46* (2013.01); *G05B 19/042* (2013.01); *H02J 3/08* (2013.01); *H02J 3/381* (2013.01);
(Continued)

(58) Field of Classification Search
CPC .. H02J 2/46; H02J 2/08; H02J 2300/28; H02J 2300/26; H02J 2300/10
(Continued)

(56) References Cited

U.S. PATENT DOCUMENTS

| | | | | |
|---|---|---|---|---|
| 2001/0056330 A1* | 12/2001 | Wills | ...................... | H02J 3/381 702/60 |
| 2012/0181879 A1* | 7/2012 | Andresen | .................. | H02J 3/02 307/151 |

(Continued)

OTHER PUBLICATIONS

Singh, et al. ; Seamless Transfer of Renewable-Based Microgrid Between Utility Grid and Diesel Generator ; IEEE Transactions on Power Electronics, vol. 33, Issue 10 ; Nov. 28, 2017 : Abstract Only ; 1 Page.

(Continued)

*Primary Examiner* — Md Azad
(74) *Attorney, Agent, or Firm* — Oblon, McClelland, Maier & Neustadt, L.L.P.

(57) ABSTRACT

A system and method for synchronizing a utility grid and a microgrid including a diesel generator, a photovoltaic array and a wind turbine. In a grid connected mode, a microgrid voltage, a microgrid frequency and a microgrid phase angle are controlled by a grid side converter which generates a preset reference power at the utility grid frequency; and provides a real power and a reactive power to each of a plurality of loads. In an island mode, the diesel generator operates at a constant speed to generate power at the reference frequency and communicates the reference frequency to a wind turbine, and the microgrid supplies the real power and reactive power to each of the plurality of loads. In a resynchronization mode, a switched capacitor bank is charged to provide the voltage needed to reconnect the microgrid to the utility grid.

20 Claims, 32 Drawing Sheets

(51) Int. Cl.
  *H02J 3/38* (2006.01)
  *G05B 19/042* (2006.01)
(52) U.S. Cl.
  CPC ... *G05B 2219/2639* (2013.01); *H02J 2300/10* (2020.01); *H02J 2300/26* (2020.01); *H02J 2300/28* (2020.01)
(58) Field of Classification Search
  USPC .................................................... 700/295
  See application file for complete search history.

(56) References Cited

U.S. PATENT DOCUMENTS

| | | | | |
|---|---|---|---|---|
| 2013/0038123 | A1* | 2/2013 | Wilkins | H02J 13/00034 307/18 |
| 2015/0295581 | A1* | 10/2015 | Shi | H02J 3/40 700/287 |
| 2016/0156190 | A1* | 6/2016 | Wells | H02J 3/16 307/18 |
| 2016/0266559 | A1 | 9/2016 | Shi et al. | |
| 2017/0005473 | A1 | 1/2017 | Somani et al. | |
| 2017/0229870 | A1* | 8/2017 | Singh | H02J 3/381 |
| 2019/0173285 | A1* | 6/2019 | Schneider | H02J 3/381 |
| 2019/0334351 | A1 | 10/2019 | Majumder | |
| 2021/0384736 | A1* | 12/2021 | Bhavaraju | H02J 3/08 |

OTHER PUBLICATIONS

Worku, et al.; Real Time Energy Management and Control of Renewable Energy based Microgrid in Grid Connected and Island Modes; Energies 12; Jan. 16, 2019; 18 Pages.

Hassan, et al.; Optimal Design and Real Time Implementation of Autonomous Microgrid Including Active Load; Energies 11; May 1, 2018; 16 Pages.

Worku, et al.; Power Smoothing Control of PMSG Based Wind Generation Using Supercapacitor Energy Storage System; International Journal of Emerging Electric Power Systems; Aug. 1, 2017.

* cited by examiner

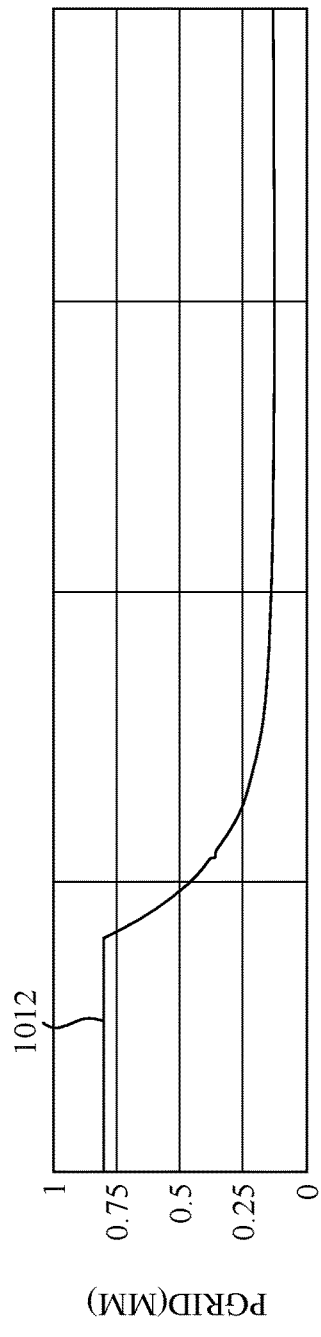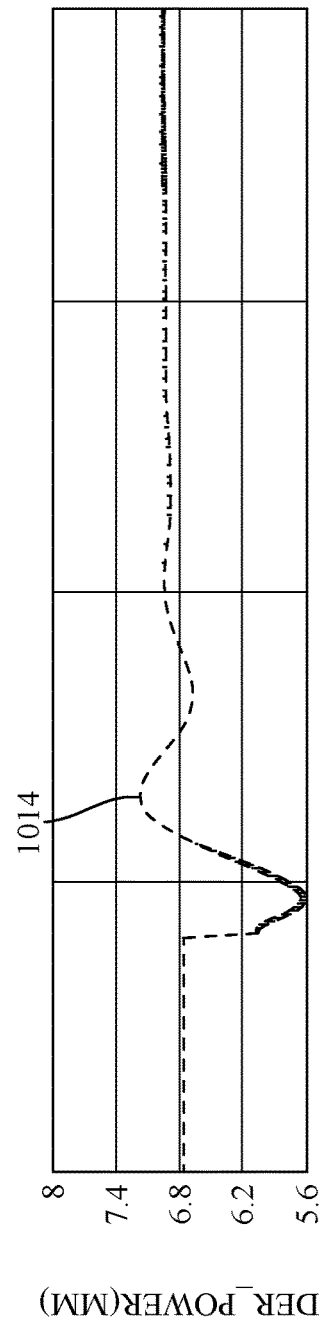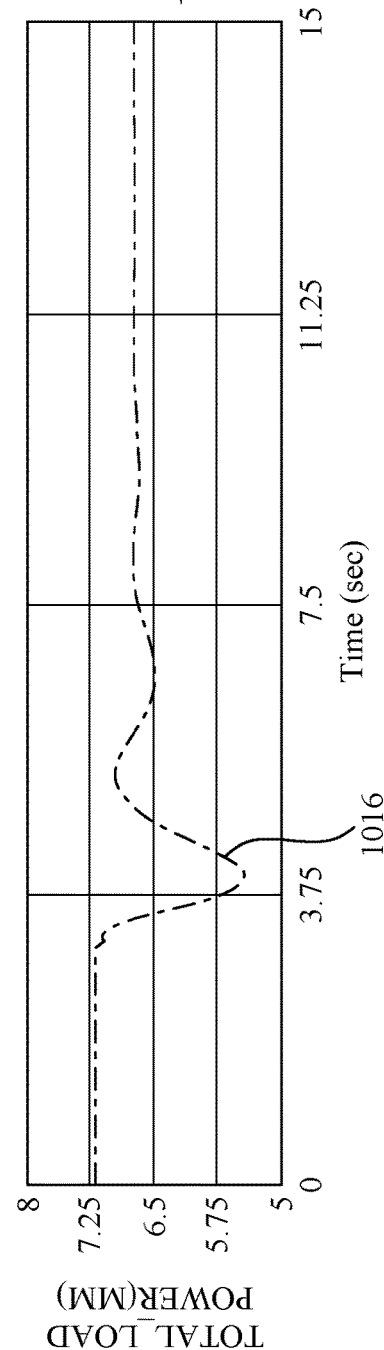

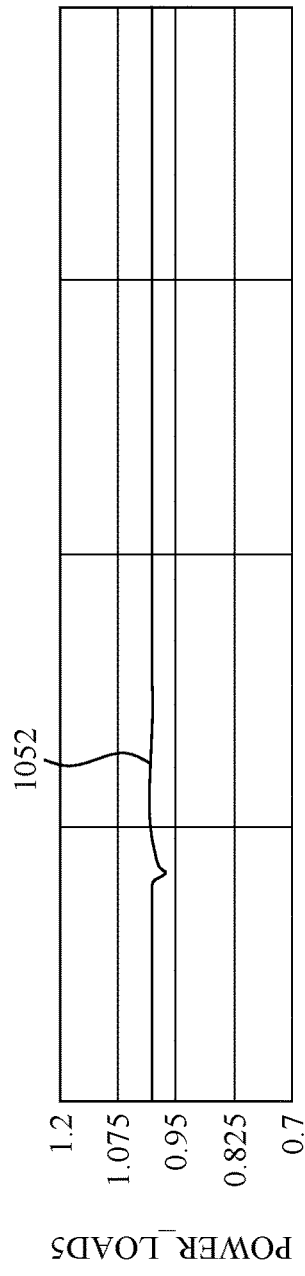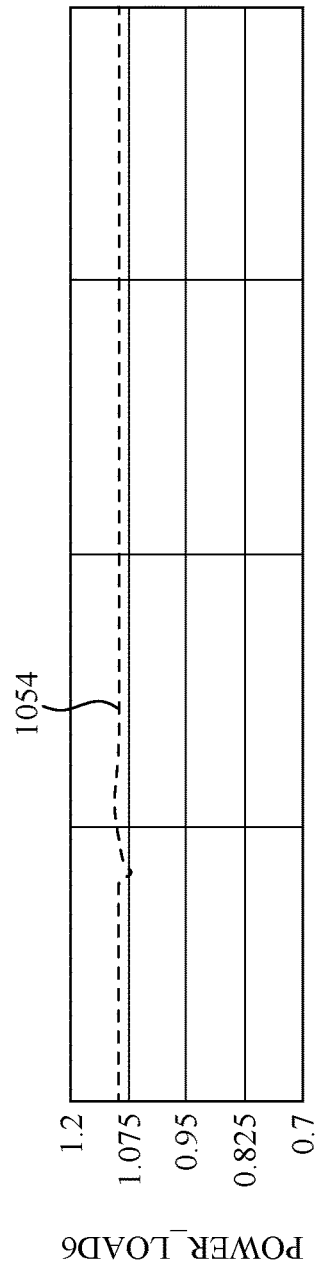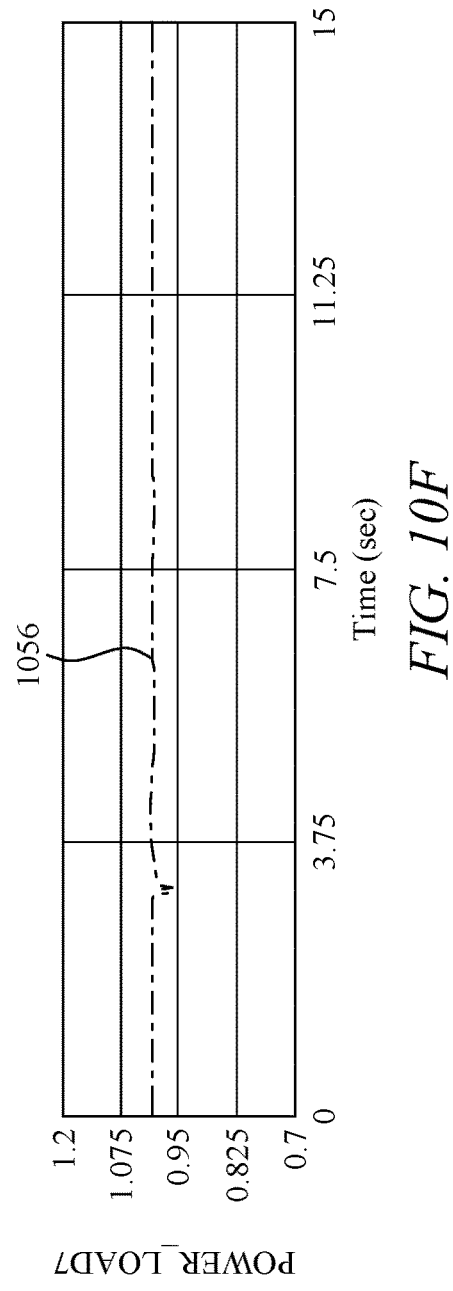

VOLTAGE CONTROL AND GRID SYNCHRONIZATION OF MICROGRIDS IN REAL TIME

CROSS REFERENCE TO RELATED APPLICATIONS

The present application claims the benefit of U.S. Prov. Ser. No. 63/292,088, entitled "Voltage Control and Grid Synchronization of Microgrids in Real Time", filed on Dec. 21, 2021, and incorporated herein by reference in its entirety.

STATEMENT OF ACKNOWLEDGEMENT

The inventors acknowledge the support provided by the Deanship of Scientific Research, King Fahd University of Petroleum and Minerals, through Electrical Power and Energy Systems Research Group Funded Project #RG171002 and King Abdullah City for Atomic and Renewable Energy (K.A. CARE).

BACKGROUND

Technical Field

The present disclosure is directed to voltage control and grid synchronization of microgrids in real time.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

A utility grid is an interconnected network that delivers electricity from power-producing stations to consumers. A microgrid having multiple distributed generators is implemented along-side the utility grid to reduce the load on the utility grid. The microgrid may be coupled to the utility grid through switches such as circuit breakers, thyristors, Insulated Gate Bipolar Transistors (IGBTs) and/or contactors. The microgrid employs two modes: a grid-connected mode and an island mode. In the grid-connected mode, the microgrid follows a reference voltage and frequency provided by the utility grid. In the island mode, the microgrid is disconnected from the utility grid, and the power generation and load are independently harmonized. When the islanding mode (islanding) occurs, the microgrid may feel disturbance due to poor power imbalance and loses synchronism with the utility grid. When the islanding ceases, the utility grid is restored and the microgrid is connected back to the utility grid. Before reconnecting to the utility grid, parameters such as voltage, frequency, and phase angle of the microgrid must be matched with the utility grid's parameters, and these parameters are expected to lie within a predefined limit to avoid any transient instability caused by the differences in the real and reactive power at a point of common coupling (PCC). To achieve a smooth and successful reconnection, the microgrid should be synchronized to the utility grid when operating in the island mode.

A microgrid control system is required for regulating the power, voltage, and frequency of the microgrid within the specified range for enhancing power quality and reliability. A voltage difference across the microgrid and the utility grid may lead to a large inrush current and fluctuation, thereby shortening the life of the equipment attached to the utility grid and even damaging the distributed generators of the microgrid. The microgrid control system performs a transition from the grid-connected mode to the island mode with minimum voltage and frequency fluctuations.

Many existing methods uses various components such as Static VAR compensators (SVCs), Static Synchronous Compensators (STATCOMs), energy storage devices, switched shunt capacitors, and automatic load tap changing transformers to mitigate voltage unbalance or voltage regulation of the DERs. However, these methods fail to analyze an impact of voltage imbalance on the microgrid and also, due to the cost of dedicated components, these methods are economically infeasible for practical implementation. Also, for resynchronization of the microgrid to the utility grid, existing control systems employ two coordinated circuit breakers, which is expensive.

Conventional microgrid control systems fail to ensure the smooth transition between the microgrid and the utility grid, thereby hindering stability of the network. Hence, there is a need for control solutions that can handle grid and microgrids synchronization in a efficient and effective manner.

SUMMARY

In an exemplary embodiment, a method for synchronizing a utility grid and a microgrid is disclosed. When operating the utility grid and the microgrid in a grid connected mode, the method includes controlling, by a grid side converter located at a point of common coupling (PCC) between the utility grid and the microgrid, a microgrid voltage, a microgrid frequency and a microgrid phase angle to match a utility grid voltage, a utility grid frequency and a utility grid phase angle. The method further includes generating, by a diesel generator of the microgrid, a preset reference power at the utility grid frequency by controlling a speed of a diesel generator in a speed droop mode. The method further includes providing, by the utility grid and the microgrid, at least one of a first real power and a first reactive power to each of a plurality of loads. The method, when operating the microgrid in an island mode, further includes generating, by the diesel generator, a second real power and a second reactive power at an output frequency which matches the utility grid frequency of the grid connected mode, by operating the diesel generator at a constant speed. The method further includes providing, by a diesel generator controller, the diesel generator output frequency as a reference frequency to a wind turbine. The method further includes generating, with the wind turbine, a third real power. The method further includes generating, by a photovoltaic array, a fourth real power. The method further includes providing, by the microgrid, the second reactive power, the second real power, the third real power and the fourth real power to the plurality of loads. When operating the utility grid and the microgrid in a resynchronization mode, the method includes charging a switched capacitor bank connected to the point of common coupling with the second real power, the third real power and the fourth real power. The method further includes controlling, by the diesel generator controller, a plurality of switches of the switched capacitor bank to adjust the second reactive power such that the microgrid voltage, the microgrid frequency and the microgrid phase angle match the utility grid voltage, the utility grid frequency and the utility grid phase angle. The method further includes actuating, by a synchro check relay connected to the point of common coupling, a switch to connect the microgrid to the utility grid.

In another exemplary embodiment, a system for synchronization of a utility grid and a microgrid is disclosed. The system includes a utility grid including a grid side controller, wherein the utility grid is configured to operate at a utility grid voltage, a utility grid frequency and a utility grid phase angle; a grid side converter configured to transmit the utility grid voltage, the utility grid frequency and the utility grid phase angle to the microgrid; a diesel generator located in the microgrid in parallel with the utility grid; a diesel generator controller connected to the diesel generator, wherein the diesel generator controller is configured to calculate a power reference from the utility grid voltage, and store the utility grid voltage, the utility grid frequency, and the power reference; a wind turbine located in the microgrid in parallel with the utility grid; a photovoltaic array located in the microgrid in parallel with the utility grid; a point of common coupling switchably connected between the utility grid and the microgrid; a synchro check relay connected to the point of common coupling; a switched capacitor bank connected between the synchro check relay and the microgrid; and a plurality of loads connected to the microgrid. When operating in a grid connected mode, the microgrid is configured to match a microgrid voltage, a microgrid frequency and a microgrid phase angle to the utility grid voltage, the utility grid frequency and the utility grid phase angle respectfully, generate at least one of a first real power and a first reactive power, and transmit the at least one of the first real power and the first reactive power to each of the plurality of loads; wherein the diesel generator is configured to operate in a speed droop mode. When operating in an island mode, the diesel generator controller is configured to provide the stored utility grid frequency and power reference to the diesel generator; the diesel generator is configured to operate at a constant angular speed to generate a second real and reactive power at a diesel generator frequency, which matches the stored power reference and stored utility grid frequency respectively; the diesel generator controller is configured to transmit the stored utility grid voltage and the diesel generator frequency as a wind turbine reference voltage and a wind turbine reference frequency respectively to the wind turbine and to transmit the stored utility grid voltage and diesel generator frequency to the photovoltaic array as a photovoltaic array reference voltage and photovoltaic array reference frequency respectively; wherein the diesel generator, the wind turbine and the photovoltaic array are configured to generate at least one of a first real power and a reactive power and transmit at least one of the first real power and the reactive power to each of the plurality of loads. When operating in a resynchronization mode, the switched capacitor bank is configured to be charged by the first real power produced by the microgrid; the diesel generator controller is configured to actuate a plurality of switches of the switched capacitor bank to adjust the reactive power such that the microgrid voltage, the microgrid frequency and the microgrid phase angle match the utility grid voltage, the utility grid frequency and the utility grid phase angle; and the synchro check relay is configured to actuate the switch to connect the microgrid to the utility grid.

In an exemplary embodiment, a method for synchronizing a utility grid and a microgrid is disclosed. When operating the utility grid and the microgrid in a grid connected mode, the method includes controlling the microgrid at a utility grid voltage, a utility grid frequency and a utility grid phase angle. The method further includes generating, by a diesel generator of the microgrid, a preset reference power at the utility grid frequency by controlling a speed of a diesel generator in a speed droop mode. The method further includes providing, by the utility grid and the microgrid, at least one of a first real power and a reactive power to each of a plurality of loads. When operating the microgrid in an island mode, the method further includes operating the diesel generator at a constant speed based on the utility grid frequency to output a second real power and the reactive power at a reference frequency. The method further includes operating the wind turbine in a decoupled d-q mode at the reference frequency with unity power factor to generate a third real power. The method further includes generating, by a photovoltaic array, a fourth real power. The method further includes providing the reactive power, the second real power, the third real power and the fourth real power to the plurality of loads. When operating the utility grid and the microgrid in a resynchronization mode, the method includes charging a switched capacitor bank connected to the point of common coupling with the second real power, the third real power and the fourth real power. The method further includes actuating, by a synchro check relay connected to the point of common coupling, a switch to connect the microgrid to the utility grid.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIG. 10B is an exemplary graph showing grid, DERs, and load active powers in the island mode, according to certain embodiments.

FIG. 10F is an exemplary graph showing critical load active powers (loads at bus 5-7), according to certain embodiments.

DETAILED DESCRIPTION

Figure 1:
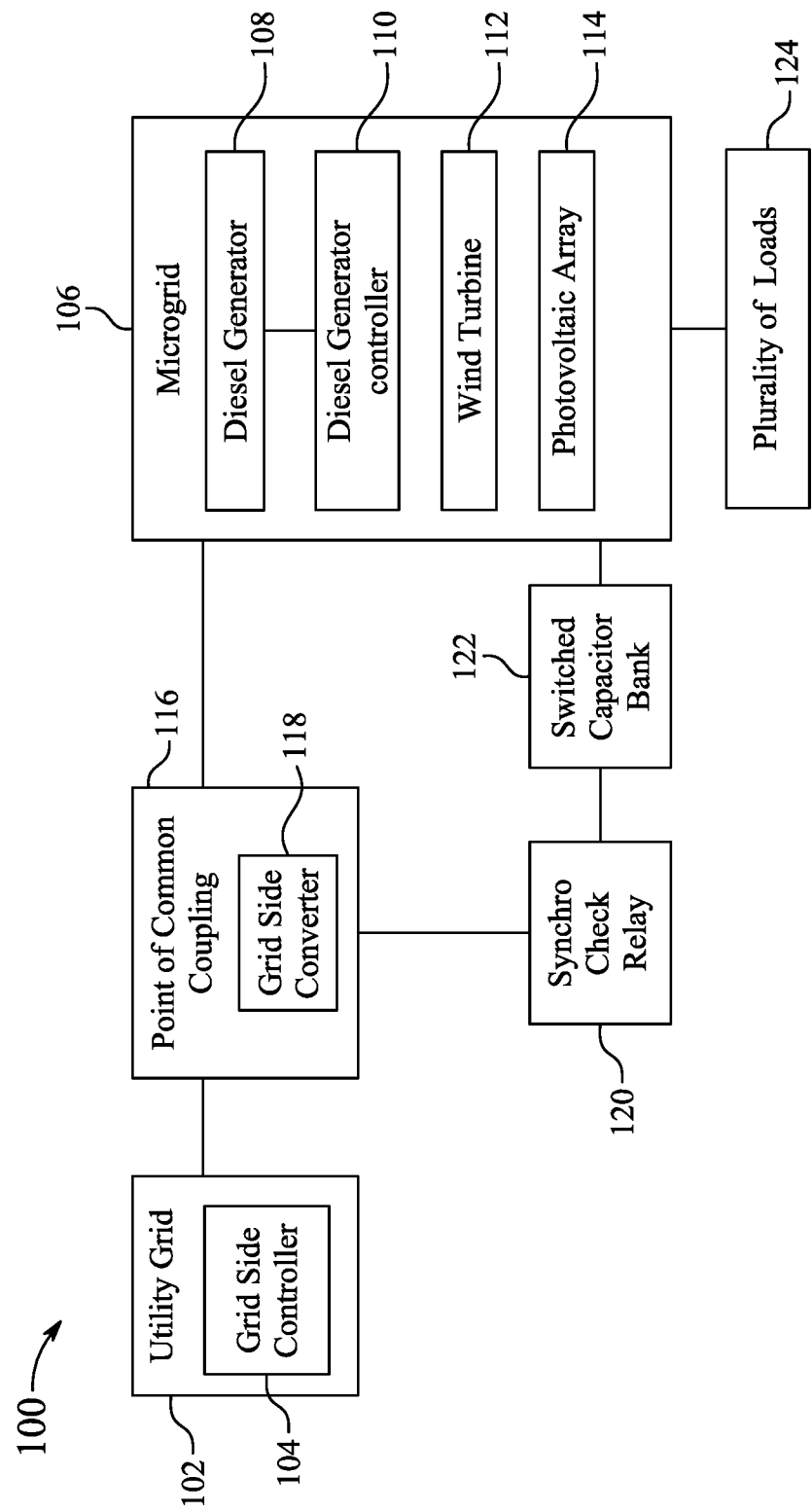
FIG. 1 is an exemplary schematic diagram of a system for synchronization of a utility grid and a microgrid, according to certain embodiments.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Aspects of the present disclosure are directed to a system and method for synchronization of a utility grid and a microgrid. The present disclosure describes an efficient power management, voltage balancing and grid synchronization control strategy to increase the stability and reliability of a distributed energy resources (DERs)-based microgrid. The microgrid is composed of a photovoltaic array, a Double Fed Induction Generator (DFIG)-based wind turbine and a diesel generator with critical load and non-critical load. Coordination and power management of the DERs is implemented in modes termed a grid connected mode, an island mode and a resynchronization mode In the grid connected mode, a microgrid voltage and frequencies are matched to the utility grid, and the diesel generator is operated in a droop mode. In the island mode, the diesel generator is operated at a constant speed to match the utility grid frequency, and the utility grid frequency is provided as a reference frequency to the DERs. In the resynchronization mode, a switched capacitor bank is charged to mitigate the impact of unbalanced voltages.

A major challenge of the microgrid operating in the island mode is stable control of frequency. The present disclosure describes a controller that is implemented in the island mode for the diesel generator. To restore the microgrid back to the utility grid, voltage, frequency, and phase angle of the islanded microgrid are matched with that of the utility grid within specified limits to avoid transient instability. In an experimental test, an International Council on Large Electric Systems (CIGRE) medium voltage test bench system was used to implement the DERs and their controllers, respectively. The methods and system of the present disclosure have potential applications for complete operation of the microgrid by properly controlling the power, voltage, and frequency in both modes. The system and the method have been developed using a real-time digital simulator. The real-time digital simulator results verify the effectiveness and superiority of the disclosed control scheme the grid connected, island, and grid resynchronization modes.

In various aspects of the disclosure, definitions of one or more terms that will be used in the document are provided below.

The term "isochronous mode" is defined as the condition when a diesel generator either stands alone or is the largest unit on a grid. In the isochronous mode, the generator maintains a constant frequency.

The term "droop mode" is defined as the condition when the diesel generator is allowed to vary frequency in response to a change in load.

The term "island mode" is defined as the condition of the microgrid when operating in isolation from a national or local electricity distribution network. In this mode, the diesel generators are connected to the microgrid in parallel, such that the generators can generate power independently in the event of any grid power outage.

The term "islanding" is defined as a critical condition in which a distributed generator continues to supply power to the loads while the electric utility is down. Solar power generators, wind generators, gas turbines, fuel cells, microturbines, etc., are all examples of distributed generators.

The term "per-unit (pu)" is defined as an expression of system quantities as fractions of a defined base unit quantity. Calculations are simplified because quantities expressed as per-unit do not change when they are referred from one side of a transformer to the other.

FIG. 1 illustrates an exemplary schematic diagram of a system 100 for synchronization of a utility grid and a microgrid (hereinafter interchangeably referred to as "the system 100"), according to one or more aspects of the present disclosure.

Referring to FIG. 1, the system 100 includes a utility grid 102, a microgrid 106, a diesel generator 108, a diesel generator controller 110, a wind turbine 112, a photovoltaic (PV) array 114, a point of common coupling 116, a grid side converter 118, a synchro check relay 120, a switched capacitor bank 122, and a plurality of loads 124.

The utility grid 102 (hereinafter interchangeably referred to as "the grid 102") is an interconnected network that delivers electricity from power-producing stations to consumers. The utility grid 102 includes various units such as a power generation unit, a power transportation unit for carrying the generated power from the power generation unit to the consumer side, and a substation unit (not shown) connected to the power transportation unit for receiving the generated power as well as converting into a required power suitable for household or industries loads. The utility grid 102 is configured to operate at a utility grid voltage, a utility grid frequency, and a utility grid phase angle.

The utility grid 102 includes a grid side controller 104. The grid side controller 104 is configured to measure and control the utility grid voltage, the utility grid frequency, and the utility grid phase angle associated with the utility grid 102. In an example, the grid side controller 104 is configured to selectively detect unintentional islanding in a distributed power system according to the measured frequency at the point of common coupling 116.

The point of common coupling (PCC) 116 is switchably connected between the utility grid 102 and the microgrid 106. In an example, the PCC 116 is a point at which the utility grid 102 is interfaced with the microgrid 106. In a working example, the grid side converter 118 is commutatively coupled with the grid side controller 104 and receives the measured utility grid voltage, the utility grid frequency, and the utility grid phase angle.

The grid side converter 118 is configured to transmit the utility grid voltage, the utility grid frequency, and the utility grid phase angle to the microgrid 106. In some examples, the grid side converter 118 is located at the PCC 116. The grid side converter 118 is also configured to control a microgrid voltage, a microgrid frequency and a microgrid phase angle to match with the received utility grid voltage, the utility grid frequency, and the utility grid phase angle. The grid side converter 118 is used for receiving a control command from the utility grid 102 and regulating the microgrid voltage, the microgrid frequency, and the microgrid phase angle accordingly.

The microgrid 106 includes a diesel generator 108. The diesel generator 108 is in parallel with the utility grid 102. The diesel generator 108 converts fossil fuel to an electrical energy. The diesel generator 108 is configured to generate a preset reference power at the utility grid frequency by controlling a speed of the diesel generator 108 in a speed droop mode. In an example, an AC-AC voltage source converter (not shown) is connected to the diesel generator 108.

The diesel generator controller 110 is coupled to the diesel generator 108. In some examples, the diesel generator controller 110 may be embedded into the diesel generator 108. The diesel generator controller 110 is configured to calculate a power reference from the utility grid voltage. Further, the diesel generator controller 110 is configured to store the utility grid voltage, the utility grid frequency, and the power reference in a memory (not shown). The diesel generator 108 is configured to measure instant values of the utility grid voltage, the utility grid frequency, and the utility grid phase angle periodically and is further configured to store the measured instant values in the memory. In case of failure of the utility grid 102, the diesel generator 108 is configured to continue operating at the latest measured instant values from the utility grid 102.

The diesel generator 108 is configured to share the preset reference power with a remote manager and the diesel generator controller 110. In some examples, the diesel generator 108 is configured to transmit the preset reference power in a connected (automatic) mode, and a non-connected mode (manual) with the remote manager and the diesel generator controller 110. For example, during emergency events such as utility system failure, fire, earthquake, terrorist attack, and the like, the utility grid 102 may be off or not safe to use. In such cases, the microgrid 106 is capable of supplying the power to the loads independently without establishing any communication with the utility grid 102, as the microgrid 106 already has the preset reference power shared by the diesel generator based on the utility grid voltage.

The memory (not shown) is configured to store a set of predefined actions for calculating the power reference and taking an appropriate action accordingly. The memory is configured to store a set of rules for processing the received values. In one embodiment, the memory may include any computer-readable storage medium known in the art including, for example, volatile memory, such as Static Random Access Memory (SRAM) and Dynamic Random Access Memory (DRAM), and/or a non-volatile memory, such as Read Only Memory (ROM), erasable programmable ROM, flash memories, hard disks, optical disks, and magnetic tapes.

The microgrid 106 includes a wind turbine 112, in parallel with the utility grid 102. The wind turbine 112 is configured to convert wind energy into electric energy. The wind turbine 112 includes a synchronous generator, an AD/DC rectifier, and a DC/DC voltage stabilizing module which are sequentially connected to convert the wind energy into electric energy. In an example, a first DC-AC voltage source converter is connected to the wind turbine 112.

The system 100 also includes a doubly fed induction generator (DFIG), a transformer, a rotor side converter, a grid side converter, a resistor, and an inductor (not shown in FIG. 1). The DFIG is connected to the wind turbine 112 and the transformer is connected to a stator of the wind turbine 112. The transformer is configured to step up power generated by the wind turbine 112 for providing to the utility grid 102. The wind turbine 112 also includes an auxiliary transformer for supplying power to auxiliary functions in the wind turbine 112.

The rotor side converter is electrically coupled to a rotor of the wind turbine 112. The rotor side converter is configured to convert AC power from the rotor of the wind turbine 112 to direct current (DC) power. The capacitor is connected in parallel with the rotor side converter to reduce harmonics in the generated electric energy.

The grid side converter 118 is connected in parallel with the capacitor. The grid side converter 118 is electrically coupled to the utility grid 102 via the transformer and is configured to convert the DC power to AC power at a frequency compatible with the utility grid 102. The resistor and the inductor are connected in series between the grid side converter and the transformer. The transformer is connected to the first DC-AC voltage source converter.

The microgrid 106 includes a photovoltaic array 114 in parallel with the utility grid 102. The photovoltaic array 114 is configured to receive solar light and generate electrical energy. A second DC-AC voltage source converter is connected to the photovoltaic array 114.

The AC-AC voltage source converter, the first DC-AC voltage source converter, and the second DC-AC voltage source converter are connected to the PCC 116.

A synchro check relay 120 is connected to the PCC 116. The synchro check relay 120 is electrically connected with a plurality of switches. The synchro check relay 120 is configured to actuate at least one switch such that the microgrid 106 connects to the utility grid 102. The synchro check relay 120 is configured to verify that the parameters such as voltage, phase angle, frequency, and phase angle across both grids (microgrid and the utility grid) of a breaker are matched with each other prior to closing the breaker.

The switched capacitor bank 122 is connected between the synchro check relay 120 and the microgrid 106. The switched capacitor bank 122 includes a plurality of switches, which are configured to be operated according to a required voltage needed to synchronize the microgrid to the PCC during resynchronization or to increase the voltage needed to supply one or more loads. The switched capacitor bank 122 is installed at the microgrid 106, thereby improving the power profile of the system including its transformers and feeders. The switched capacitor bank 122 may be automatically switched ON and OFF depending upon the condition of different parameters of the system 100.

A plurality of loads 124 is connected to the microgrid 106. Endpoints of the microgrid 106 are consumer locations where electricity is used to power various equipment such as the lights, television, dishwasher, or such equipments (acting as a plurality of loads 124 for the microgrid).

The system 100 is configured to execute synchronization of the utility grid 102 and the microgrid 106 in a plurality of modes, naming as a grid connected mode, an island mode, and a resynchronization mode.

In the grid connected mode, the microgrid 106 is configured to match the microgrid voltage, the microgrid frequency, and the microgrid phase angle to the utility grid voltage, the utility grid frequency, and the utility grid phase angle, respectively. After matching the utility voltage, the utility frequency, and the utility phase angle, the microgrid 106 generates at least one of a first real power and a first reactive power. Further, the microgrid 106 and the utility grid 102 transmit at least one of the first real power and the first reactive power to each of the plurality of loads 124.

In an example, the microgrid 106 is configured to observe any change in the plurality of loads 124. Based upon the observed change in the plurality of loads 124, the diesel generator controller 110 calculates the power reference and generates instructions to operate the diesel generator 108 in a speed droop mode and change the frequency accordingly.

In the speed droop mode, the diesel generator 108 reduces a reference speed as the load increases.

A proportional integral (SG-PI) speed governor controller (not shown) is commutatively connected to the diesel generator 108 and receives a utility grid frequency reference signal, a utility grid voltage reference signal, a droop reference signal, a power reference signal and a shaft frequency. The SG-PI speed governor controller stores the utility grid frequency reference signal, the utility grid voltage reference signal, the droop reference signal, the power reference signal, and the shaft frequency (act as a reference shaft frequency) in the memory. Further, the SG-PI speed governor controller subtracts a shaft frequency of the diesel generator from a reference shaft frequency and generates a power value. Also, the SG-PI speed governor controller generates a power signal by dividing the power value by the speed droop reference value.

The diesel generator controller 110 includes a subtractor, an amplifier circuit, a delay circuit, and a divider. In the grid connected mode, the diesel generator controller 110 receives a power signal from the SG-PI controller. The subtractor subtracts the power signal from the power reference signal, fetched from the memory, to generate a power error signal. Further, the amplifier circuit is configured to receive the power error signal. The amplifier circuit amplifies the received power error signal and generates an amplified frequency signal. Further, the generated amplified frequency signal is added to the power error signal to generate a shaft frequency signal. The delay circuit is configured to receive the shaft frequency signal and delay the received shaft frequency signal. The divider divides the delayed shaft frequency signal by the utility grid frequency to generate a torque signal. Further, the diesel generator controller 110 is configured to transmit the torque signal to the diesel generator 108. Based on the received torque signal, the diesel generator 108 generates the first real and reactive power.

Upon receiving the utility grid voltage and the diesel generator frequency (utility grid frequency), the grid side converter 118 is coupled to the wind turbine 112 and operates in a decoupled d-q current control mode at the utility grid frequency with a unity power factor to provide a portion of the first real power to the plurality of loads 124.

Upon receiving the utility grid voltage and the diesel generator frequency (utility grid frequency), the second DC-AC voltage source converter coupled to the photovoltaic array 114 is configured to operate in a decoupled d-q current control mode. The second DC-AC voltage source converter is configured to operate at the utility grid frequency with a unity power factor to provide a portion of the first real power to the plurality of loads 124.

In the island mode, the diesel generator controller 110 is configured to provide the stored utility grid frequency and power, acting as reference to the diesel generator 108. In the island mode, the diesel generator 108 operates at a constant angular speed to generate a second real power and second reactive power at a diesel generator frequency. The generated diesel generator frequency matches with the stored utility grid frequency, and the generated second real power and reactive power match with the power reference fetched from the memory.

Further, the diesel generator controller 110 is configured to transmit the stored utility grid voltage (utility grid voltage reference signal) and the diesel generator frequency (diesel generator output frequency) as a wind turbine reference voltage and a wind turbine reference frequency, respectively to the wind turbine 112. Upon receiving the utility grid voltage and the diesel generator frequency (utility grid frequency), the wind turbine 112 is configured to generate a third real power. The DFIG is configured to operate in a constant P-Q control mode at the wind turbine reference frequency with a unity power factor to provide the third real power to the plurality of loads 124.

The diesel generator controller 110 also transmits the stored utility grid voltage and the diesel generator frequency as a photovoltaic array reference voltage and photovoltaic array reference frequency to an MPPT circuit of the photovoltaic array 114. Upon receiving the utility grid voltage and the diesel generator frequency (reference frequency), the photovoltaic array 114 generates a fourth real power. The second DC-AC voltage source converter is configured to use a decoupled d-q current control mode at the photovoltaic array reference frequency with a unity power factor to provide the fourth real power to the plurality of loads 124.

The diesel generator 108, the wind turbine 112, and the photovoltaic array 114, in combination or individually, are configured to provide the second reactive power, the second real power, the third real power, and the fourth real power to the plurality of loads 124.

In the island mode, the diesel generator controller 110 includes an adder, an amplifier circuit, a delay circuit, and a divider. The diesel generator controller 110 receives a power signal from the SG-PI speed governor controller.

The adder adds the receive power signal to the power reference signal, fetched from the memory, to generate a power error signal. Further, the amplifier circuit is configured to receive the power error signal. The amplifier circuit amplifies the received power error signal and generates an amplified frequency signal. Further, the generated amplified frequency signal is added to the power error signal to generate a shaft frequency signal. The delay circuit is configured to delay the shaft frequency signal. The divider is configured to divide the delayed shaft frequency signal by the utility grid frequency and generate a torque signal. The diesel generator controller 110 transmits the generated torque signal to the diesel generator 108. The diesel generator 108 is configured to use the torque signal to generate the second real power and the reactive power.

When the system 100 operates in the resynchronization mode, the switched capacitor bank 122 is configured to be charged with the second real power, the third real power and the fourth real power produced by the microgrid 106. The diesel generator controller 110 is configured to actuate a plurality of switches of the switched capacitor bank 122 to adjust the second reactive power such that the microgrid voltage, the microgrid frequency and the microgrid phase angle match the utility grid voltage, the utility grid frequency, and the utility grid phase angle. The synchro check relay 120 is configured to actuate the switch to connect the microgrid 106 to the utility grid 102.

Figure 2:
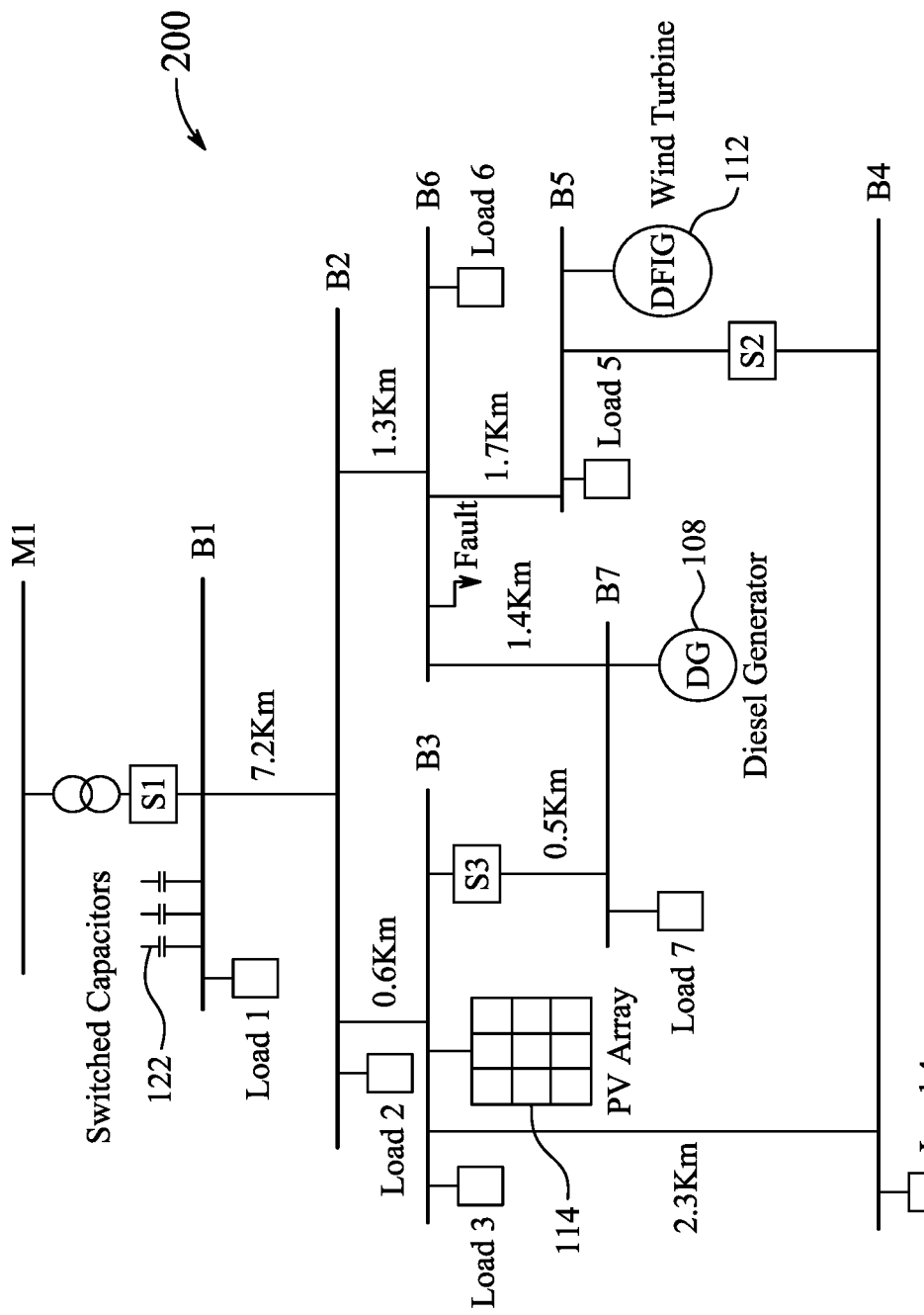
FIG. 2 is a schematic diagram of distributed energy resources (DERs) based microgrid system, according to certain embodiments.

FIG. 2 is a schematic diagram of a distributed energy resources (DERs) based microgrid system 200, according to certain embodiments. As shown in FIG. 2, the microgrid 106 includes three DERs, that is, the PV array 114, the diesel generator 108, and the DFIG based wind turbine 112 (wind energy system). An eleven bus CIGRE MV benchmark test system is used for the present system 200, however, due to the Real Time Digital Simulator (RTDS) node limitation, the system 200 is reduced to seven buses (B1-B7) while maintaining the original structure. In an exemplary embodiment, a 13.2 kV microgrid 106 is connected to a 138 kV utility grid 102 through a 138 kV/13.2 kV transformer. The PCC 116 is at Bus-B1 on the Low Voltage (LV) side of the transformer, and the microgrid 106 is interconnected using a static switch (S₁). The 5.5 MVA diesel generator 108 is connected to the microgrid 106 at bus-B7 and performs the frequency and voltage control of the microgrid 106 during the island mode. The 1.74 MW photovoltaic array 114 is connected to the microgrid 106 at bus-B3, and the 2 MW DFIG wind turbine 112 is connected to bus-B5.

The switched capacitor bank (s) 122 is connected at Bus-B1 for microgrid voltage synchronization. The PV array 114 and DFIG wind turbine 112 are interfaced to their corresponding buses using a voltage source converter (VSC) with a decoupled d-q current control strategy.

A tabular representation of total balanced loads (non-critical loads) connected to the microgrid 106 is illustrated in Table 1 provided below.

TABLE 1

Total Balanced Loads

| BUS | MVA | pf | P (MW) | Q(Mvar) |
|---|---|---|---|---|
| 1 (Load 1) | 1.518 | 0.9 | 1.37 | 0.66 |
| 2 (Load 2) | 1.1 | 0.95 | 1.045 | 0.343 |
| 3 (Load 3) | 1.032 | 0.9 | 0.93 | 0.45 |
| 4 (Load 4) | 1.068 | 0.9 | 0.96 | 0.47 |

A tabular representation of total unbalanced loads (critical loads) connected to the microgrid 106 is illustrated in Table 2 provided below.

TABLE 2

Total Unbalanced Loads

| BUS | Phase A (KVA) | Phase B (KVA) | Phase C (KVA) | pf |
|---|---|---|---|---|
| 5 (Load 5) | 325 | 625 | 100 | 0.95 |
| 6 (Load 6) | 125 | 725 | 300 | 0.95 |
| 7 (Load 7) | 275 | 625 | 150 | 0.95 |

Under normal operation, the static switch $S_1$ is closed and the microgrid 106 and the utility grid 102 operate in parallel to deliver power to the loads together. The utility grid 102 maintains the voltage and frequency at their corresponding rated values. In the island mode, the plurality of loads (load 1, load 2, load 3, . . . , load 7) is supplied by the DERs of the microgrid 106. In this operating mode, the voltage and frequency are controlled by the diesel generator 108 in isochronous mode by keeping the original speed set point after a disturbance to maintain the frequency at rated 60 Hz.

In a working example, each DER of the microgrid 106 is equipped with a controller. For example, for the PV array 114, a DC-DC buck converter and voltage source converter (VSC) are used to transfer the generated power PPV to Bus-B3. The DERs supply constant P-Q during the grid connected mode however, during the island mode, the diesel generator 108 maintains the system voltage and frequency to its rated nominal value. In the resynchronization mode, the microgrid 106 is connected back to the utility grid 102, therefore, the voltage magnitude, phase angle, and frequency of both microgrid 106 and the utility grid 102 operate within the permissible value recommended by IEEE Standard 1547.4-2011. To balance the voltage magnitude at the PCC 116 for synchronization, the switched capacitor bank (s) 122 is connected to provide the required reactive power.

Figure 3:
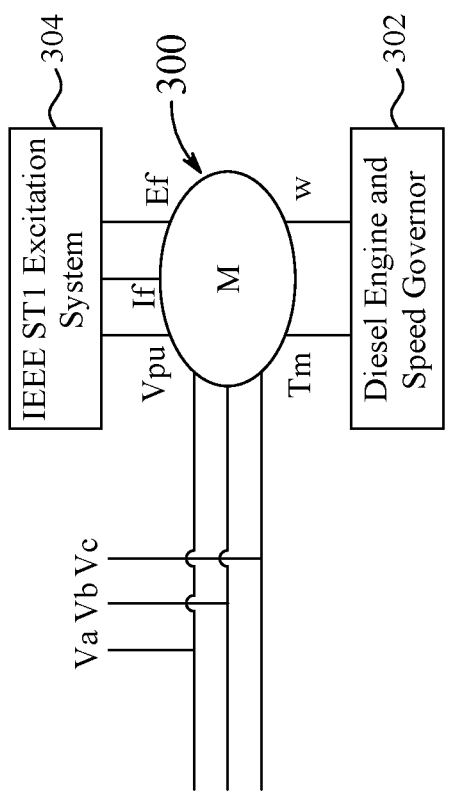
FIG. 3 is a network connection of a diesel generator, an exciter, and a speed governor, according to certain embodiments.

FIG. 3 depicts a network connection of a diesel generator 108, an exciter, and a speed governor, according to certain embodiments.

Diesel generators 108 are used as backup power supply during power outages, or to generate power in off-grid applications such as remote locations or large ships. The diesel generators 108 are also used to provide ancillary services such as voltage control, load regulation, and frequency control. Currently, most microgrid implementations rely on diesel generator systems. The diesel generator 108 has two roles: in the grid connected mode, the diesel generator 108 provides the first real and reactive power, and in the island mode, the diesel generator 108 regulates the microgrid frequency, as shown in FIG. 3. The diesel generator 108 is modeled as a synchronous machine 300 controlled by an excitation system 304 and a speed governor 302. In an example, the excitation system 304 is an IEEE ST1 excitation system. The excitation system 304 is an equipment that provides field current for the synchronous machine 300, including all power, regulating, control, and protective elements. The speed governor 302 is driven by a diesel engine that regulates the machine frequency (generator frequency).

As shown in FIG. 3, the speed governor 302 has an input diesel generator per unit speed $\omega$ and $T_m$ is a machine torque. The diesel generator 108 is configured to operate at a constant angular speed to generate the second real power and the second real reactive power at the diesel generator frequency.

Figure 4:
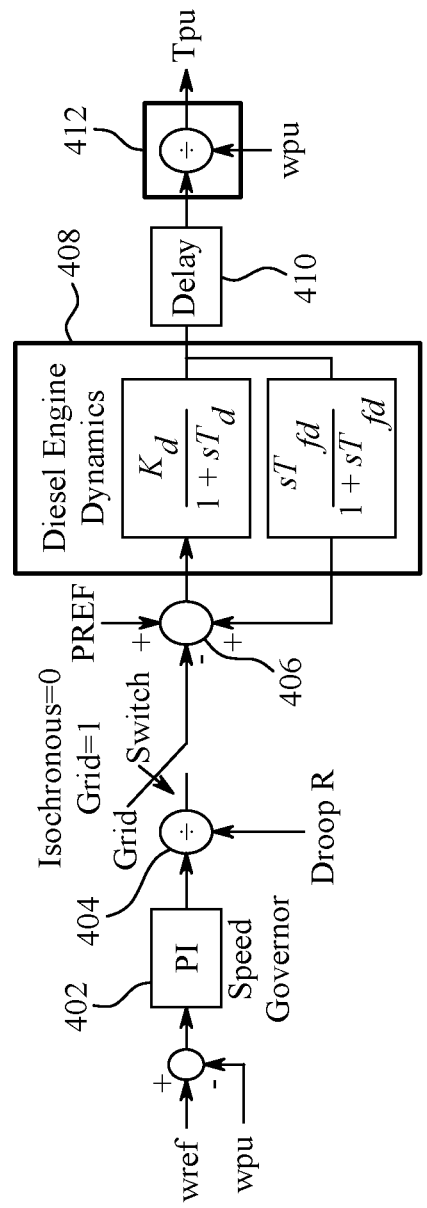
FIG. 4 is a block diagram of diesel generator speed governor (DGSG) controller, according to certain embodiments.

FIG. 4 is a block diagram 400 of a diesel generator speed governor (DGSG) controller 402, according to certain embodiments.

As shown in FIG. 4, a reference shaft frequency $\omega_{ref}$ and a diesel generator speed $\omega_{pu}$ are inputs of the diesel generator speed governor (DGSG) controller 402, and the per unit (pu) mechanical torque $T_{pu}$ is an output of the DGSG controller 402. The diesel generator 108 operates in the speed droop mode and supplies a preset reference power at the utility grid frequency in the grid connected mode. In the island mode, the diesel generator 108 is operated in the isochronous mode to maintain a constant frequency irrespective of the loads 124. The diesel generator speed governor controller 402 is the SG-PI speed governor controller.

In the grid-connected mode, the SG-PI controller 402 is electrically connected to the diesel generator 108. The SG-PI controller 402 is configured to subtract the diesel generator speed (shaft frequency) ($\omega_{pu}$) of the diesel generator 108 from the reference shaft frequency ($\omega_{ref}$) fetched from the memory and to generate the power value. The SG-PI controller 402 is configured to store the generated power value in the memory. The SG-PI controller 402 divides the power value by a speed droop reference value (as shown by referral numeral 404), and generates a power signal by dividing the power value by the speed droop reference value.

In the island mode, the SG-PI controller further includes a subtractor that subtracts the generated power signal from the power reference signal to generate a power error signal (as shown by referral numeral 406). The amplifier circuit 408 (diesel engine dynamics 408, as shown in FIG. 4) amplifies the received power error signal and generates an amplified frequency signal. Further, the generated amplified frequency signal is added to the power error signal to generate a shaft frequency signal. The delay circuit 410 is configured to receive the shaft frequency signal and delay the received shaft frequency signal. The divider 412 divides the delayed shaft frequency signal by the utility grid frequency to generate a torque signal ($T_{pu}$). The diesel generator controller 110 is configured to transmit the torque signal to the diesel generator 108. Based on the received torque signal, the diesel generator 108 generates the first real and reactive power.

Figure 5:
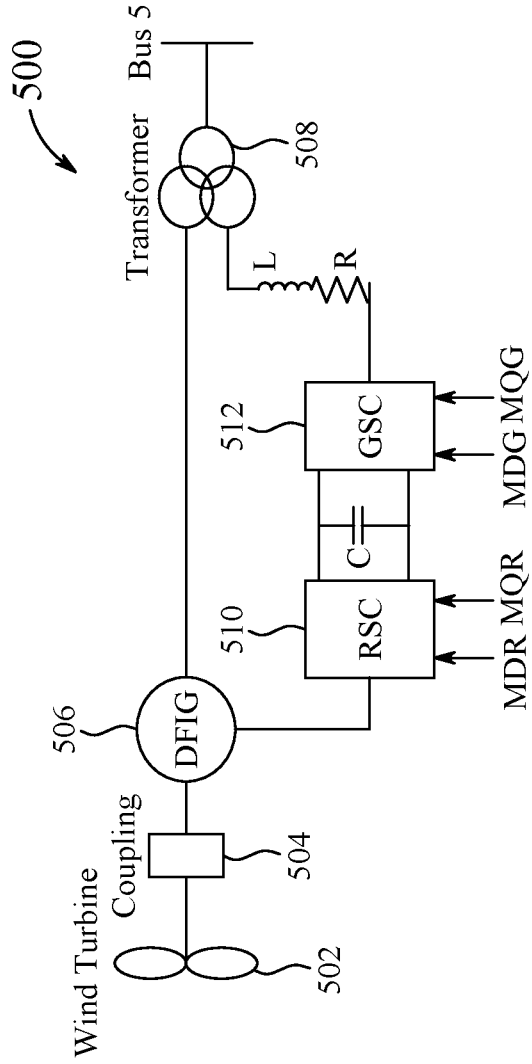
FIG. 5 is a schematic diagram of a doubly fed induction generator (DFIG) based wind turbine, according to certain embodiments.

FIG. 5 is a schematic diagram 500 of a DFIG based wind turbine 112, according to certain embodiments.

The DFIG is used to convert the wind turbine's mechanical power to electrical power. The output power generated from a horizontal axis wind turbine is provided in equation (1).

$$P_m = 0.5 C_p \rho A V^3 \qquad (1)$$

where $C_p$ is a power coefficient, $\rho$ is the density of air, A is the swept area, and V is the wind velocity.

In some examples, a blade power coefficient of the wind turbine 112 may be considered. The blade power coefficient of the wind turbine 112 is a function of the tip speed ratio $\lambda$ and the blade pitch angle $\beta$ which is the angle between the wind speed direction and the surface of the wind turbine blades.

As shown in FIG. 5, the wind turbine 502 is connected to the DFIG 506 via a coupling 504. The stator of the wind turbine 502 is directly connected to the utility grid 102 through a transformer 508 via bus B5. The rotor of the wind turbine 502 is connected to the utility grid 102 using two back-to-back power converters (510, 512) with a common capacitive DC link. The DFIG 506 allows variable speed operation over a slip speed range (typically 0.7-1.2 pu). The DFIG 506 provides better controllability than other existing wind turbines, without the need for additional mechanical parts and capacitors for reactive power compensation. The power convertors, for example, a rotor side converter (RSC) 510 and a grid side converter (GSC) 512 control the power exchanged between the wind turbine 502, 112, and the utility grid 102. To limit the generated power from the wind turbine 112, above the rated wind speed range, a pitch angle control is implemented.

In the island mode, the diesel generator controller 110 transmits a set of DFIG voltage reference control signals, $m_{DR}$, and $m_{QR}$, to the RSC 510. $M_{DR}$ represents the D axis rotor side control signal and $m_{QR}$ represents the Q axis rotor side control signal. In an example, the diesel generator controller 110 is configured to employ synchronous rotating reference frame (D-Q axis) based current control technique. The control signal $m_{DR}$ regulates a rotor side active voltage and a rotor side active power flow of the RSC 510. Further, the control signal $m_{QR}$ regulates a rotor side reactive voltage or a rotor side reactive power of the RSC 510.

In another example, the diesel generator controller 110 also transmits the set of grid side voltage reference control signals, $m_{DG}$, and $m_{QG}$, to the GSC 512. The control signal $m_{DG}$ regulates a grid side active (D axis) voltage or/and a grid side active power of the GSC 512. The control signal $m_{QG}$ regulates a grid side reactive (Q axis) voltage or a grid side reactive power of the GSC 512.

Figure 6:
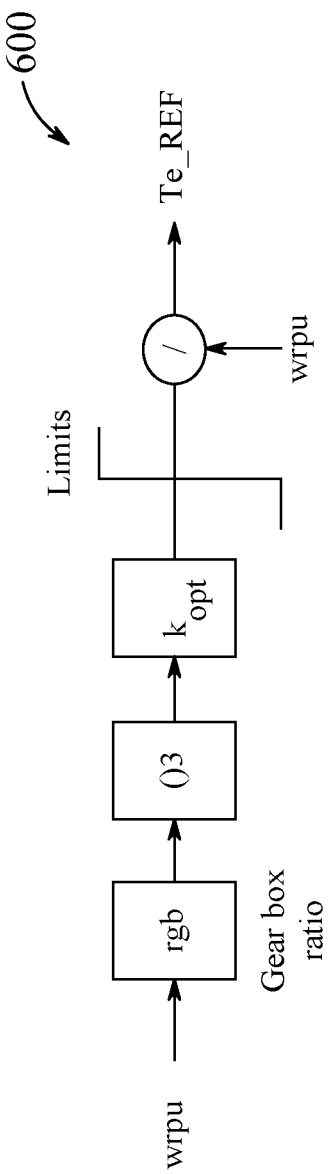
FIG. 6 is a network connection of DFIG maximum power point tracking (MPPT), according to certain embodiments.

FIG. 6 is a block diagram 600 of a DFIG maximum power point tracking (MPPT) method, according to certain embodiments.

For wind speeds between a cut-in speed $V_c$ and a rated speed $V_r$ range, a pitch angle is set to zero. Pitch angle (measured from the theoretical 0° position) may have a significant impact on the power curve and the production of the wind turbine 112. Further, MPPT control method is used to track the maximum power of the wind turbine at a given wind speed. Commonly used MPPT methods employ an optimal tip speed ratio where an optimum rotor speed for the given wind speed is calculated based on the known optimum tip speed ratio. The turbine power feedback control measures the rotor speed at the given wind speed and calculates the maximum power from a known power curve of the wind turbine 112. In another MPPT method, an optimal torque control (OTC) is used based on concept that for a given gearbox ratio, the turbine's mechanical torque and speed can be converted to the generator torque and speed from which the optimum torque can be calculated using the generator rated parameters. The present disclosure implements the OTC as shown in FIG. 6.

The input to the torque control is the turbine speed (wrpu), and the output is the electrical torque reference (te_REF) that indicates the maximum power in the wind.

$$P_{m,max} = k_{opt}\omega_{m,opt}^3, \quad (2)$$

$$T_{m,max} = k_{opt}\omega_{m,opt}^2, \quad (3)$$

$$\omega_{m,opt} = \frac{\lambda_{opt}V}{R}, \quad (4)$$

$$k_{opt} = \frac{0.5\pi\rho C_p R^5}{\lambda_{opt}^3}, \quad (5)$$

The PV array 114, is configured to generate a voltage, $V_{PV}$, and a current, $I_{PV}$. An MPPT circuit is connected to the PV array 114 that is configured to receive the generated voltage ($V_{PV}$), the current ($I_{PV}$), and the PV array reference voltage and compare the photovoltaic array reference voltage to the voltage ($V_{PV}$) to generate a voltage error signal.

Further, a PV array proportional integral (PV-PI) controller is connected to the MPPT circuit. The PV-PI controller is configured to generate a duty cycle signal. Also, a DC-DC buck converter is connected to the PV array 114 and the PV-PI controller. The buck converter is configured to receive the voltage ($V_{PV}$), the current ($I_{PV}$) from the PV array 114, the duty cycle signal from the PV-PI controller and generate a DC voltage. The DC-DC buck converter is connected to the second DC-AC voltage source converter. The second DC-AC voltage source converter is configured to convert the DC voltage to a three-phase voltage, wherein each phase has a magnitude of the DC voltage at the duty cycle frequency.

The PV-PI controller is configured to calculate the duty cycle signal based on:

$$\text{Duty} = (V_{ref} - V_{PV}) \cdot \left(k_P + \frac{k_I}{s}\right) \quad (6)$$

where $k_p$ is a proportional constant of the PV-PI controller, $k_I$ is an integral constant of the PI controller, and s is an output variable of a Laplace transform of the PV-PI controller.

When the system 100 is configured to operate in the grid connected mode, the PV-PI controller is configured to set a frequency of the duty cycle signal to match the utility grid frequency, and the second DC-AC voltage source converter is configured to use a decoupled d-q current control mode at the frequency of the duty cycle with a unity power factor to provide a portion of the first real power to the plurality of loads 124.

When the system 100 is configured to operate in the island mode, the PV-PI controller is configured to set a frequency of the duty cycle signal to match the photovoltaic array reference frequency, and the second DC-AC voltage source converter is configured to use a decoupled d-q current control mode at the photovoltaic array reference frequency with a unity power factor to provide the fourth real power to the plurality of loads 124.

Figure 7:
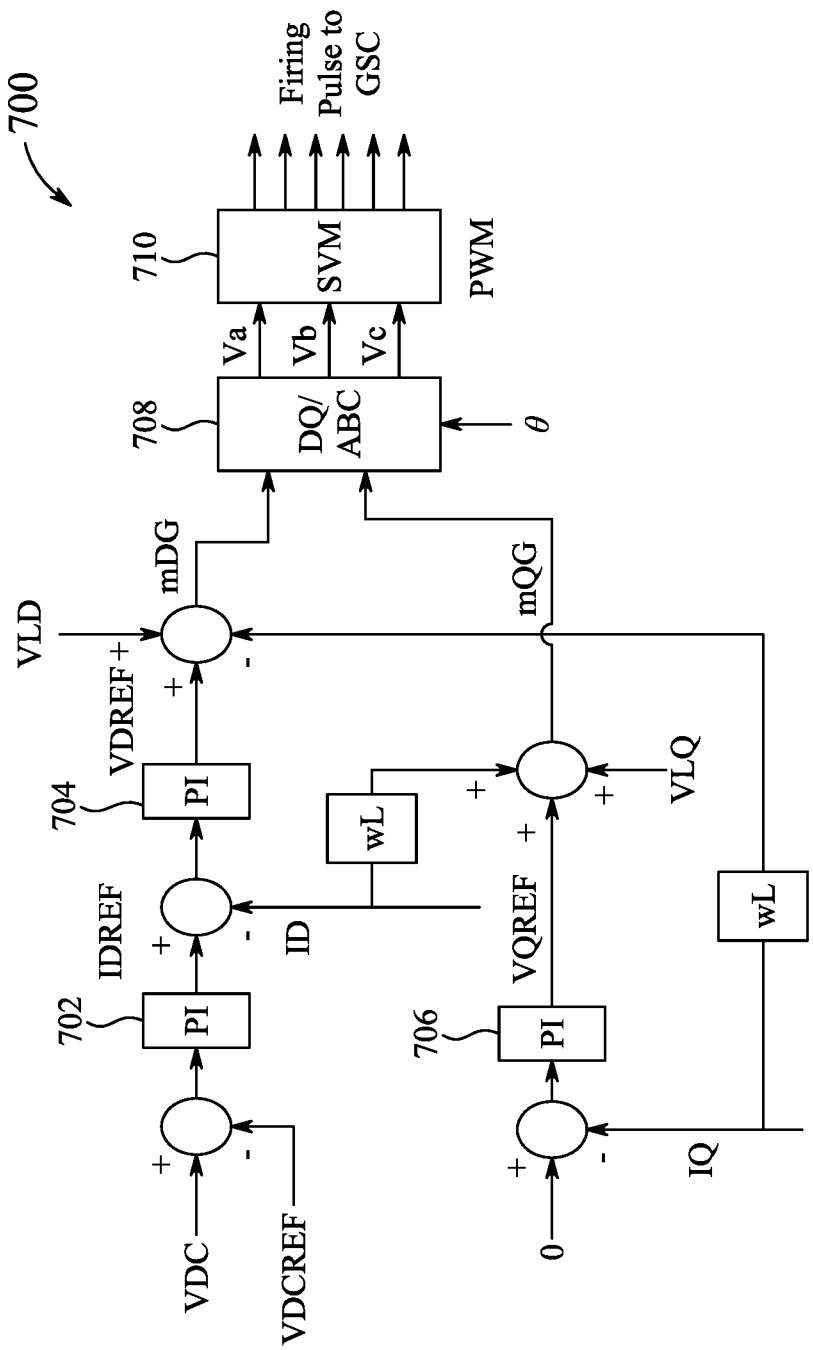
FIG. 7 is a schematic diagram of a grid side converter (GSC) decoupled controller, according to certain embodiments.

FIG. 7 is a schematic diagram of a decoupled current control 700 implemented for the GSC 512, according to certain embodiments.

The GSC 512 is configured to perform two functions for example to provide a reactive power support to the grid voltage at the PCC 116 and to control the DC link voltage to a constant reference value. The decoupled D-Q current mode control 700 is used for the GSC 512 to allow the independent control of the DC link voltage and reactive power injected to the utility grid 102 during fault events. A D axis control regulates the DC bus voltage to a constant reference voltage $V_{DCREF}$ whereas the reactive power and, consequently, the power factor of the DFIG wind turbine 112 is controlled by a Q axis current controller. The reactive power reference $Q_{REFG}$ is set to zero for the unity power factor.

A synchronous rotating reference frame (D-Q axis) based current control technique is implemented where the D current component, $I_D$, controls the active power flow and the Q current component, $I_Q$, the reactive power. To improve the performance of the PI current controllers (702, 704, 706), feed forward voltage, and cross-coupling are used as shown in FIG. 7.

The outer voltage control loop in the Laplace domain is:

$$I_{DREF} = \left(k_{p1D} + \frac{k_{I1D}}{s}\right) \cdot (V_{DC} - V_{DCREF}). \quad (7)$$

The D and Q-axes control signals in the Laplace domain are:

$$m_{DG} = \left(k_{P1D} + \frac{k_{I1D}}{s}\right) \cdot (I_{DREF} - I_D) + V_{LD} - \omega L I_{LQ}. \quad (8)$$

$$m_{QG} = \left(k_{P2Q} + \frac{k_{I2Q}}{s}\right) \cdot (I_{QREF} - I_Q) + V_{LQ} + \omega L I_{LD}. \quad (9)$$

From above Equations (7)-(9), $k_P$'s are the proportional constants, $k_I$'s are the integral constants, $m_D$, and $m_Q$ are the D and Q axes control signals, respectively.

A converter (DQ/ABC) 708 is used for converting $m_D$ and $m_Q$ back to the three phase ABC frame. The voltage control signals $m_{DG}$ and $m_{DQ}$ are converted back using the DQ/ABC 708. Further, space vector modulation (SVM) 710 is used to generate the firing pulses for the GSC.

In an example, SVM 710 is an algorithm for the control of pulse-width modulation (PWM). SVM 710 is used for the creation of alternating current (AC) waveforms; most commonly to drive 3 phase AC powered motors at varying speeds from DC using multiple class-D amplifiers.

Figure 8:
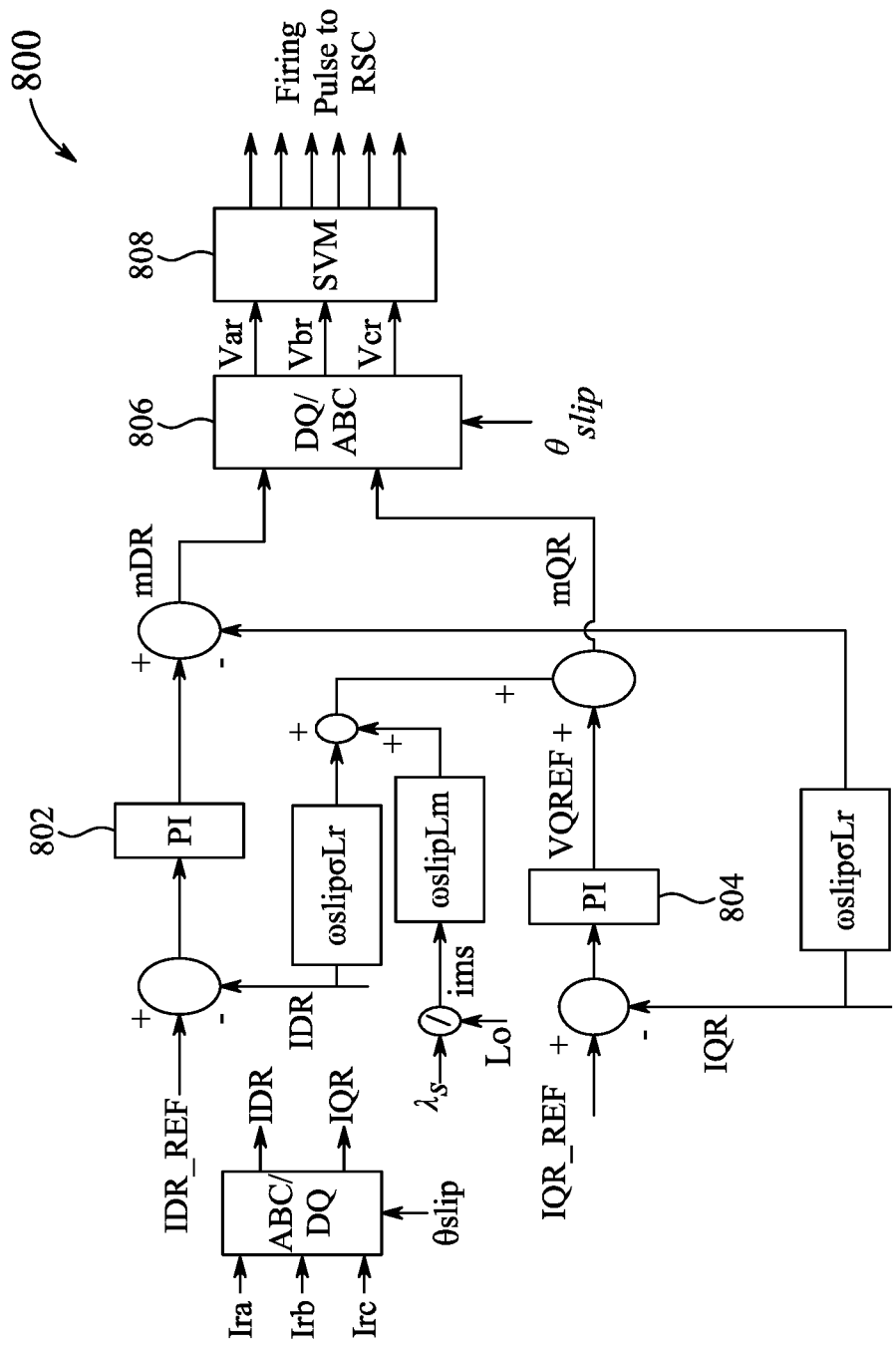
FIG. 8 is a schematic diagram of a rotor side converter (RSC) controller, according to certain embodiments.

FIG. 8 is a schematic diagram 800 of an RSC controller, according to certain embodiments.

The function of the RSC 510 is to control the electrical torque and power factor of the DFIG. The DFIG respectively controls the real and reactive power exchanged between the rotor of the wind turbine 112 and the utility grid 102. An equation describing the relationship between the electrical torque, $T_e$ in the d-q reference axis is given by:

$$T_e = -1.5 P L_m i_{ms} i_{Qr}, \quad (10)$$

where, $L_m$ is the magnetizing inductance, $i_{ms}$ is the stator magnetizing current, $i_{qr}$ is the Q axis rotor current, and P is the number of poles.

The rotor phase currents are transformed to the D-Q axis using the slip angle $\theta_{slip}$ which is the angle between the stator flux vector $\theta_s$ and the rotor angle $\theta_r$.

Further, $\omega_{slip}$ is the slip frequency; and $\omega_s$, $\omega_r$ are the stator and rotor angular frequencies.

$I_{DR\_REF}$ is set to zero to minimize the VSC AC side currents and power losses in the VSC and rotor circuit. $I_{DR\_REF}$ acts as an input for the PI controller 802. The PI controller 802 generates $m_{DR}$ as an output of the PI controller 802. $I_{QR\_REF}$ acts as an input for the PI controller 804. The PI controller 804 generates $m_{QR}$ as an output of the PI controller 804. $I_{QR\_REF}$ is determined from the torque equation given by:

$$T_{e,REF} = -1.5 PL_m i_m I_{QR,REF}. \quad (11)$$

$$I_{QR,REF} = \frac{-T_{e,REF}}{1.5 PL_m i_{ms}}, \quad (12)$$

where $T_{e,REF}$ is obtained using the optimum torque MPPT control shown in FIG. 6.

The output of the RSC current control $m_{DR}$, and $m_{QR}$ act as rotor voltage references which are used for creating rotor modulation waveforms.

A converter (DQ/ABC) 806 is used for converting $m_{DR}$ and $m_{QR}$ back to an ABC frame. Further, space vector modulation (SVM) 808 is used to generate rotor modulation waveforms to generate the switching sequence for the RSC 510.

When the system 100 operates in the resynchronization mode, before an islanded microgrid is reconnected to the utility grid, the voltage, frequency, and phase angle of the islanded microgrid should be matched to those of the utility grid within specified limits to avoid transient instability caused by differences in the real and reactive power at the PCC 116. The Institute of Electrical and Electronic Engineers (IEEE) defines the percentage phase voltage unbalance rate (PVUR) as:

$$\% \; PVUR = \frac{|\Delta V_{average\_phase}|}{V_{average\_phase}} \quad (13)$$

Table 3 provides the synchronization criteria according to the IEEE standard 1547-2011 depending on the rating of the microgrid 106. To balance the voltage at the PCC 116 for microgrid synchronization, a 0.5 M Var switched capacitor bank is connected at bus-B1.

TABLE 3

| Synchronization limits | | | |
| --- | --- | --- | --- |
| Total DER Rating (KVA) | Frequency ($\Delta f$, Hz) | Voltage ($\Delta V$, %) | Phase angle ($\Delta \phi$, °) |
| 0-500 | 0.3 | 10 | 20 |
| 500-1500 | 0.2 | 5 | 15 |
| 1500-10000 | 0.1 | 3 | 10 |

The following examples are provided to illustrate further and to facilitate the understanding of the present disclosure.

Experimental Data and Analysis

The microgrid system 200 shown in FIG. 2 is implemented in RSCAD. In an example, RSCAD® is the proprietary simulation software package that is used to configure the simulations that are then run on parallel processing hardware. To demonstrate the effectiveness of the disclosed controllers (associated with each of DERs), the following tests have been applied:

(A) Grid connected mode;
(B) Grid-connected to island mode; and
(C) Microgrid Re-synchronization (island to grid connected mode).

FIG. 9A-9F are diagrams of a measured active powers, reactive power, and power drawn during the grid connected mode.

In the grid connected mode, the main switch $S_1$ is closed, and the microgrid frequency is determined by the utility grid 102. The loads 124 connected to the microgrid 106 are supplied by both the utility grid 102 and the DERs of the microgrid 106. The DFIG based wind turbine 112 and PV array 114 are configured to control their real and reactive power output using the control schemes as discussed earlier, while the diesel generator 108 operates in droop mode to exchange real and reactive power with the utility grid 102. The diesel generator 108 is set to produce 3 MW and 1.74 MVar, whereas the PV array 114 and wind turbine 112 operate as a constant P-Q source at unity power factor and rated power of 1.74 MW and 2 MW, respectively.

Figure 9A:
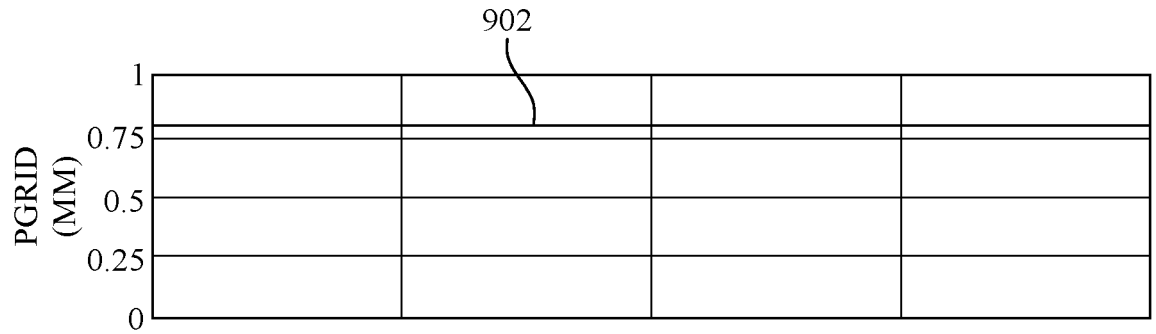
FIG. 9A is an exemplary graph showing total grid, DERs and load active powers, according to certain embodiments.
Figure 9A:
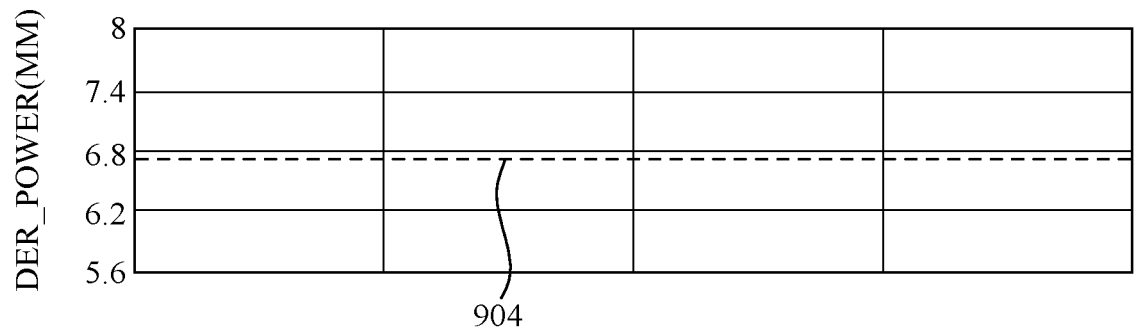
Figure 9A:
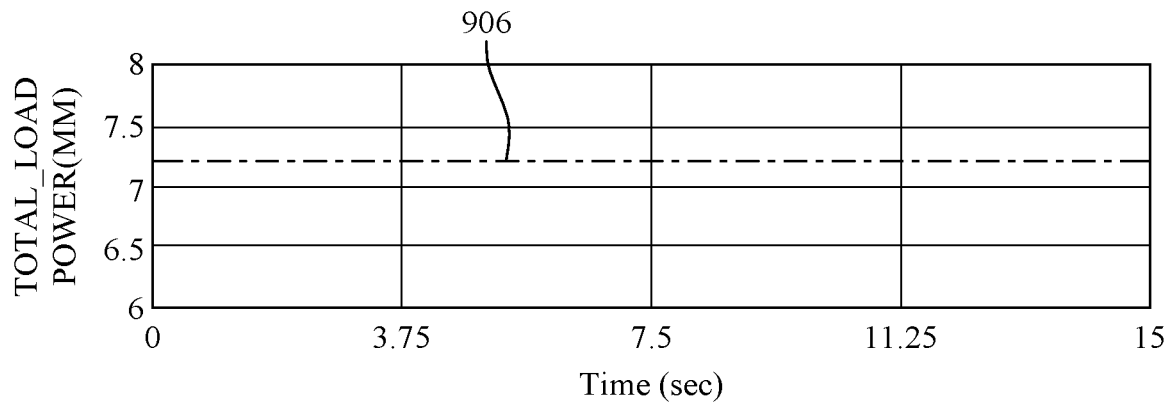

FIG. 9A (1) illustrates a signal 902 corresponding to $P_{GRID}$ (total real power supplied by the grid). Further, FIG. 9A (2) illustrates a signal 904 corresponding to $P_{DERS}$ (total power generated by the DERs). The DERs generated a total active power of 6.74 MW as shown in FIG. 9A (2). FIG. 9A (3) illustrates a signal 906 corresponding to $P_{LOAD}$ (total power consumed by the loads). The total load connected to the microgrid was around 7.2 MW as shows in FIG. 9A (3). Since the power generated from the DERs is insufficient for the loads 124, the remaining power of the loads and the transmission line losses comes from the utility grid 102. The disclosed power management control supplies the loads 124 by regulating the power generated from the DERs and the utility grid 102.

Figure 9B:
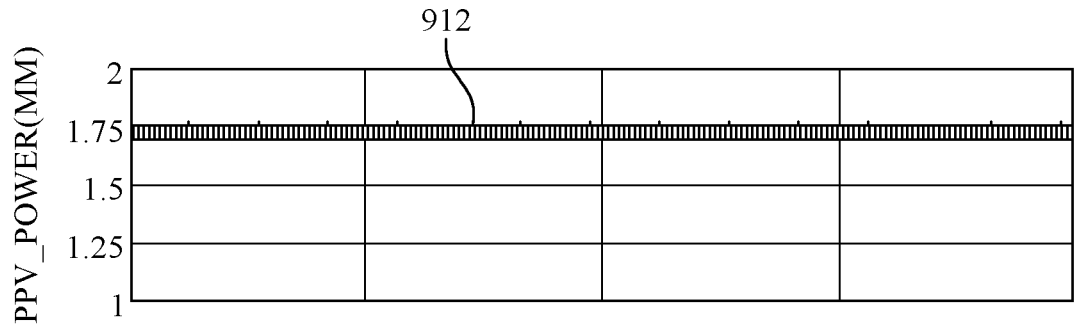
FIG. 9B is an exemplary graph showing power generated by a photovoltaic (PV) array, a wind turbine and a diesel generator, according to certain embodiments.
Figure 9B:
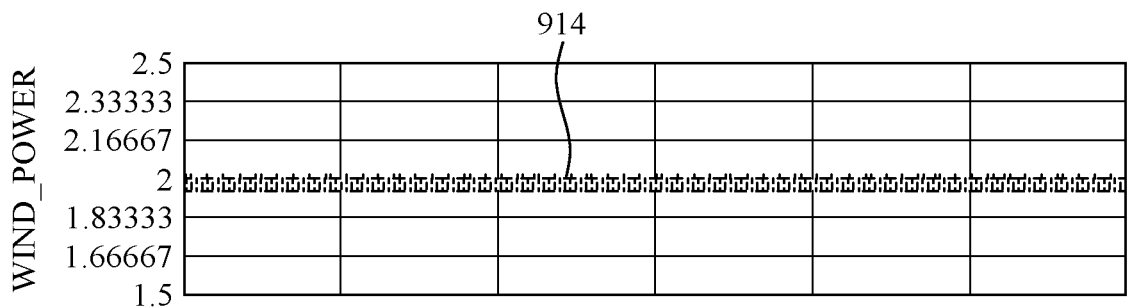
Figure 9B:
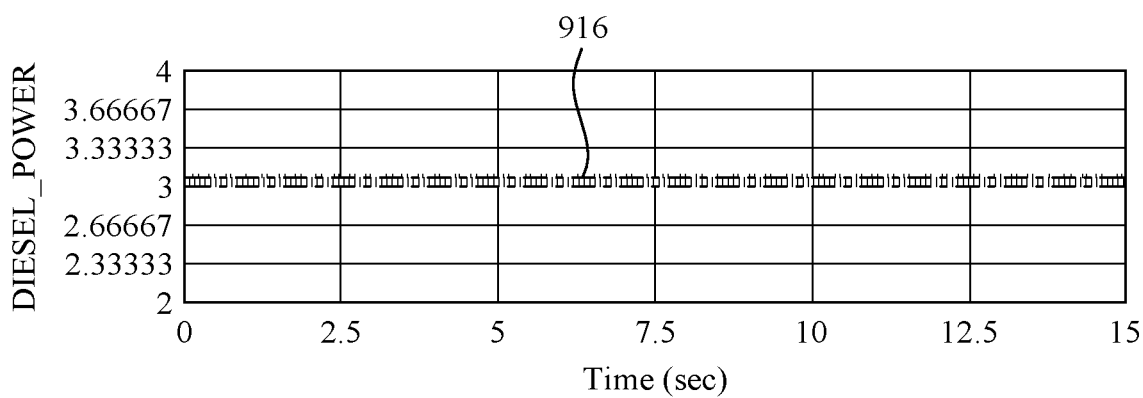

FIG. 9B is an exemplary graph showing power generated from the PV array 114, the wind turbine 112 and the diesel generator 108, according to certain embodiments. FIG. 9B (1) illustrates a signal 912 corresponding to $P_{PV}$ (power generated by the PV array). Further, FIG. 9B (2) illustrates a signal 914 corresponding to $P_{WIND}$ (power generated by the Wind turbine 112). FIG. 9B (3) illustrates a signal 916 corresponding to $P_{DIESELG}$ (power generated by the diesel generator 108). The simulation results show that the PV and wind supply approximately the maximum active power of 1.74 MW and 2 MW, respectively, and zero reactive power as they are designed to operate at the unity power factor.

Figure 9C:
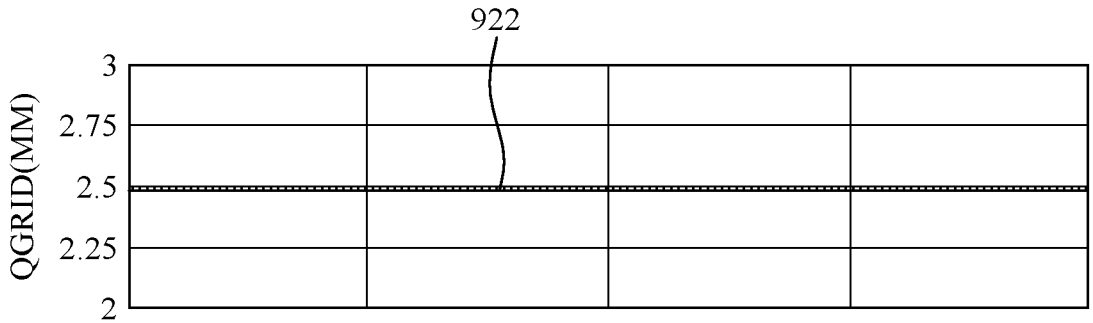
FIG. 9C is another exemplary graph showing total grid, DERs and load reactive powers, according to certain embodiments.
Figure 9C:
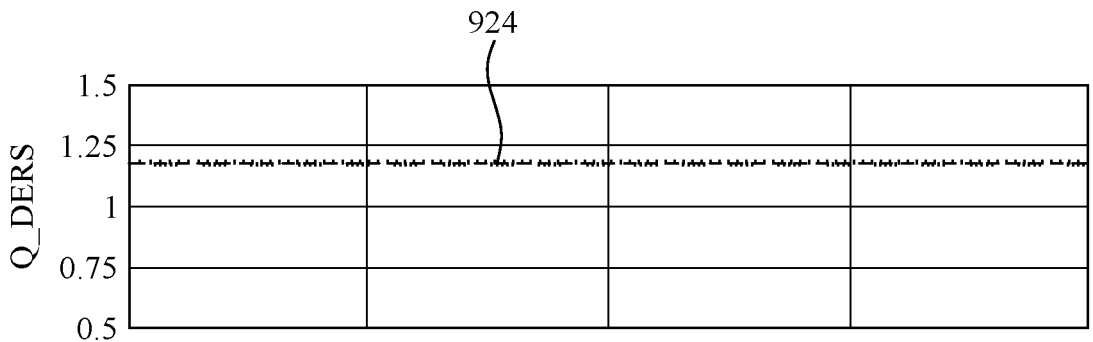
Figure 9C:
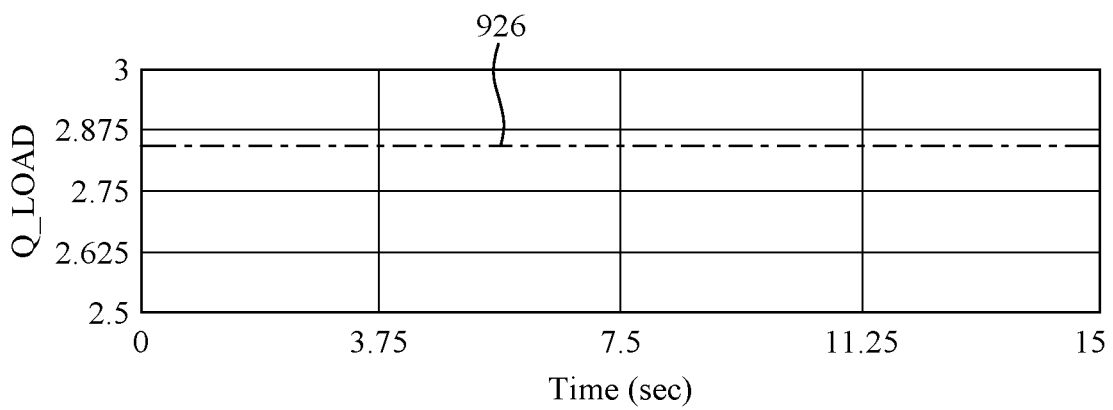

FIG. 9C presents the total reactive power generated by the DERs, the utility grid 102, and consumed by the loads 124. FIG. 9C (1) illustrates a signal 922 corresponding to $Q_{GRID}$ (total reactive power supplied by the grid). FIG. 9C (2) illustrates a signal 924 corresponding to $Q_{DERS}$ (total reactive power generated by the DERs). FIG. 9C (3) illustrates a signal 926 corresponding to $Q_{LOAD}$ (total reactive power consumed by the loads). Since the PV array 114 and wind turbine 112 are operating at unity power factor, the diesel generator 108 would participate in providing reactive power.

Figure 9D:
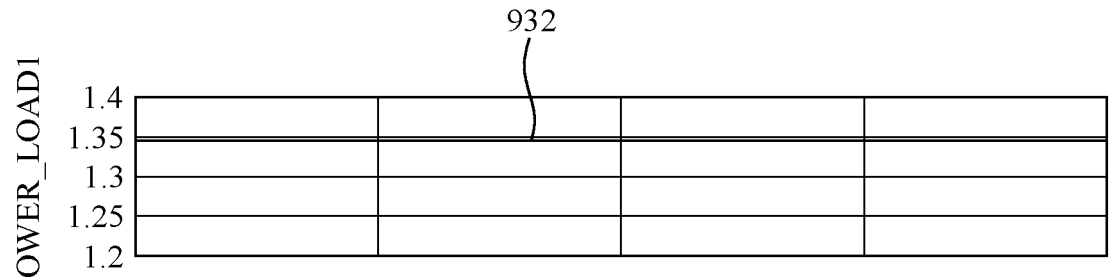
FIG. 9D is an exemplary graph showing active power consumed by non-critical loads (loads at bus 1-4), according to certain embodiments.
Figure 9D:
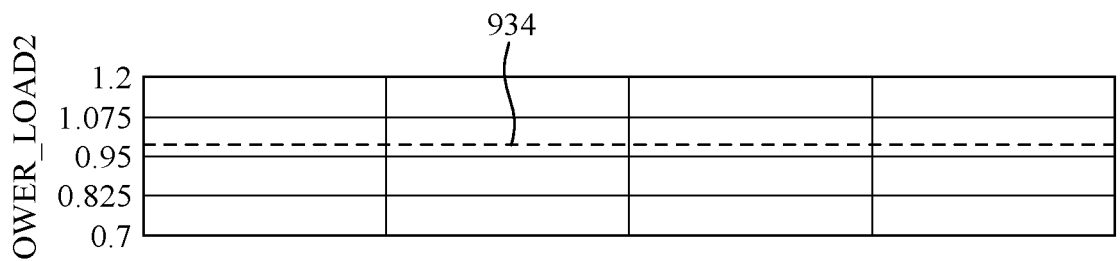
Figure 9D:
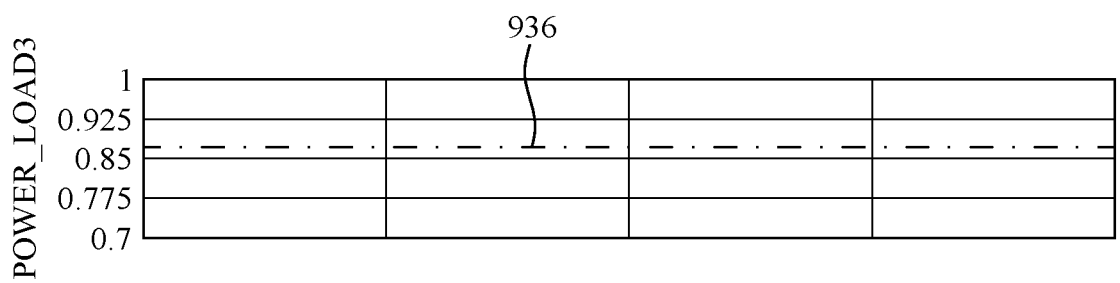
Figure 9D:
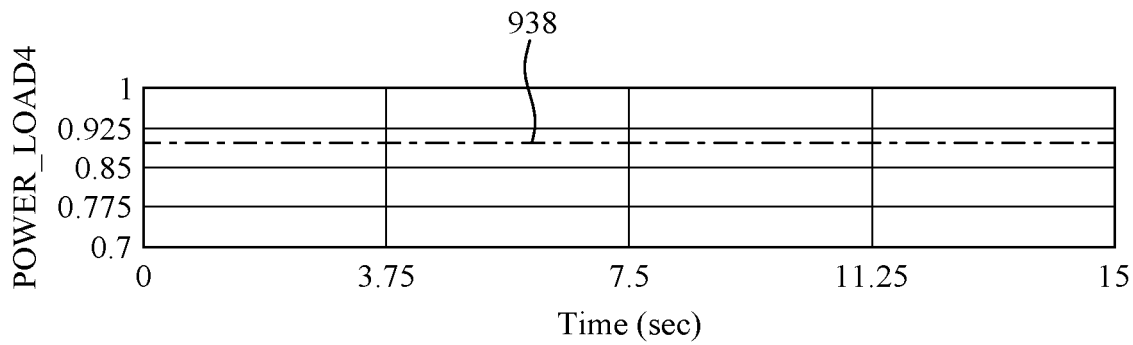
Figure 9E:
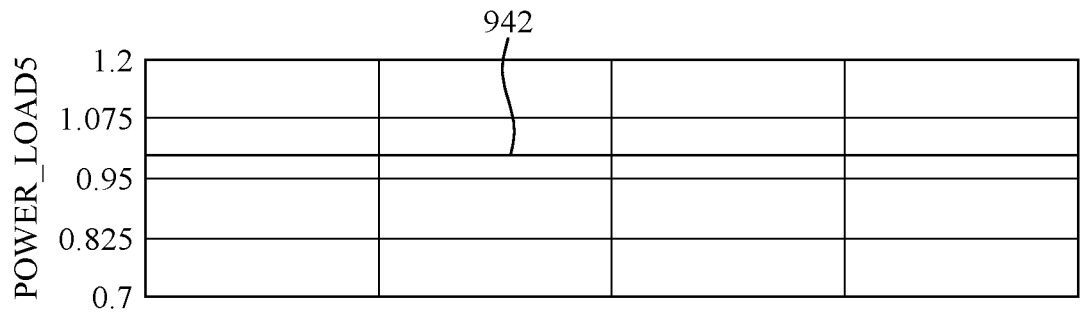
FIG. 9E is an exemplary graph showing active power drawn by critical loads (loads at bus 5-7), according to certain embodiments.
Figure 9E:
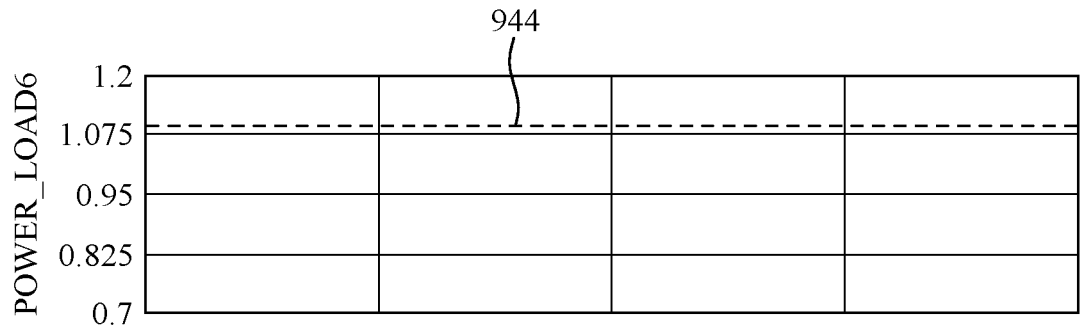
Figure 9E:
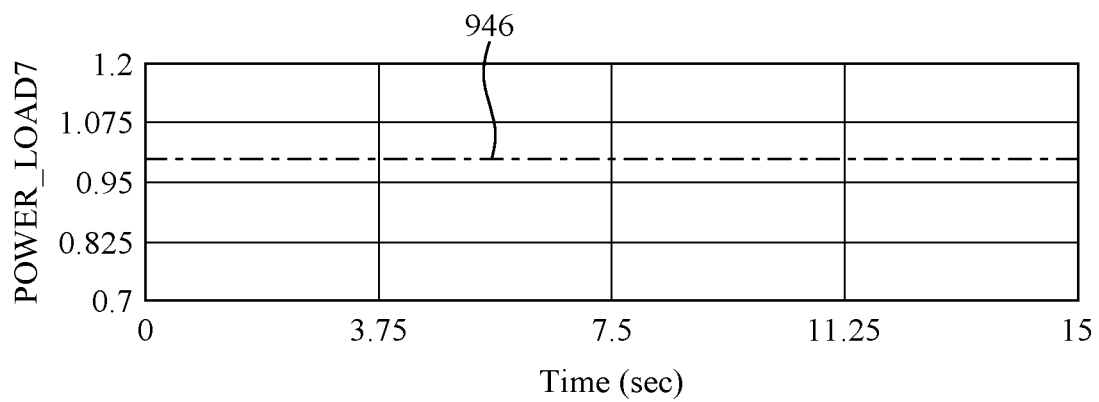

FIGS. 9D and 9E depict the active power consumed by the non-critical and critical loads connected to the microgrid 106. FIG. 9D (1) illustrates a signal 932 corresponding to $V_{LOAD1}$ (active power consumed by the non-critical load 1). FIG. 9D (2) illustrates a signal 934 corresponding to $V_{LOAD2}$ (active power consumed by the non-critical load 2). FIG. 9D (3) illustrates a signal 936 corresponding to $V_{LOAD3}$ (active power consumed by the non-critical load 3). FIG. 9D (4) illustrates a signal 938 corresponding to $V_{LOAD4}$ (active power consumed by the non-critical load 4). The non-critical loads were not shed as the microgrid 106 generated sufficient power to supply all the loads 124.

FIG. 9E (1) illustrates a signal 942 corresponding to $V_{LOAD5}$ (active power consumed by the critical load 5). FIG. 9E (2) illustrates a signal 944 corresponding to $V_{LOAD6}$ (active power consumed by the critical load 6). FIG. 9E (3) illustrates a signal 946 corresponding to $V_{LOAD7}$ (active power consumed by the critical load 7).

Figure 9F:
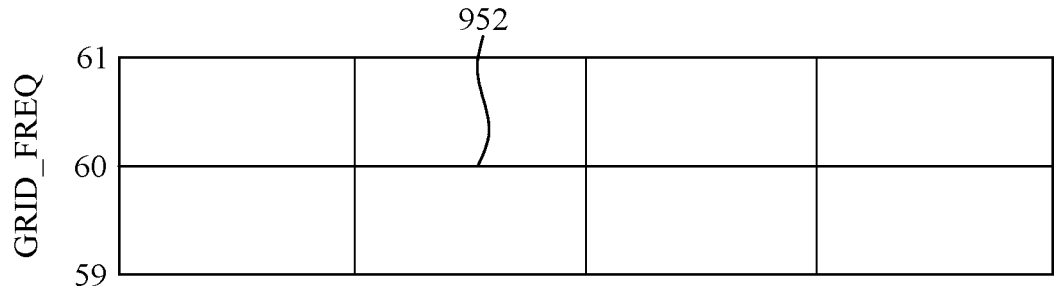
FIG. 9F is an exemplary graph showing microgrid frequency and speed of the diesel generator, according to certain embodiments.
Figure 9F:
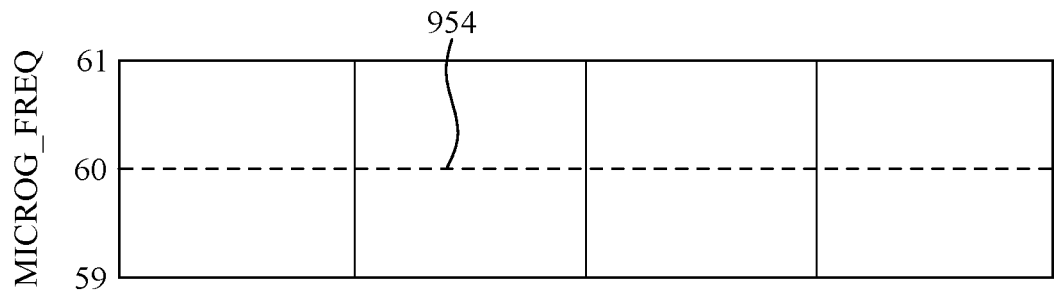
Figure 9F:
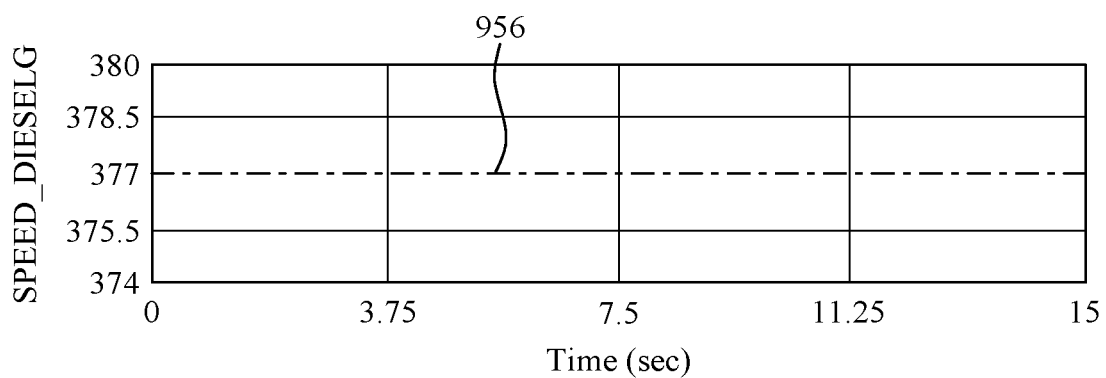

FIG. 9F is an exemplary graph showing utility grid frequency, microgrid frequency and speed of the diesel generator 108, according to certain embodiments. FIG. 9F (1) illustrates a signal 952 corresponding to $Grid_{FREQ}$ (utility grid frequency). FIG. 9F (2) illustrates a signal 954 corresponding to $Microgrid_{FREQ}$ (microgrid frequency). FIG. 9F (3) illustrates a signal 956 corresponding to $DieselG_{SPEED}$ (speed of the diesel generator 108). In the grid connected mode, the system frequency is controlled by the utility grid as presented in FIG. 9F. The speed of the diesel generator 108 is maintained at constant 377 rad/sec corresponding to the rated 60 Hz.

FIG. 10A-10G are diagrams of a measured various parameters during the island mode.

In the grid connected mode, the diesel generator 108 operates in droop mode to exchange real and reactive power with the utility grid 102 and the utility grid 102 controls the voltage and frequency. Opening the circuit breaker switch $S_I$ makes the microgrid 106 in the island mode of operation. In island mode, the diesel generator 108 operates in the isochronous mode. In the isochronous mode, the diesel generator 108 maintains a constant speed and hence frequency regardless of the load (from no-load to full load) and the speed returns to the original speed set-point after a load has been applied or removed. Once the utility grid 102 is disconnected, both the voltage and frequency deviate due to excessive loading on the DERs.

Figure 10A:
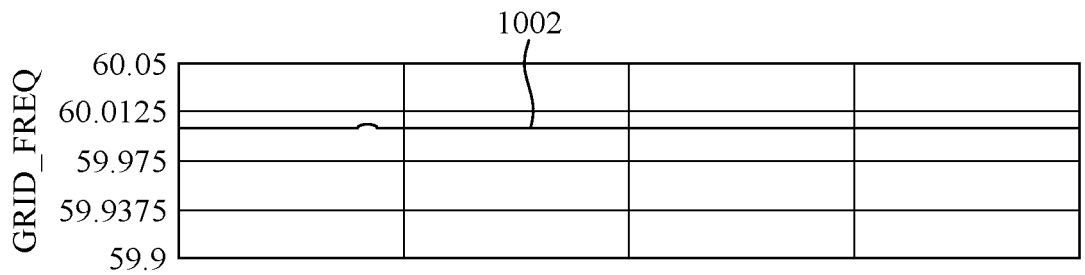
FIG. 10A is an exemplary graph showing microgrid system frequency before and after islanding, according to certain embodiments.
Figure 10A:
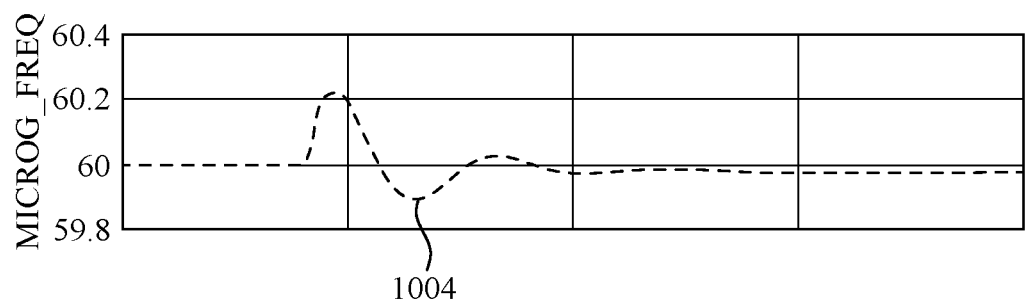
Figure 10A:
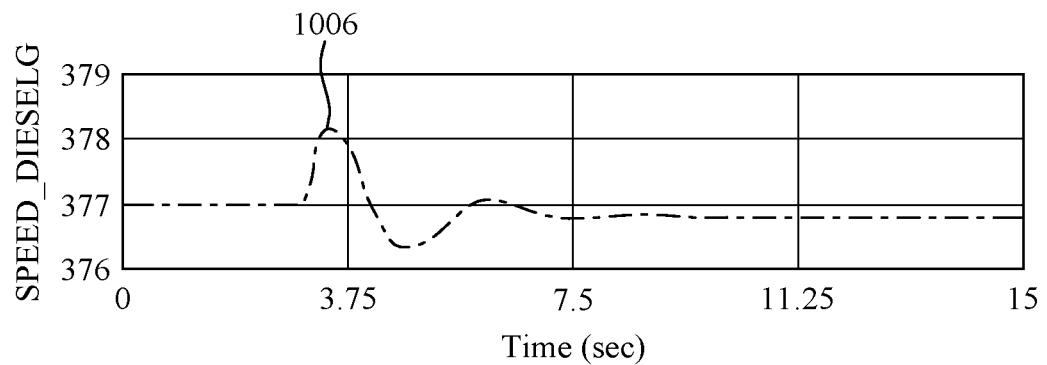

FIG. 10A is an exemplary graph showing frequency of a microgrid system before and after islanding, according to certain embodiments. FIG. 10A (1) illustrates a signal 1002 corresponding to $Grid_{FREQ}$ (utility grid frequency). FIG. 10A (2) illustrates a signal 1004 corresponding to $Microgrid_{FREQ}$ (microgrid frequency). FIG. 10A (3) illustrates a signal 1006 corresponding to $DieselG_{SPEED}$ (speed of the diesel generator 108). The diesel generator 108 maintained the frequency at its rated value when the microgrid 106 is islanded.

FIG. 10B is an exemplary graph showing the utility grid, DERs and load active powers in the island mode. After islanding, the reactive power of the utility grid is lost which causes a voltage drop in bus 1-7 and this voltage drop in turn causes a drop in the total power consumed by the loads 124 as presented FIG. 10B. FIG. 10B (1) illustrates a signal 1012 corresponding to $P_{GRID}$ (active power generated by the utility grid 102). FIG. 10B (2) illustrates a signal 1014 corresponding to $P_{DERS}$ (active power generated by the DERs). FIG. 10B (3) illustrates a signal 1016 corresponding to $P_{LOAD}$ (active power consumed by the loads).

Figure 10C:
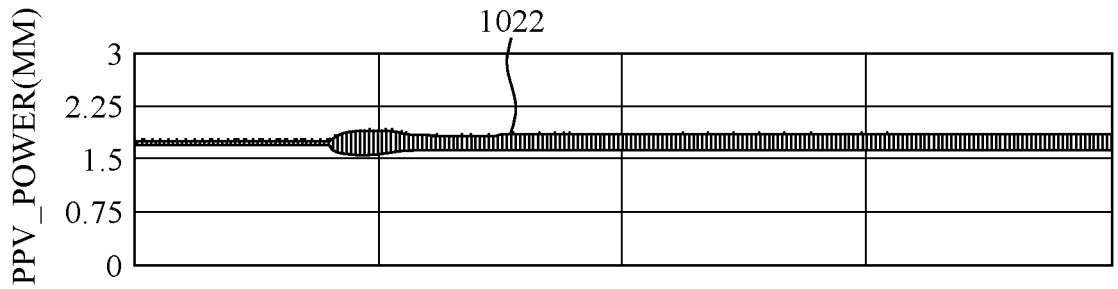
FIG. 10C is an exemplary graph showing powers generated by the PV array, the wind turbine and the diesel generator, according to certain embodiments.
Figure 10C:
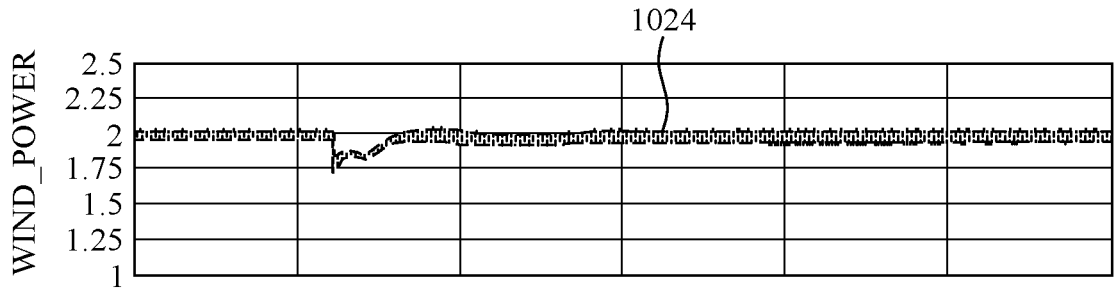
Figure 10C:
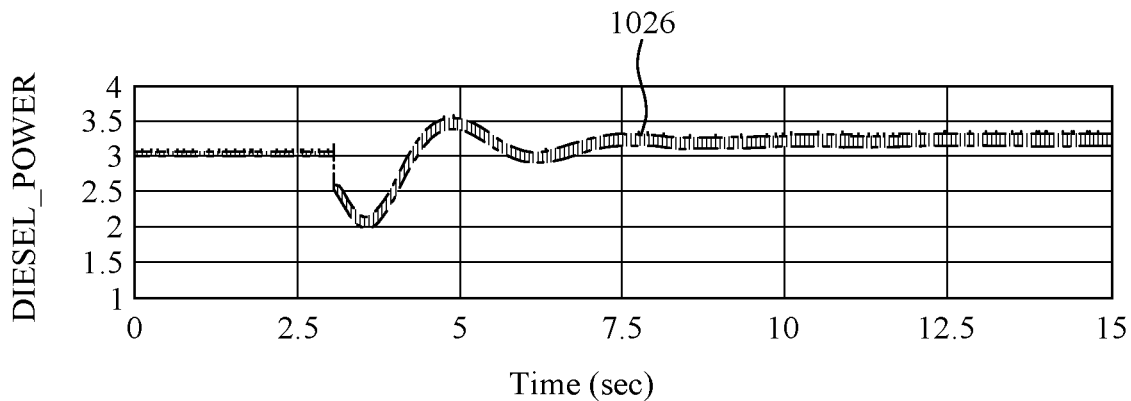

FIG. 10C is an exemplary graph showing powers generated by the PV array 114, wind turbine 112, and diesel generator 108. FIG. 10C (1) illustrates a signal 1022 corresponding to $PPV_{power}$ (power generated by the PV array 114). FIG. 10C (2) illustrates a signal 1024 corresponding to $Wind_{power}$ (active power generated by the wind turbine 112). FIG. 10C (3) illustrates a signal 1026 corresponding to $Diesel_{power}$ (active power generated by the diesel generator 108). The total load dropped from 7.2 MW in grid connected mode to 6.751 MW in island mode because of the loss of the grid reactive power. The PV array 114 and the DFIG wind turbine 112 are operated at unity power factor operation with constant P-Q control mode and are not participating in regulating the bus voltages as depicted in FIG. 10C.

Figure 10D:
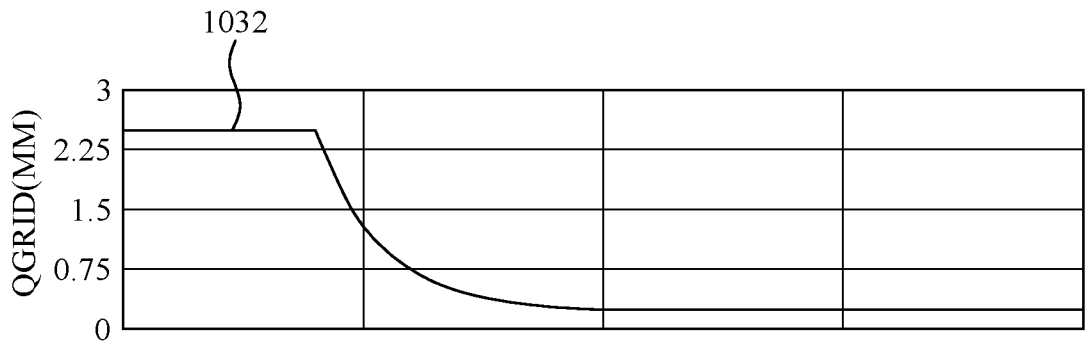
FIG. 10D is an exemplary graph showing grid, DERs, and load reactive powers, according to certain embodiments.
Figure 10D:
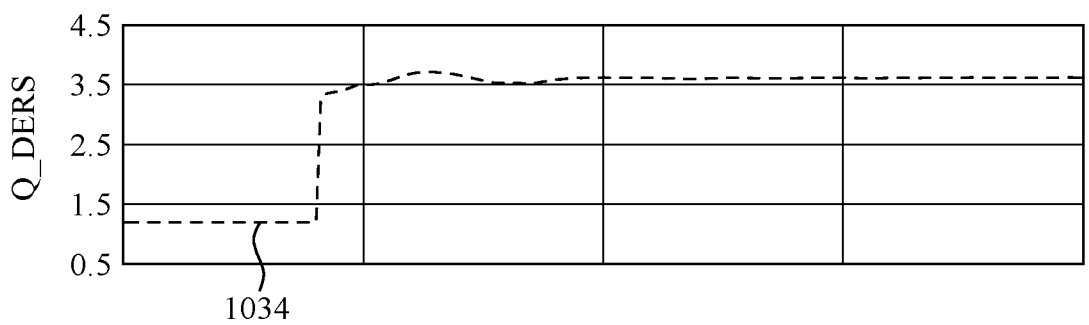
Figure 10D:
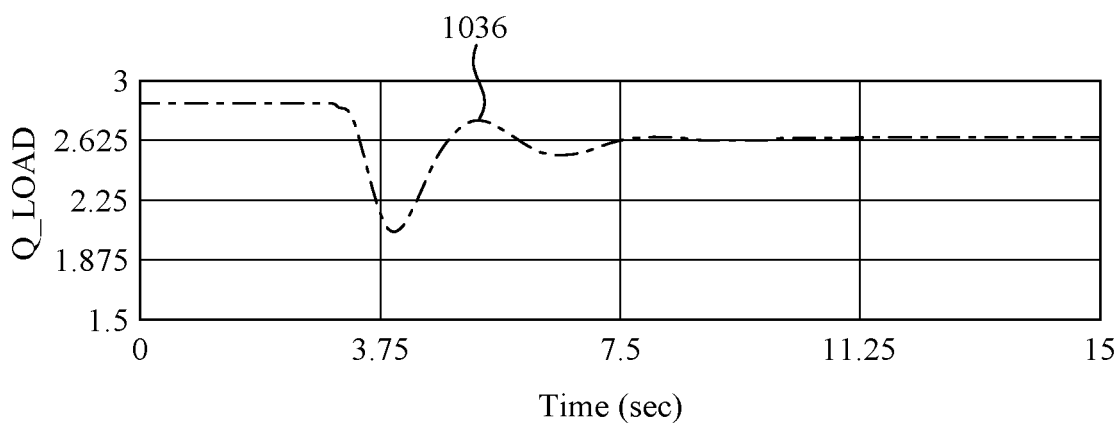

FIG. 10D is an exemplary graph showing utility grid, DERs and load reactive powers. Similar to the grid connected mode, the PV and the DFIG wind turbine generate an active power of 1.74 MW and 2 MW, respectively. The power generated from the diesel generator 108 has increased in the island mode to meet the load demand, and the reactive power lost from the grid disconnection is also picked up by the diesel generator 108, as shown in FIG. 10D, which presents the total reactive power of the DERs and the loads. FIG. 10D (1) illustrates a signal 1032 corresponding to $Q_{GRID}$ (reactive power generated by the utility grid). FIG. 10D (2) illustrates a signal 1034 corresponding to $Q_{DERS}$ (reactive power generated by the DERs). FIG. 10D (3) illustrates a signal 1036 corresponding to $Q_{LOAD}$ (reactive power consumed by the loads).

Figure 10E:
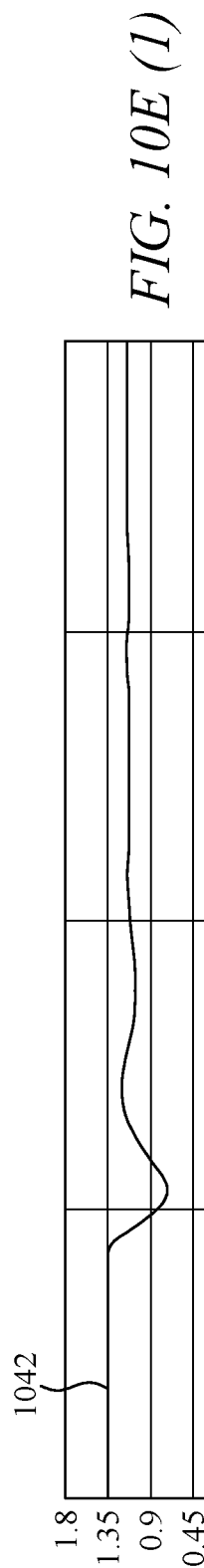
FIG. 10E is an exemplary graph showing non-critical load active powers (loads at bus 1-4), according to certain embodiments.
Figure 10E:
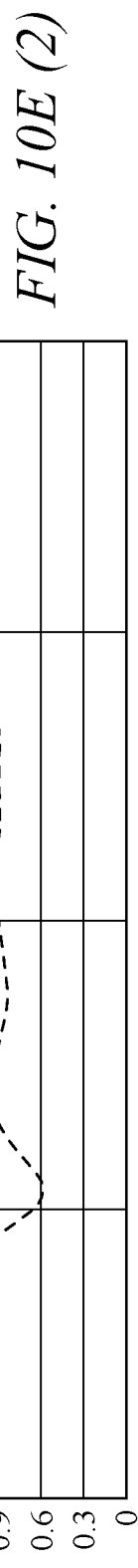
Figure 10E:
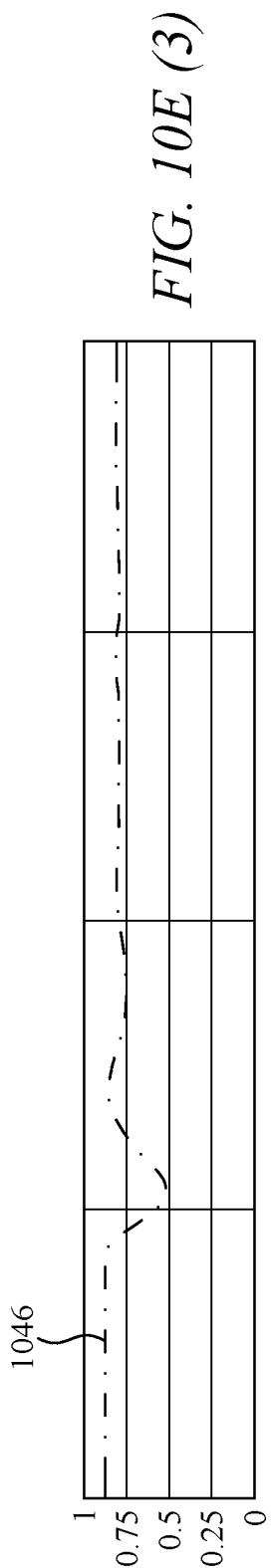
Figure 10E:
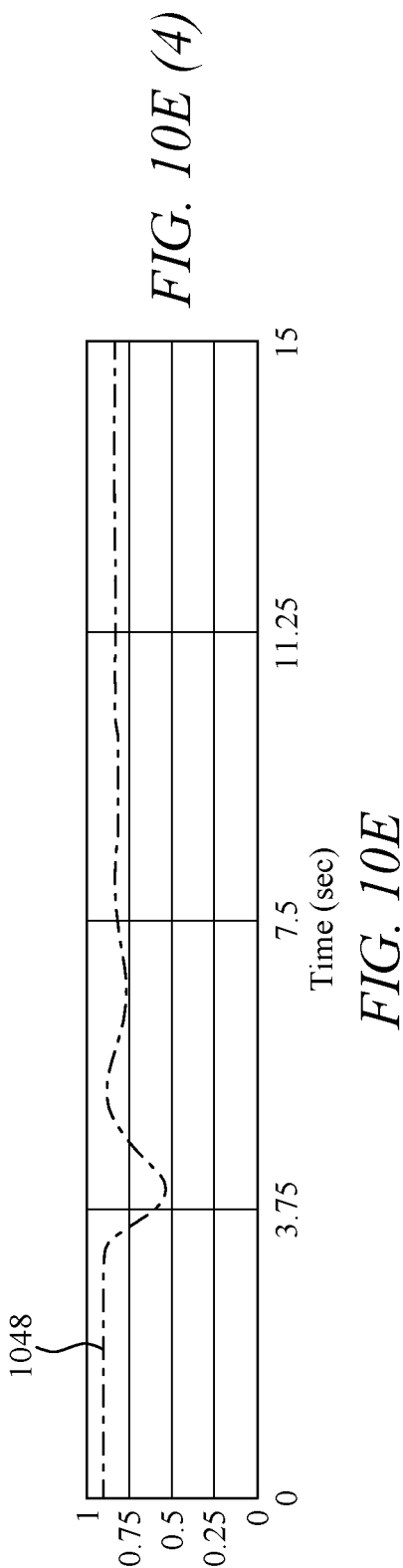

FIG. 10E is an exemplary graph showing non-critical load active powers (loads at bus 1-4). The active powers of the constant impedance loads connected on bus 1-4 is affected by the voltage drop. FIG. 10E (1) illustrates a signal 1042 corresponding to $P_{LOAD1}$ (active power consumed by the non-critical load 1). FIG. 10E (2) illustrates a signal 1044 corresponding to $P_{LOAD2}$ (active power consumed by the non-critical load 2). FIG. 10E (3) illustrates a signal 1046 corresponding to $P_{LOAD3}$ (active power consumed by the non-critical load 3). FIG. 10E (4) illustrates a signal 1046 corresponding to $P_{LOAD4}$ (active power consumed by the non-critical load 4).

FIG. 10F is an exemplary graph showing critical load active powers (loads at bus 5-7). The loads on bus 5-7 are represented as dynamic loads, which despite the drop in the bus voltages keep their active power at the power set points. FIG. 10F (1) illustrates a signal 1052 corresponding to $P_{LOAD5}$ (active power consumed by the critical load 5). FIG. 10E (2) illustrates a signal 1054 corresponding to $P_{LOAD6}$ (active power consumed by the critical load 6). FIG. 10E (3) illustrates a signal 1056 corresponding to $P_{LOAD7}$ (active power consumed by the critical load 7).

Figure 10G:
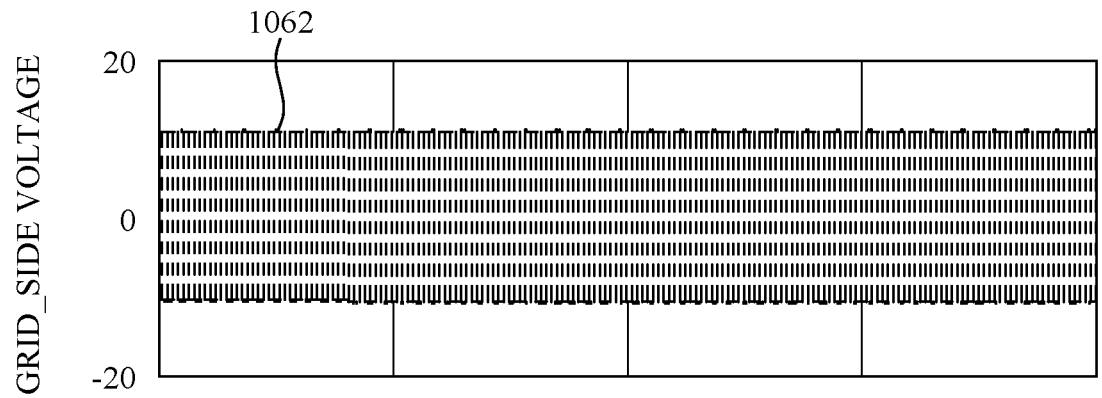
FIG. 10G is an exemplary graph showing microgrid voltage at a point of common coupling PCC, according to certain embodiments.
Figure 10G:
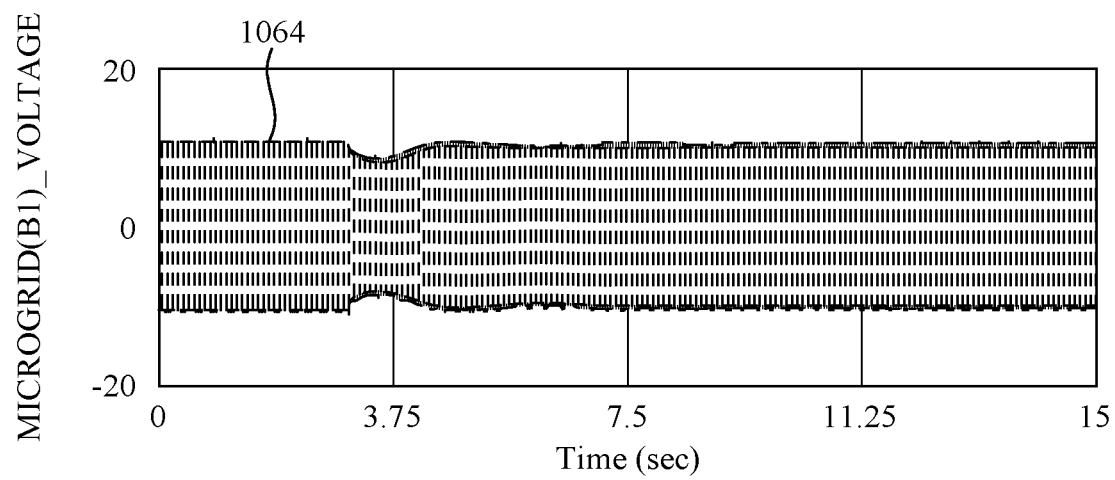

FIG. 10G is an exemplary graph showing utility grid voltage and microgrid voltage at the PCC 116, according to certain embodiments. FIG. 10G (1) illustrates a signal 1062 corresponding to the utility grid voltage. FIG. 10G (2) illustrates a signal 1064 corresponding to microgrid side voltage. The microgrid voltage at the PCC 116 is kept at its rated value as presented in FIG. 10G (2).

Figure 11:
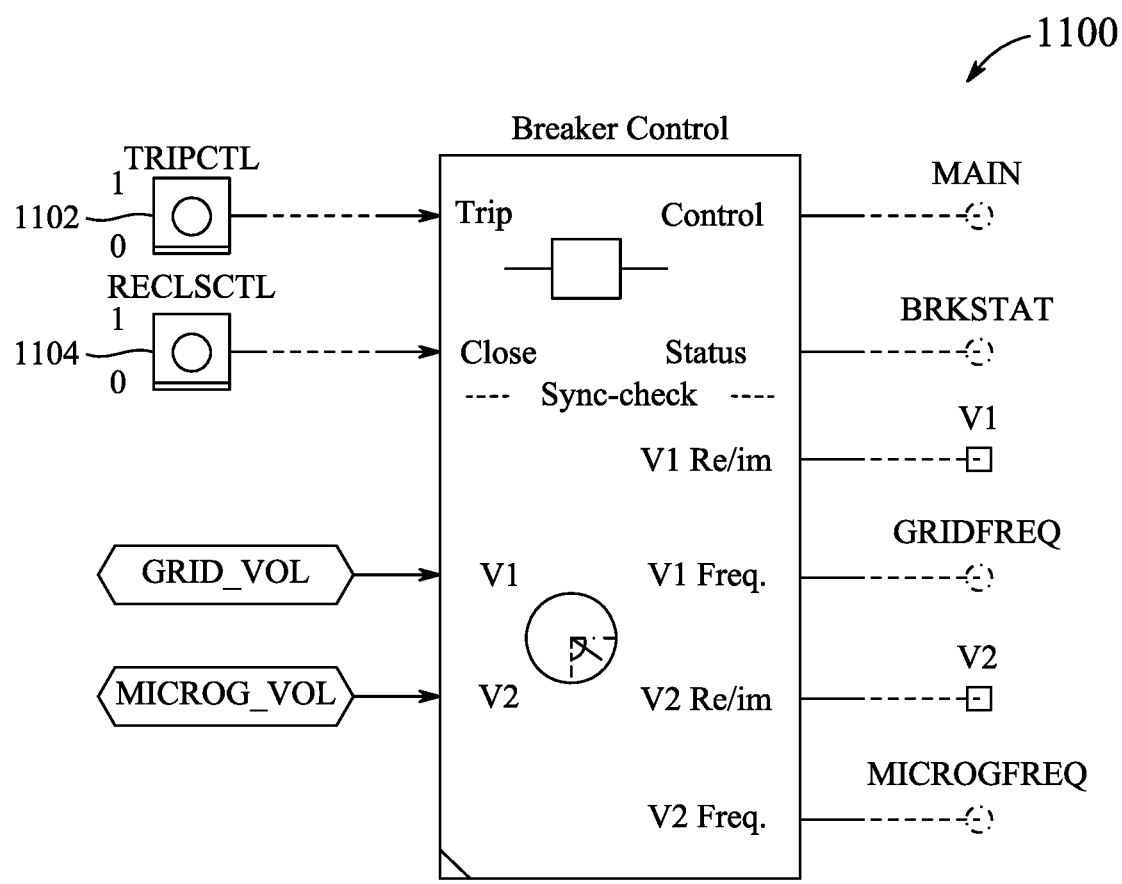
FIG. 11 is an exemplary design for a microgrid synchronization checker, according to certain embodiments.

FIG. 11 is an exemplary design for a microgrid synchronization checker 1100, according to certain embodiments.

The microgrid 106 supplies the local load when it is switched to island mode due to some network event, such as a fault on the utility grid 102. Once the fault is cleared, the microgrid 106 has to be reconnected to the utility grid 102 to restore normal operation. The voltage, phase angle and frequency of an islanded microgrid at the PCC (bus-B1) should be brought within the acceptable limits as given in Table 3 before resynchronization with the utility grid 102. The standards applied for DGs rated above 1500 kVA from Table 3 are considered here and a passive synchronization method is implemented using a synchro-check element (microgrid synchronization checker) as shown in FIG. 11. The synchro check relay 120 measures the voltage magnitude, phase angle, and frequency on either side of a circuit breaker and compares them with the preset specified limits. The synchro check relay 120 allows the circuit breaker to close if the measured values are within some preset limits. The synchro check relay 120 is a voltage measuring relay designed to be used when two power systems are to be connected together. In an example, the synchro check relay 120 may be used for both synchro-check functions and voltage-check functions. The synchro-check function is used when two separate networks or two electrically interconnected network sections are to be connected together. The voltage-check function is used when a disconnected bus/line is to be connected to an energized section of a network. The synchro-check function allows circuit breaker closing if the voltages on both sides of the circuit breaker fulfill the preset conditions as to magnitude, phase, and frequency difference.

The islanding and resynchronization signals are manually controlled by the TRIPCTL 1102 and RECLSCTL 1104 pushbuttons to demonstrate the synchronization of the microgrid back to the utility grid 102.

FIG. 12A-12E are diagrams of various measured parameters during the synchronization mode.

Figure 12A:
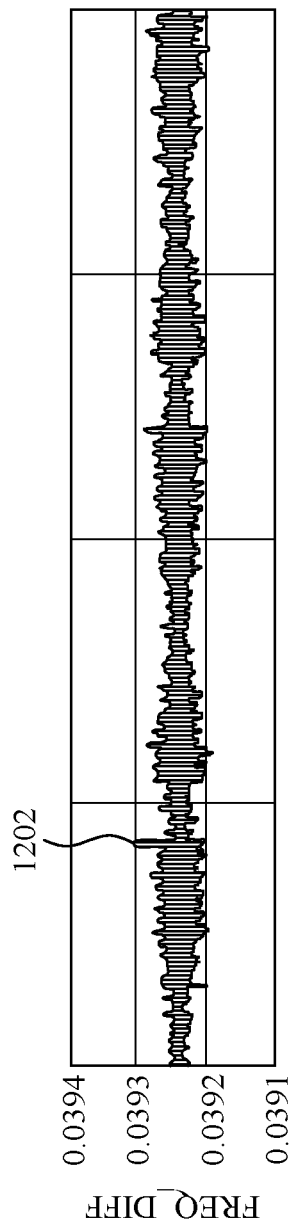
FIG. 12A is an exemplary result illustrating a measured frequency, voltage, and angle differences at the PCC before synchronization (island mode), according to certain embodiments.
Figure 12A:
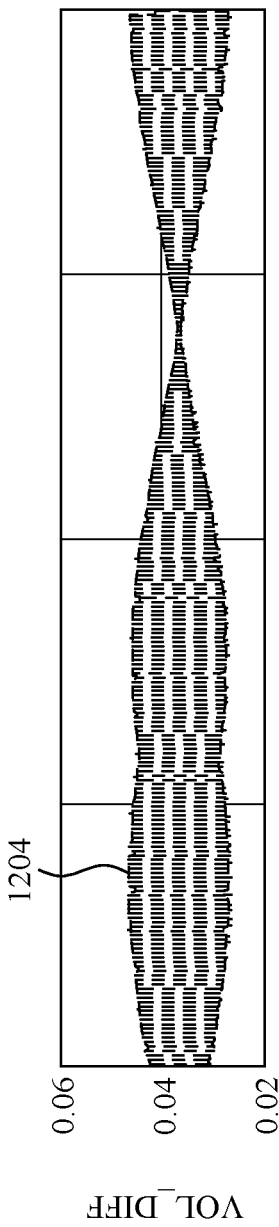
Figure 12A:
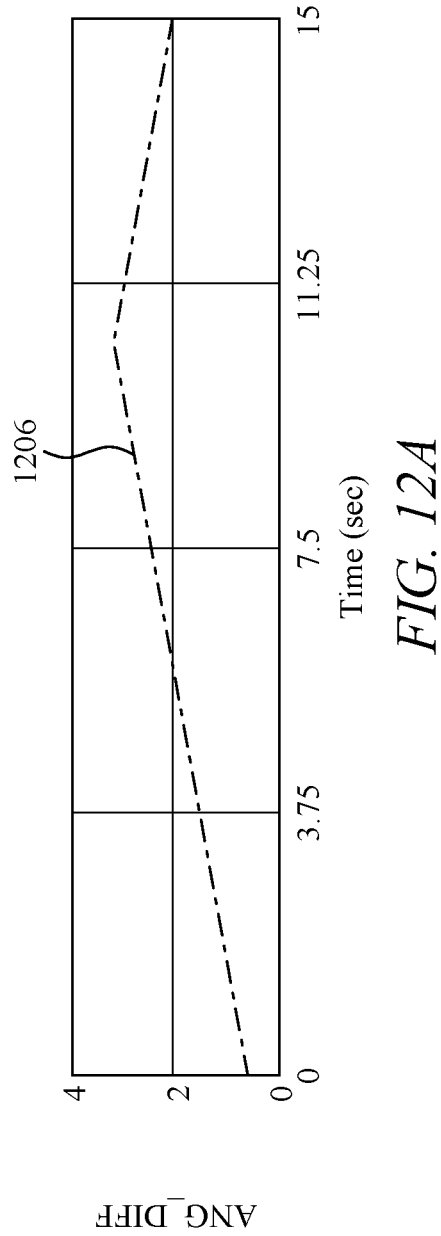

FIG. 12A shows the frequency, voltage, and angle differences of the microgrid 106. The angle and frequency differences are less than 10 degrees and 0.04%, respectively, and are within the synchronization limits tabulated in Table 3. However, the voltage difference is greater than the recommended 3% to avoid heating in induction machine based DERs, that is, the DFIG wind turbine 112, and uncharacteristic harmonics generated by converter interfaced DERs.

Synchronization would not be possible in this scenario unless the voltage difference is brought down within the limit specified in Table 3. FIG. 12A (1) illustrates a signal 1202 corresponding to $Freq_{diff}$ (frequency difference). FIG. 12A (2) illustrates a signal 1204 corresponding to $Vol_{diff}$ (voltage difference). FIG. 12A (3) illustrates a signal 1206 corresponding to $Ang_{diff}$ (angle difference).

Figure 12B:
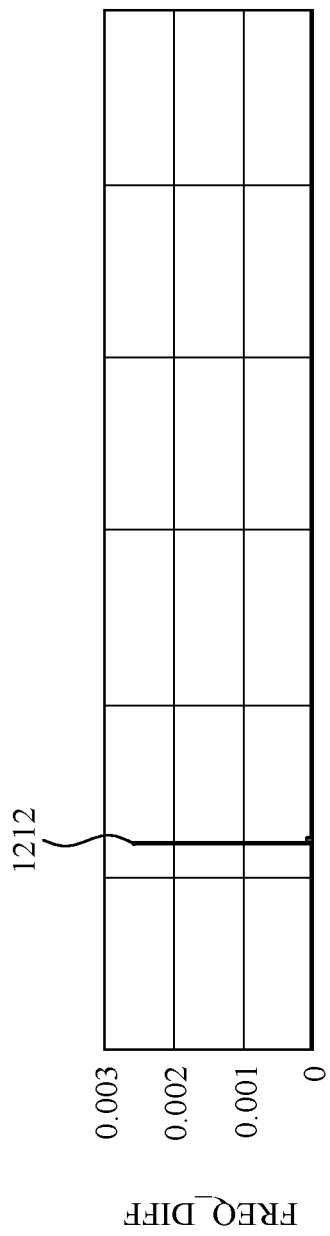
FIG. 12B is an exemplary result illustrating a measured frequency, voltage, and angle differences at the PCC after synchronization, according to certain embodiments.
Figure 12B:
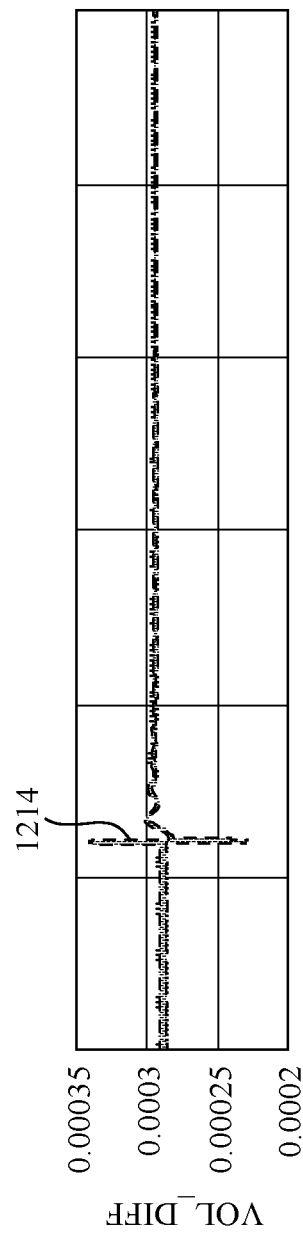
Figure 12B:
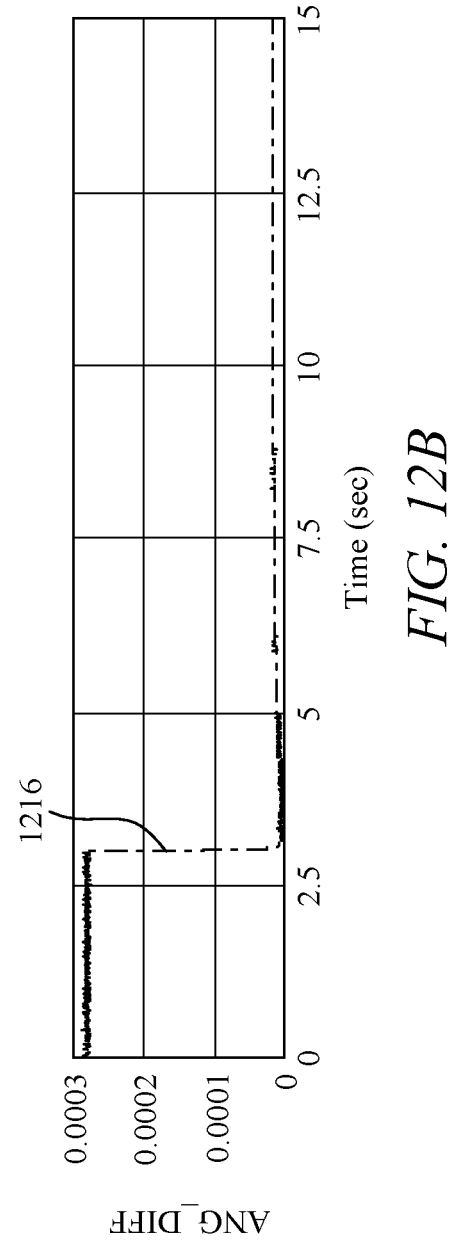

FIG. 12B is an exemplary result illustrating the measured frequency, voltage, and angle differences at the PCC 116 after synchronization, according to certain embodiments. To bring the difference within a range according to Table 3, the three switched capacitor banks connected to the PCC at bus-B1 were turned on until the voltage difference met the required criteria of 3%. The switched capacitors were turned on manually to provide the needed reactive power at the PCC 116 as shown in FIG. 12B, where the phase voltage difference was reduced to the permissible value required for resynchronization. FIG. 12B (1) illustrates a signal 1212 corresponding to the $Freq_{diff}$ (frequency difference) after synchronization. FIG. 12B (2) illustrates a signal 1214 corresponding to the $Vol_{diff}$ (voltage difference) after synchronization. FIG. 12B (3) illustrates a signal 1216 corresponding to the $Ang_{diff}$ (angle difference) after synchronization.

Figure 12C:
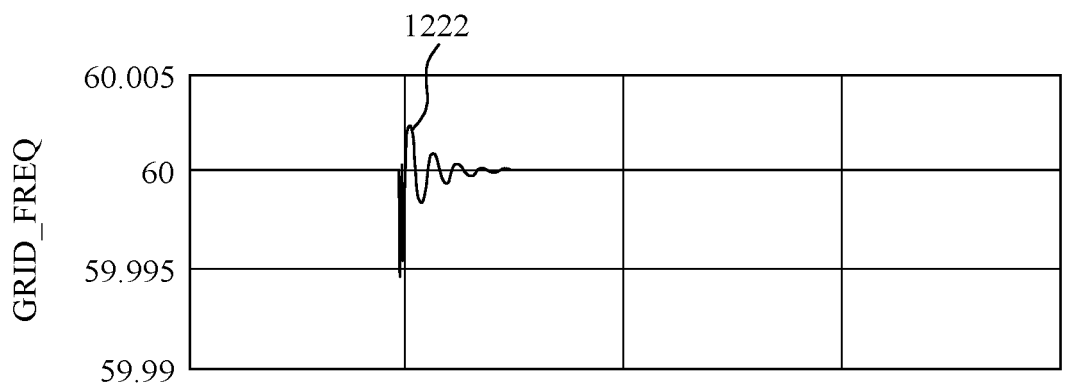
FIG. 12C is an exemplary result illustrating measured frequencies of the utility grid and microgrid, according to certain embodiments.
Figure 12C:
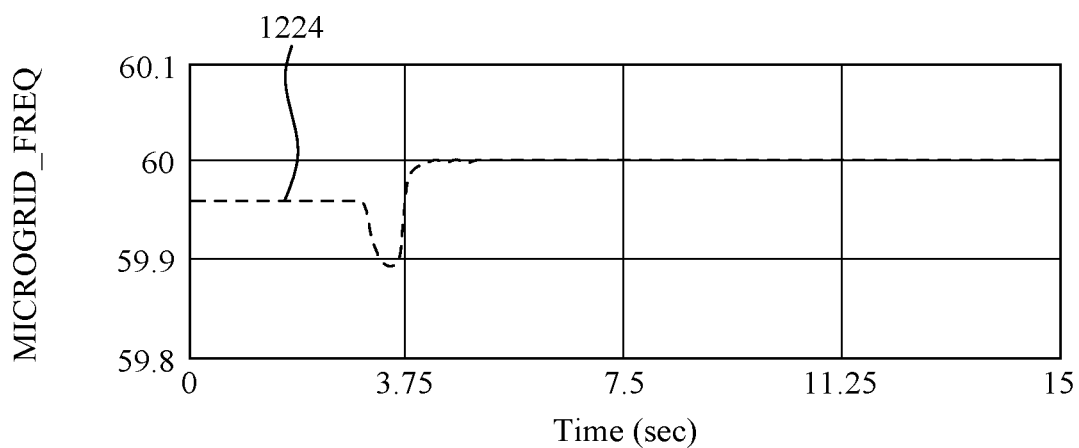

FIG. 12C is an exemplary result illustrating measured frequencies of the utility grid 102 and microgrid 106. Once the microgrid 106 is synchronized, the utility grid 102 controls the frequency as presented in FIG. 12C. FIG. 12C (1) illustrates a signal 1222 corresponding to the $Grid_{freq}$ (frequency of the utility grid 102) after synchronization. FIG. 12C (2) illustrates a signal 1224 corresponding to the $Microgrid_{freq}$ (frequency of the microgrid 106) after synchronization.

Figure 12D:
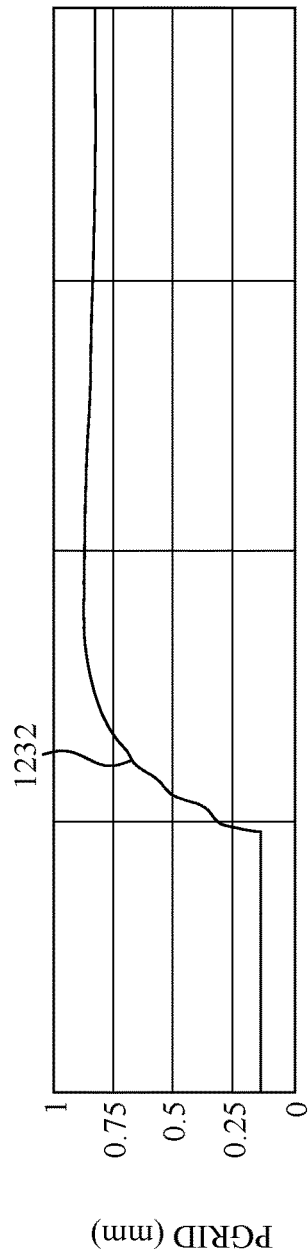
FIG. 12D is an exemplary result illustrating a measured utility grid, DERs and load active powers after synchronization, according to certain embodiments.
Figure 12D:
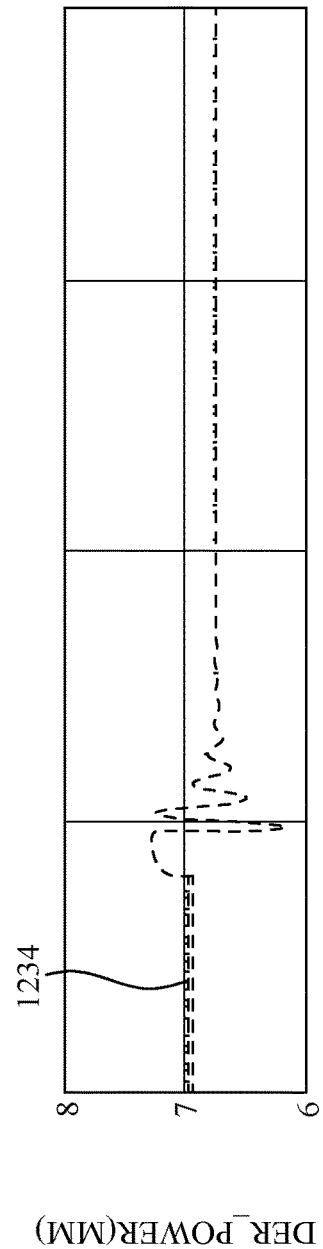
Figure 12D:
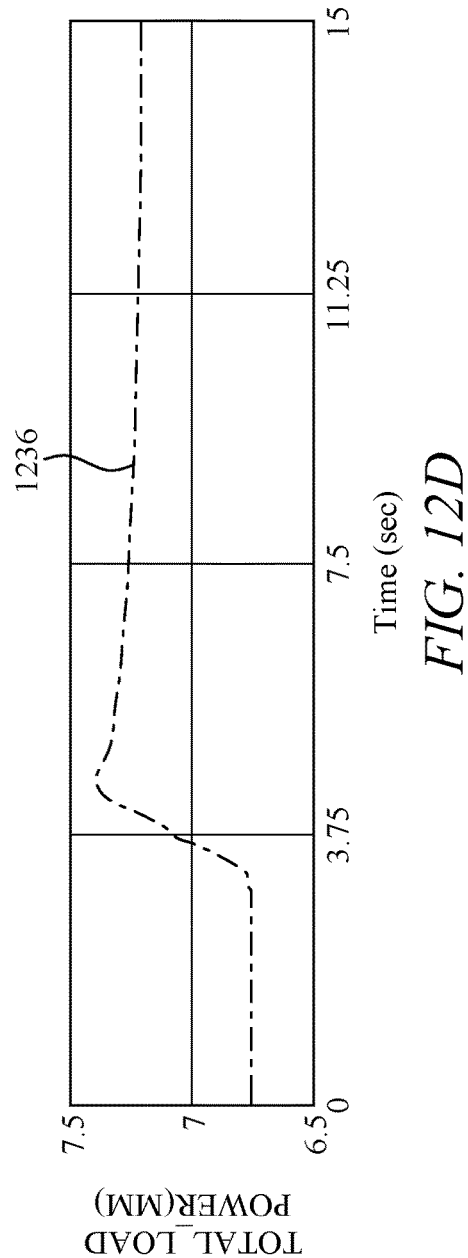

FIG. 12D is an exemplary result illustrating a measured utility grid 102, DERs and load active powers after synchronization, according to certain embodiments. After synchronization, the microgrid 106 and the utility grid 102 operate in parallel similar to the utility grid connected scenario presented in section A with the grid supporting both active and reactive power. FIG. 12D (1) illustrates a signal 1232 corresponding to the $P_{GRID}$ (active power generated by the utility grid 102). FIG. 12D (2) illustrates a signal 1234 corresponding to the $P_{DERS}$ (active power generated by the DERs). FIG. 12D (3) illustrates a signal 1236 corresponding to the $P_{LOAD}$ (active power consumed by the loads 124). FIG. 12D depicts the utility grid, the DERS, and the power consumed by the loads after synchronization which match the results presented in FIG. 9A.

Figure 12E:
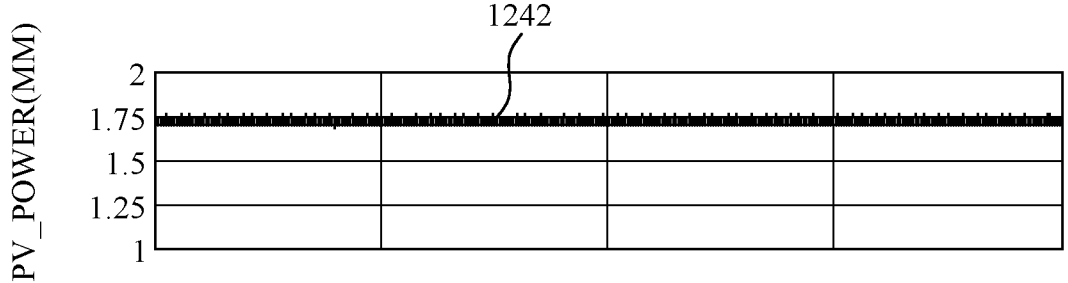
FIG. 12E is an exemplary result illustrating a measured PV, DFIG and diesel generator generated active powers after synchronization, according to certain embodiments.
Figure 12E:
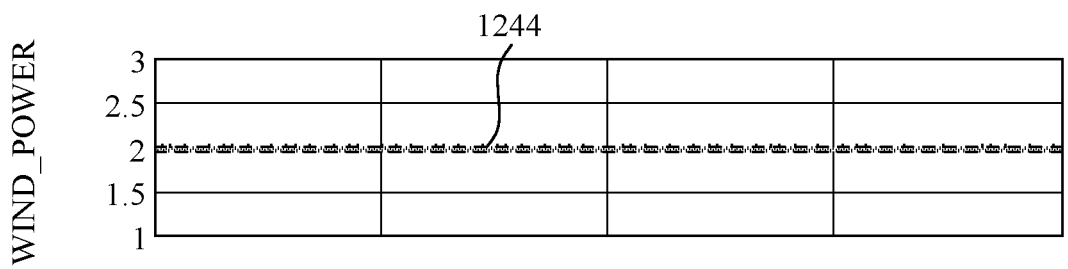
Figure 12E:
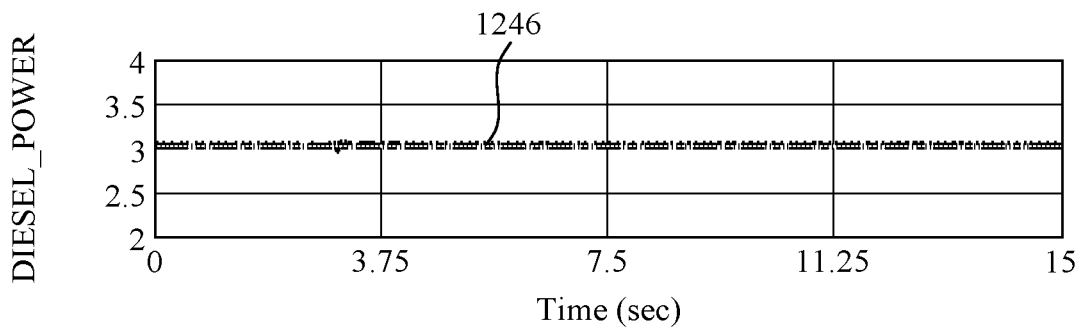

FIG. 12E is an exemplary result illustrating active powers generated by the PV array 114, the DFIG wind turbine 112, and the diesel generator 108 after synchronization, according to certain embodiments. The PV array 114, wind turbine 112, and diesel generator 108 generate their corresponding preset powers after synchronization. FIG. 12E (1) illustrates a signal 1242 corresponding to the $PPV_{power}$ (active power generated by the PV array 114). FIG. 12E (2) illustrates a signal 1244 corresponding to the $Wind_{power}$ (active power generated by the wind turbine 112). FIG. 12E (3) illustrates a signal 1246 corresponding to the $Diesel_{power}$ (active power generated by the diesel generator 108).

In some examples, two types of bus control are used in power grid operations and in power flow studies. PQ control is an unregulated bus. It is defined to hold the active power P and reactive power Q constant at a bus while the voltage is allowed to vary (unregulated) over some range that is limited. PV control uses a regulated bus. It is defined to hold both the active power P and the bus voltage V constant. It is considered to be regulated because the voltage is held constant to the extent that the regulating control has the capability to allow the reactive power to vary within limits. The present disclosure provides efficient power management, voltage balancing and synchronization control of the microgrid 106 based on the PV array 114, the DFIG based wind turbine 112, the diesel generator 108 and local loads. The CIGRE medium voltage benchmark test system was used to demonstrate the controller's capability. The power management control regulate the power supplied to the critical and non-critical loads using the power generated from the DERs and the utility grid in both grid and island modes of operation. The microgrid voltage and frequency is maintained at the rated value by the utility grid during grid connected mode and in the island mode by the diesel generator 108 in isochronous operation. In the island mode, the diesel generator 108 provides reactive power to regulate the voltage and maintains a constant speed irrespective of the load to regulate the microgrid frequency. The simulation results show that the distribution generators (PV array and wind turbine) supplied the maximum active power and zero reactive power during normal operation. A passive synchronization approach using a synchro check relay 120 was employed to match the microgrid voltage magnitude, frequency and phase angle for synchronization. Switched capacitor banks 122 are connected at the PCC 116 for balancing the voltage for microgrid synchronization. The results show that the control methods managed the microgrid in both grid connected and island modes and improved the system stability and reliability.

Figure 13:
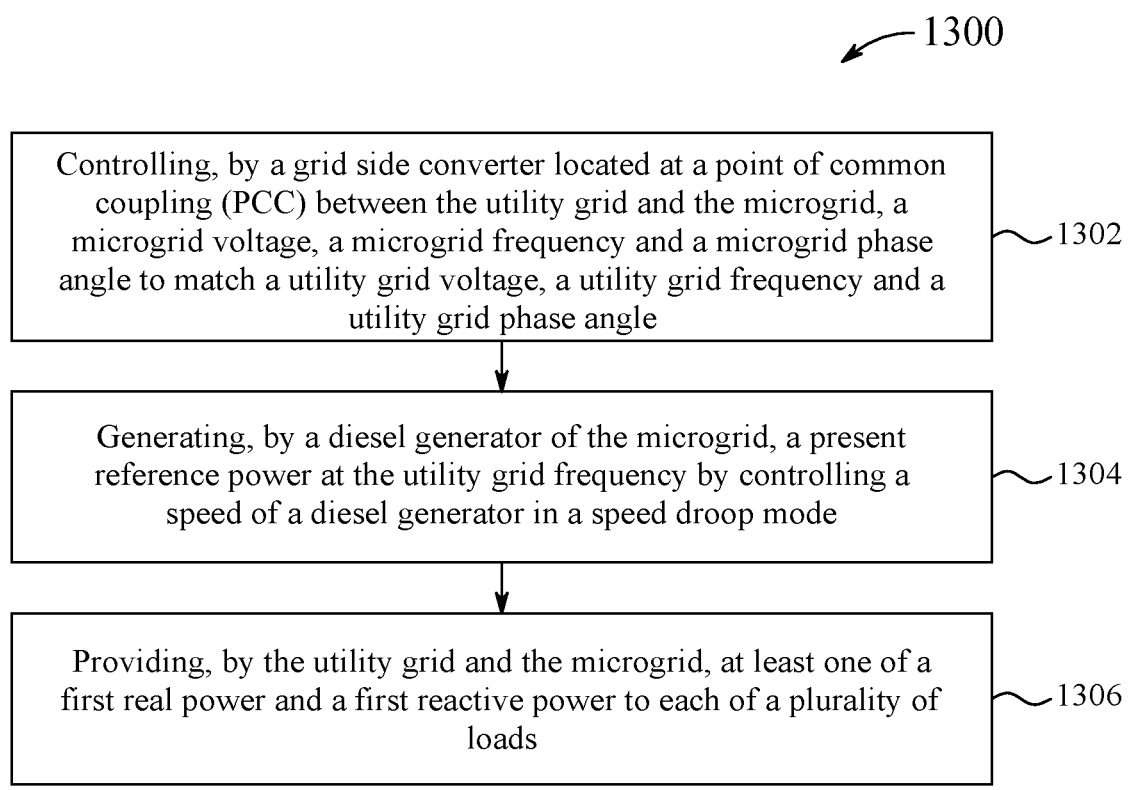
FIG. 13 is a flow chart for synchronizing the utility grid and the microgrid in a grid connected mode, according to certain embodiments.

FIG. 13 is flow chart 1300 for synchronizing a utility grid 102 and a microgrid 106 in the grid connected mode, according to certain embodiments.

Step 1302 includes controlling a microgrid voltage, a microgrid frequency and a microgrid phase angle by a grid side converter 118 such that the microgrid voltage, the microgrid frequency, and the microgrid phase angle match to a utility grid voltage, a utility grid frequency, and a utility grid phase angle, respectively. In an example, the grid side converter 118 is located at a point of common coupling (PCC) 116 between the utility grid 102 and the microgrid 106.

Step 1304 includes generating a preset reference power at the utility grid frequency by controlling a speed of a diesel generator 108 in a speed droop mode by a diesel generator 108 of the microgrid 106.

Step 1306 includes providing at least one of a first real power and a first reactive power to each of a plurality of loads 124 by the utility grid 102 and the microgrid 106.

A method of the present disclosure includes a step of receiving, by a proportional integral (SG-PI) speed governor controller, a utility grid frequency reference signal, a utility grid voltage reference signal $V_{ref}$, a droop reference signal, a power reference signal, and a shaft frequency. The SG-PI speed governor controller is connected to the diesel generator 108.

The method further includes connecting the wind turbine 112 to a doubly fed induction generator (DFIG); connecting a stator of the wind turbine 112 to a transformer; connecting a rotor of the wind turbine 112 to a rotor side converter; connecting the rotor side converter in parallel with a capacitor; connecting the capacitor in parallel to a grid side converter; connecting the grid side converter 118 in series with a resistor and an inductor; connecting the inductor to the transformer; and connecting the transformer to the first DC-AC voltage source converter.

The method further includes storing the utility grid frequency reference signal, the utility grid voltage reference signal $V_{ref}$, the droop reference signal, the power reference signal and the shaft frequency by the SG-PI speed governor controller.

The method further includes subtracting the shaft frequency from the reference shaft frequency and generating a power value by the SG-PI speed governor controller.

The method further includes generating a power signal by dividing the power value by a speed droop reference value and subtracting the power signal from the power reference signal to generate a power error signal.

The method further includes a step of amplifying, by an amplifier circuit, the power error signal to generate an amplified frequency signal.

The method further includes adding the amplified frequency signal to the power error signal and generating a shaft frequency signal.

The method further includes delaying, by a delay circuit, the shaft frequency signal.

The method further includes dividing the delayed shaft frequency signal by the utility grid frequency and generating a torque signal.

The method further includes transmitting the torque signal to the diesel generator 108 and generating, by the diesel generator 108, the real and reactive power based on the torque signal.

The method further includes a step of transmitting, by the diesel generator controller 110, the utility grid voltage reference signal and the diesel generator 108 output frequency to the wind turbine, and transmitting, by the diesel generator controller 110, the utility grid voltage reference, $V_{ref}$, signal to an MPPT circuit of the PV array 114.

The method further includes controlling the grid side converter 118 in a decoupled d-q current control mode at the utility grid frequency with a unity power factor, providing a portion of the first real power to the plurality of loads plurality of loads 124.

The method further includes transmitting, by the diesel generator controller 110, a set of DFIG voltage reference control signals, $m_{DR}$, and $m_{QR}$, to the rotor side converter (RSC) 510, wherein $m_{DR}$ regulates a rotor side DC voltage and a rotor side active power of the rotor side converter, and $m_{QR}$ regulates a rotor side AC voltage of a reactive power of the RSC 510.

The method further includes transmitting, by the diesel generator controller 110, a set of grid voltage reference control signals, $m_{DG}$, and $m_{QG}$, to the GSC 512, wherein $m_{DG}$ regulates a grid side DC voltage and a grid side active power of the grid side converter, and $m_{QG}$ regulates a grid side AC voltage of a reactive power of the GSC 512.

Figure 14:
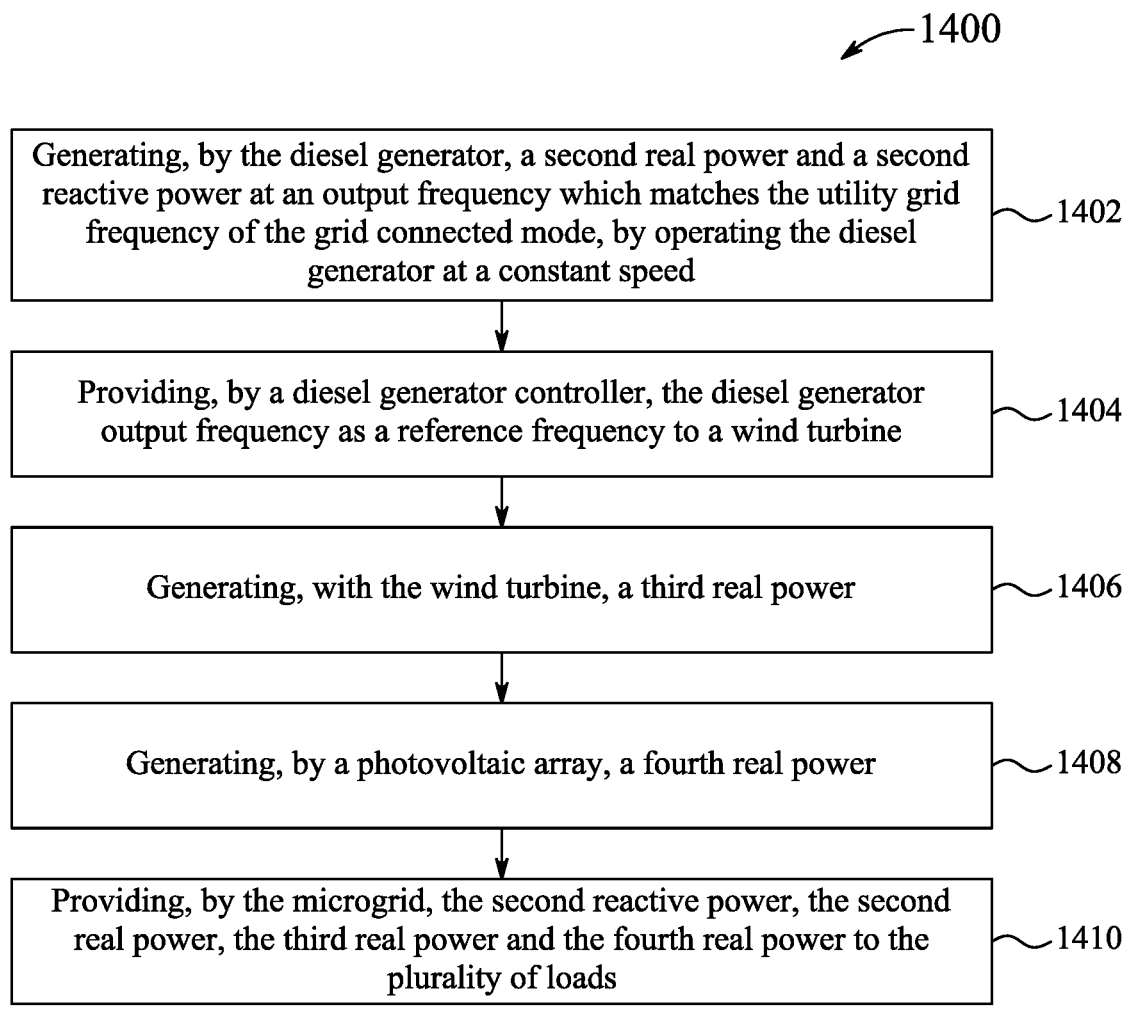
FIG. 14 is a flow chart for synchronizing the utility grid and the microgrid in an island mode, according to certain embodiments.

FIG. 14 is flow chart 1400 for synchronizing the utility grid 102 and the microgrid 106 when the microgrid 106 in the island mode, according to certain embodiments.

Step 1402 includes generating, by the diesel generator 108, a second real power and a second reactive power at an output frequency which matches the utility grid frequency of the grid connected mode, by operating the diesel generator 108 at a constant speed.

Step 1404 includes providing, by a diesel generator controller 110, the diesel generator output frequency as a reference frequency to a wind turbine.

Step 1406 includes generating a third real power with the wind turbine 112.

Step 1408 includes generating a fourth real power by the photovoltaic array 114.

Step 1410 includes providing, by the microgrid, the second reactive power, the second real power, the third real power, and the fourth real power to the plurality of loads plurality of loads 124.

The method of the present disclosure further includes adding, by an adder, a power reference signal, and an amplifier feedback signal to generate a power error signal.

The method further includes amplifying, by an amplifier circuit, the power error signal to generate an amplified frequency signal.

The method further includes adding the amplified frequency signal to the power error signal and generating a shaft frequency signal.

The method further includes delaying, by a delay circuit, the shaft frequency signal.

The method further includes dividing the delayed shaft frequency signal by the utility grid frequency and generating a torque signal.

The method further includes transmitting the torque signal to the diesel generator 108 and generating, by the diesel generator 108, the real and reactive power based on the torque signal.

The method further includes operating the doubly fed induction generator in a constant P-Q control mode at the reference frequency with a unity power factor to provide the third real power to the plurality of loads 124.

Figure 15:
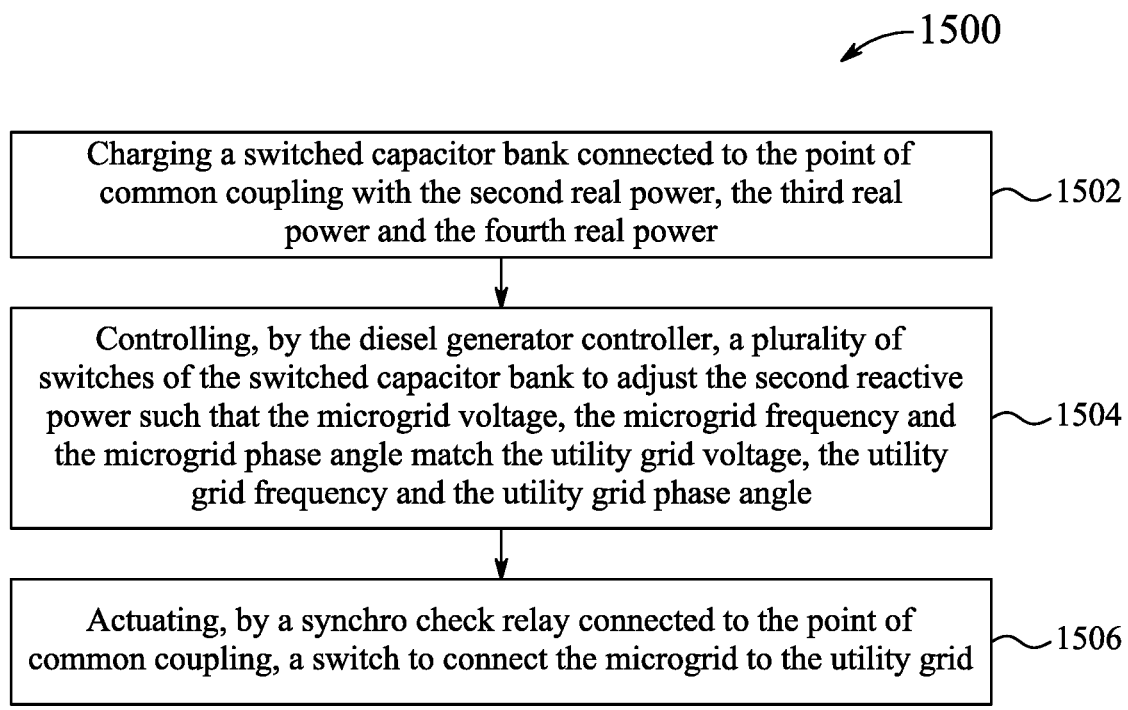
FIG. 15 is a flow chart for operating the utility grid and the microgrid in a resynchronization mode, according to certain embodiments.

FIG. 15 is flow chart 1500 for operating the utility grid 102 and the microgrid 106 in a resynchronization mode, according to certain embodiments.

Step 1502 includes charging a switched capacitor bank 122 connected to the point of common coupling 116 with the second real power, the third real power and the fourth real power.

Step 1504 includes controlling, by the diesel generator controller 110, a plurality of switches of the switched capacitor bank 122 to adjust the second reactive power such that the microgrid voltage, the microgrid frequency and the microgrid phase angle match the utility grid voltage, the utility grid frequency and the utility grid phase angle.

Step 1506 includes actuating, by a synchro check relay 120 connected to the point of common coupling 116, a switch to connect the microgrid 106 to the utility grid 102.

The method of the present disclosure further includes a step of connecting the diesel generator 108 to an AC-AC voltage source converter. The method further includes connecting the wind turbine 112 to a first DC-AC voltage source converter. The method further includes connecting the photovoltaic array 114 to a second DC-AC voltage source converter. The method further includes connecting each of the AC-AC voltage source converter, the first DC-AC voltage source converter, and the second DC-AC voltage source converter to the point of common coupling 116.

The method further includes generating a voltage, $V_{PV}$, and a current, $I_{PV}$, by the photovoltaic array, PV; applying the voltage, $V_{PV}$, and the current, $I_{PV}$, to a maximum power point tracking, MPPT, circuit; receiving, from the controller of the diesel generator 108, a reference voltage, $V_{ref}$; subtracting the voltage, $V_{PV}$, from the voltage reference, $V_{ref}$, to generate an error voltage value; applying the error voltage value to a photovoltaic array proportional integral, PV-PI, controller; generating, by the PV-PI controller, a duty cycle control signal based on the error voltage value; applying the voltage, $V_{PV}$, the current, $I_{PV}$, and the duty cycle signal to a DC-DC buck converter connected in parallel with the photovoltaic array; generating a DC voltage, $V_{DC}$, by the DC-DC buck converter; and connecting the DC-DC buck converter to the second DC-AC voltage source converter; and converting the DC voltage, $V_{DC}$, by the second DC-AC voltage source converter, to a three phase voltage, wherein each phase has a magnitude of the DC voltage at a frequency of the duty cycle signal.

The method further includes calculating, by the PV-PI controller, the duty cycle signal based on:

$$\text{Duty} = (V_{ref} - V_{PV}) \cdot \left(k_P + \frac{k_I}{s}\right),$$

where $k_p$ is a proportional constant of the PV-PI controller, $k_I$ is an integral constant of the PV-PI controller, and s is an output variable of a Laplace transform of the PV-PI controller.

When operating in the grid connected mode:

The method further includes setting a frequency of the duty cycle signal to match the utility grid frequency; and controlling the second DC-AC voltage source converter in a decoupled d-q current control mode at the utility grid frequency with a unity power factor to provide a portion of the first real power to the plurality of loads 124.

When operating in the island mode:

The method further includes setting the frequency of the duty cycle signal to match the reference frequency; and controlling the second DC-AC voltage source converter in a decoupled d-q current control mode at the reference frequency with a unity power factor to provide the fourth real power to the plurality of loads 124.

The method further includes transmitting, by the diesel generator controller 110, a set of photovoltaic array voltage reference control signals, $m_D$, and $m_Q$, to the second DC-AC voltage source converter, wherein $m_D$ regulates the DC voltage and the active power, and $m_Q$ regulates the AC voltage.

The first embodiment is illustrated with respect to FIG. 1 to FIG. 15. The first embodiment describes a method for synchronizing the utility grid 102 and the microgrid 106. When operating the utility grid 102 and the microgrid 106 in a grid connected mode, the method includes controlling, by a grid side converter 118 located at a point of common coupling (PCC) between the utility grid 102 and the microgrid 106, a microgrid voltage, a microgrid frequency and a microgrid phase angle to match a utility grid voltage, a utility grid frequency and a utility grid phase angle; generating, by a diesel generator 108 of the microgrid, a preset reference power at the utility grid frequency by controlling a speed of a diesel generator 108 in a speed droop mode; and providing, by the utility grid and the microgrid, at least one of a first real power and a first reactive power to each of a plurality of loads 124. When operating the microgrid 106 in an island mode, the method includes generating, by the diesel generator 108, a second real power and a second reactive power at an output frequency which matches the utility grid frequency of the grid connected mode, by operating the diesel generator 108 at a constant speed; providing, by a diesel generator controller 110, the diesel generator output frequency as a reference frequency to a wind turbine; generating, with the wind turbine 112, a third real power; generating, by the photovoltaic array 114, a fourth real power; and providing, by the microgrid, the second reactive power, the second real power, the third real power and the fourth real power to the plurality of loads 124. When operating the utility grid 102 and the microgrid 106 in a resynchronization mode, the method includes charging a switched capacitor bank 122 connected to the point of common coupling 116 with the second real power, the third real power and the fourth real power; controlling, by the diesel generator controller 110, a plurality of switches of the switched capacitor bank 122 to adjust the second reactive power such that the microgrid voltage, the microgrid frequency and the microgrid phase angle match the utility grid voltage, the utility grid frequency and the utility grid phase angle; and actuating, by a synchro check relay 120 connected to the point of common coupling 116, a switch to connect the microgrid to the utility grid 102.

The method further includes connecting the diesel generator 108 to an AC-AC voltage source converter; connecting the wind turbine 112 to a first DC-AC voltage source converter; connecting the photovoltaic array 114 to a second DC-AC voltage source converter; and connecting each of the AC-AC voltage source converter, the first DC-AC voltage source converter and the second DC-AC voltage source converter to the point of common coupling.

When operating in the grid connected mode, the method further includes receiving, by a proportional integral (SG-PI) speed governor controller connected to the diesel generator 108, a utility grid frequency reference signal, a utility grid voltage reference signal, a droop reference signal, a power reference signal and a shaft frequency; storing, by the SG-PI speed governor controller, the utility grid frequency reference signal, the utility grid voltage reference signal, the droop reference signal, the power reference signal and the shaft frequency; subtracting the shaft frequency from the reference shaft frequency; generating, by the SG-PI speed governor controller, a power value; generating a power signal by dividing the power value by a speed droop reference value; subtracting the power signal from the power reference signal to generate a power error signal; amplifying, by an amplifier circuit, the power error signal to generate an amplified frequency signal; adding the amplified frequency signal to the power error signal; generating a shaft frequency signal; delaying, by a delay circuit, the shaft frequency signal; dividing the delayed shaft frequency signal by the utility grid frequency; generating a torque signal; transmitting the torque signal to the diesel generator 108; and generating, by the diesel generator 108, the real and reactive power based on the torque signal.

When operating in island mode, the method further includes adding, by an adder, a power reference signal and an amplifier feedback signal to generate a power error signal; amplifying, by an amplifier circuit, the power error signal to generate an amplified frequency signal; adding the amplified frequency signal to the power error signal; generating a shaft frequency signal; delaying, by a delay circuit, the shaft frequency signal; dividing the delayed shaft frequency signal by the utility grid frequency; generating a torque signal; transmitting the torque signal to the diesel generator 108; and generating, by the diesel generator 108, the real and reactive power based on the torque signal.

The method further includes transmitting, by the diesel generator controller 110, the utility grid voltage reference signal and the diesel generator output frequency to the wind turbine; and transmitting, by the diesel generator controller 110, the utility grid voltage reference, $V_{ref}$, signal to an MPPT circuit of the photovoltaic array 114.

The method further includes connecting the wind turbine to a doubly fed induction generator, DFIG; connecting a stator of the wind turbine to a transformer; connecting a rotor of the wind turbine to a rotor side converter; connecting the rotor side converter in parallel with a capacitor; connecting the capacitor in parallel to a grid side converter; connecting the grid side converter 118 in series with a resistor and an inductor; connecting the inductor to the transformer; and connecting the transformer to the first DC-AC voltage source converter.

The method further includes, in the grid connected mode, controlling the grid side converter 118 in a decoupled d-q current control mode at the utility grid frequency with a unity power factor to provide a portion of the first real power to the plurality of loads; and in the island mode, operating the doubly fed induction generator in a constant P-Q control mode at the reference frequency with a unity power factor to provide the third real power to the plurality of loads 124.

The method further includes transmitting, by the diesel generator controller 110, a set of DFIG voltage reference control signals, $m_{DR}$, and $m_{QR}$, to the rotor side converter, wherein $m_{DR}$ regulates a rotor side DC voltage and a rotor side active power of the rotor side converter, and $m_{QR}$ regulates a rotor side AC voltage of a reactive power of the rotor side converter.

The method further includes transmitting, by the diesel generator controller 110, a set of grid voltage reference control signals, $m_{DG}$, and $m_{QG}$, to the grid side converter, wherein $m_{DG}$ regulates a grid side DC voltage and a grid side active power of the grid side converter, and $m_{QG}$ regulates a grid side AC voltage of a reactive power of the grid side converter.

The method further includes generating a voltage, $V_{PV}$, and a current, $I_{PV}$, by the photovoltaic array, PV; applying the voltage, $V_{PV}$, and the current, $I_{PV}$, to a maximum power point tracking, MPPT, circuit; receiving, from the controller of the diesel generator 108, a reference voltage, $V_{ref}$; subtracting the voltage, $V_{PV}$, from the voltage reference, $V_{ref}$, to generate an error voltage value; applying the error voltage value to a photovoltaic array 114 proportional integral, PV-PI, controller; generating, by the PV-PI controller, a duty cycle control signal based on the error voltage value; applying the voltage, $V_{PV}$, the current, $I_{PV}$, and the duty cycle signal to a DC-DC buck converter connected in parallel with the photovoltaic array; generating a DC voltage, $V_{DC}$, by the DC-DC buck converter; and connecting the DC-DC buck converter to the second DC-AC voltage source converter; and converting the DC voltage, $V_{DC}$, by the second DC-AC voltage source converter, to a three phase voltage, wherein each phase has a magnitude of the DC voltage at a frequency of the duty cycle signal.

The method further includes calculating, by the PV-PI controller, the duty cycle signal based on $$\text{Duty} = (V_{ref} - V_{PV}) \cdot \left(k_P + \frac{k_I}{s}\right),$$

where $k_p$ is a proportional constant of the PV-PI controller, $k_I$ is an integral constant of the PV-PI controller, and s is an output variable of a Laplace transform of signals input to the PV-PI controller.

When operating in the grid connected mode, the method includes setting a frequency of the duty cycle signal to match the utility grid frequency; and controlling the second DC-AC voltage source converter in a decoupled d-q current control mode at the utility grid frequency with a unity power factor to provide a portion of the first real power to the plurality of loads 124.

When operating in the island mode, the method further includes setting the frequency of the duty cycle signal to match the reference frequency; and controlling the second DC-AC voltage source converter in a decoupled d-q current control mode at the reference frequency with a unity power factor to provide the fourth real power to the plurality of loads 124.

The method further includes transmitting, by the diesel generator controller 110, a set of photovoltaic array voltage reference control signals, $m_D$, and $m_Q$, to the second DC-AC voltage source converter, wherein $m_D$ regulates the DC voltage and the active power, and $m_Q$ regulates the AC voltage.

The second embodiment is illustrated with respect to FIG. 1 to FIG. 15. The second embodiment describes a system 100 for synchronization of the utility grid 102 and the microgrid 106. The system 100 includes the utility grid 102 including a grid side controller 104, wherein the utility grid 102 is configured to operate at a utility grid voltage, a utility grid frequency and a utility grid phase angle; a grid side converter 118 configured to transmit the utility grid voltage, the utility grid frequency and the utility grid phase angle to the microgrid; a diesel generator 108 located in the microgrid in parallel with the utility grid; a diesel generator controller 110 connected to the diesel generator 108, wherein the diesel generator controller 110 is configured to calculate a power, and store the utility grid voltage, the utility grid frequency, and the power reference; a wind turbine 112 located in the microgrid 106 in parallel with the utility grid 102; a photovoltaic array 114 located in the microgrid in parallel with the utility grid 102; a point of common coupling (PCC) 116 switchably connected between the utility grid 102 and the microgrid 106; the synchro check relay 120 connected to the PCC 116; a switched capacitor bank 122 connected between the synchro check relay 120 and the microgrid 106; and a plurality of loads 124 connected to the microgrid 106.

When the system 100 operates in a grid connected mode, the microgrid 106 is configured to match a microgrid voltage, a microgrid frequency and a microgrid phase angle to the utility grid voltage, the utility grid frequency and the utility grid phase angle respectfully, generate at least one of a first real power and a first reactive power, and transmit the at least one of the first real power and the first reactive power to each of the plurality of loads 124. The diesel generator 108 is configured to operate in a speed droop mode When the system 100 operates in an island mode, the diesel generator controller 110 is configured to provide the stored utility grid frequency and power reference to the diesel generator 108. The diesel generator 108 is configured to operate at a constant angular speed to generate a second real and reactive power at a diesel generator frequency, which matches the stored power reference and stored utility grid frequency, respectively. The diesel generator controller 110 is configured to transmit the stored utility grid voltage and the diesel generator frequency as a wind turbine reference voltage and a wind turbine reference frequency respectively to the wind turbine and to transmit the stored utility grid voltage and diesel generator frequency to the photovoltaic array 114 as a photovoltaic array reference voltage and photovoltaic array reference frequency, respectively.

The diesel generator 108, the wind turbine and the photovoltaic array 114 are configured to generate at least one of a first real power and a reactive power and transmit at least one of the first real power and the reactive power to each of the plurality of loads 124.

When the system 100 operates in a resynchronization mode, the switched capacitor bank 122 is configured to be charged by the first real power produced by the microgrid 106; the diesel generator controller 110 is configured to actuate a plurality of switches of the switched capacitor bank to adjust the reactive power such that the microgrid voltage, the microgrid frequency and the microgrid phase angle match the utility grid voltage, the utility grid frequency and the utility grid phase angle; and the synchro check relay 120 is configured to actuate the switch to connect the microgrid 106 to the utility grid 102.

The system 100 further includes an AC-AC voltage source converter connected to the diesel generator 108; a first DC-AC voltage source converter connected to the wind turbine; and a second DC-AC voltage source converter connected to the PV array 114, wherein each of the AC-AC voltage source converter, the first DC-AC voltage source converter and the second DC-AC voltage source converter are connected to the PCC 116.

In the grid connected mode, the system 100 further includes a proportional integral (SG-PI) speed governor controller electrically connected to the diesel generator 108, wherein the proportional integral (SG-PI) speed governor controller is configured to: subtract a shaft frequency of the diesel generator 108 from a reference shaft frequency, generate a power value, divide the power value by a droop reference value, and generate a power signal by dividing the power value by a speed droop reference value. The diesel generator controller 110 includes a subtractor configured to subtract the power signal from the power reference signal to generate a power error signal; an amplifier circuit configured to receive the power reference, compare the power reference to the real and reactive power to calculate a power error signal, and generate a shaft frequency signal based on the power error signal; and a delay circuit configured to delay the shaft frequency signal.

In the island mode, the diesel generator controller 110 includes an amplifier circuit configured to receive the power reference, compare the power reference to the real and reactive power to calculate a power error signal, and generate a shaft frequency signal based on the power error signal; a delay circuit configured to delay the shaft frequency signal; a divider configured to divide the delayed shaft frequency signal by the utility grid frequency and generate a torque signal and transmit the torque signal to the diesel generator 108; and wherein the diesel generator 108 is configured to use the torque signal to generate a second real power and the reactive power.

The system further includes DFIG connected to the wind turbine 112; a transformer connected to a stator of the wind turbine 112; a rotor side converter connected to a rotor of the wind turbine 112; a capacitor connected in parallel with the rotor side converter; a grid side converter 118 connected in parallel with the capacitor; a resistor and an inductor connected in series between the grid side converter 118 and the transformer; wherein the transformer is connected to the first DC-AC voltage source converter; wherein, when operating in the grid connected mode, the grid side converter 118 is configured to operate in a decoupled D-Q current control mode at the utility grid frequency with a unity power factor to provide a third real power to the plurality of loads 124; and wherein, when operating in the island mode, the DFIG is configured to operate in a constant P-Q control mode at the wind turbine reference frequency with a unity power factor to provide the third real power to the plurality of loads 124.

The PV array 114 is configured to generate a voltage, $V_{PV}$, and a current, $I_{PV}$; an MPPT circuit connected to the PV array 114, wherein the MPPT circuit is configured to receive the voltage, $V_{PV}$, the current, $I_{PV}$, and the photovoltaic array reference voltage, and compare the photovoltaic array reference voltage to the voltage, $V_{PV}$ to generate a voltage error signal; a photographic array proportional integral, PV-PI, controller connected to the MPPT circuit, wherein the PV-PI controller is configured to generate a duty cycle signal; a DC-DC buck converter connected to the PV array and the PV-PI controller, wherein the buck converter is configured to receive the voltage, $V_{PV}$, the current, $I_{PV}$ from the PV array and the duty cycle signal from the PV-PI controller and generate a DC voltage; wherein the DC-DC buck converter is connected to the second DC-AC voltage source converter, wherein the second DC-AC voltage source converter is configured to convert the DC voltage to a three phase voltage, wherein each phase has a magnitude of the DC voltage at the duty cycle frequency.

The PV-PI controller is configured to calculate the duty cycle signal based on:

$$\text{Duty} = (V_{ref} - V_{PV}) \cdot \left(k_P + \frac{k_I}{s}\right),$$

where $k_p$ is a proportional constant of the PV-PI controller, $k_I$ is an integral constant of the PV-PI controller, and s is an output variable of a Laplace transform of signals input to the PV-PI Controller.

When operating in the grid connected mode, the PV-PI controller is configured to set a frequency of the duty cycle signal to match the utility grid frequency; and the second DC-AC voltage source converter is configured to use a decoupled d-q current control mode at the frequency of the duty cycle with a unity power factor to provide a fourth real power to the plurality of loads 124.

When operating in the island mode, the PV-PI controller is configured to set a frequency of the duty cycle signal to match the photovoltaic array reference frequency; and the second DC-AC voltage source converter is configured to use a decoupled d-q current control mode at the photovoltaic array reference frequency with a unity power factor to provide the fourth real power to the plurality of loads 124.

A third embodiment is illustrated with respect to FIG. 1 to FIG. 15. The third embodiment describes a method for synchronizing the utility grid 102 and the microgrid 106. When operating the utility grid 102 and the microgrid 106 in the grid connected mode, the method includes controlling the microgrid 106 at a utility grid voltage, a utility grid frequency and a utility grid phase angle; generating, by a diesel generator 108 of the microgrid 106, a preset reference power at the utility grid frequency by controlling a speed of a diesel generator 108 in a speed droop mode; and providing, by the utility grid and the microgrid, at least one of a first real power and a reactive power to each of a plurality of loads 124. When operating the microgrid 106 in an island mode, the method includes operating the diesel generator 108 at a constant speed based on the utility grid frequency to output a second real power and the reactive power at a reference frequency; operating the wind turbine in a decoupled D-Q mode at the reference frequency with unity power factor to generate a third real power; generating, by a photovoltaic array, a fourth real power; and providing the reactive power, the second real power, the third real power and the fourth real power to the plurality of loads 124. When operating the utility grid 102 and the microgrid in a resynchronization mode, the method includes charging a switched capacitor bank 122 connected to the point of common coupling with the second real power, the third real power and the fourth real power; and actuating, by a synchro check relay 120 connected to the PCC 116, a switch to connect the microgrid 106 to the utility grid 102.

The method further includes connecting the diesel generator 108 to an AC-AC voltage source converter; connecting the wind turbine to a first DC-AC voltage source converter; connecting the photovoltaic array 114 to a second DC-AC voltage source converter; and connecting each of the AC-AC voltage source converter, the first DC-AC voltage source converter and the second DC-AC voltage source converter to the synchro check relay.

Figure 16:
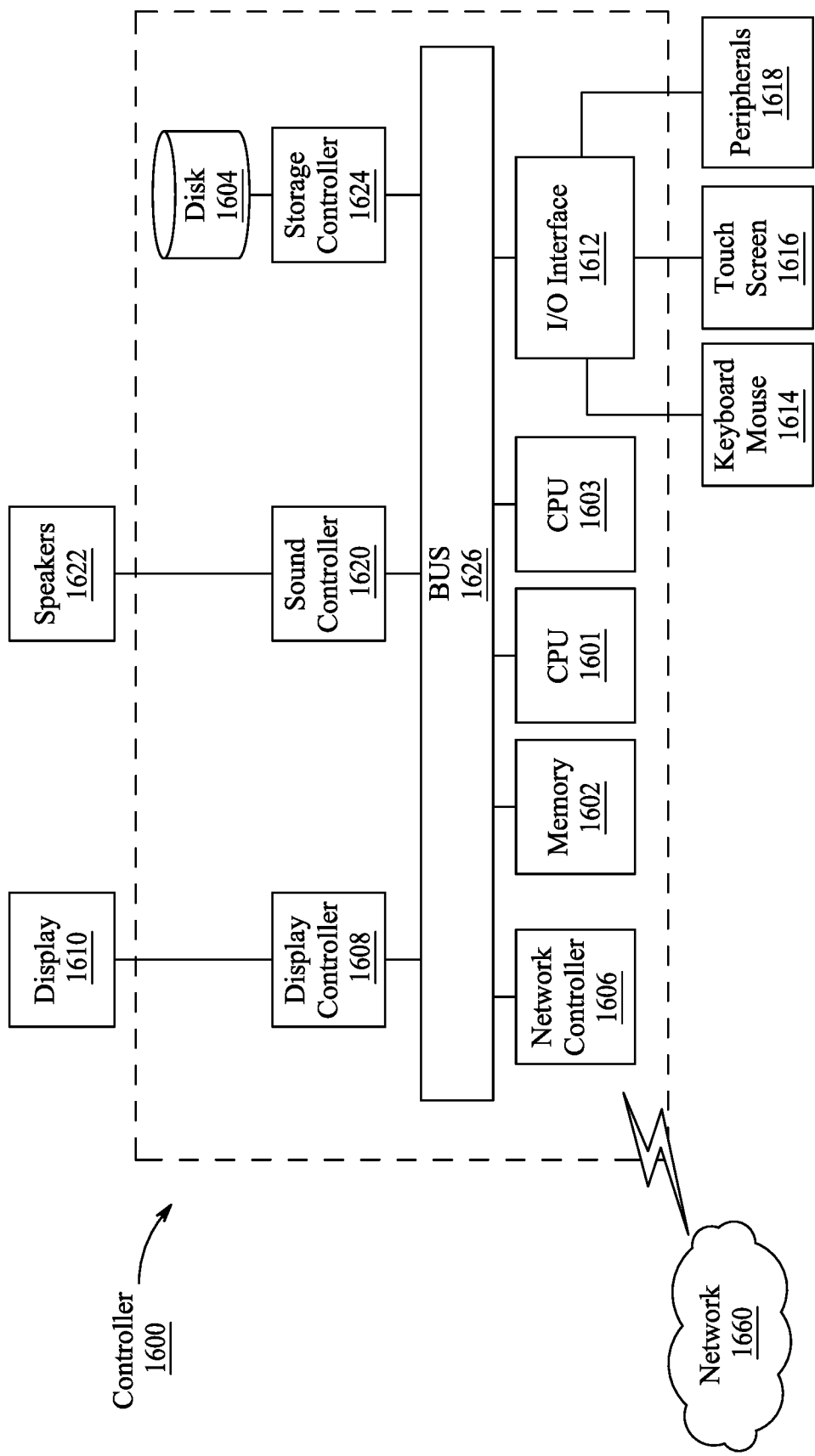
FIG. 16 is an illustration of a non-limiting example of details of computing hardware used in the computing system, according to aspects of the present disclosure.

Next, further details of the hardware description of the computing environment of FIG. 1, according to exemplary embodiments is described with reference to FIG. 16. In FIG. 16, a controller 1600 is described is representative of the system 100 of FIG. 1 in which the grid side controller 104, or/and diesel generator controller 110 is a computing device which includes a CPU 1601 which performs the processes described above/below. The process data and instructions may be stored in memory 1602. These processes and instructions may also be stored on a storage medium disk 1604 such as a hard drive (HDD) or portable storage medium or may be stored remotely.

Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claims may be provided as a utility application, background daemon, or component of an operating system, or combination thereof, executing in conjunction with CPU 1601, 1603 and an operating system such as Microsoft Windows 7, Microsoft Windows 10, UNIX, Solaris, LINUX, Apple MAC-OS and other systems known to those skilled in the art.

The hardware elements in order to achieve the computing device may be realized by various circuitry elements, known to those skilled in the art. For example, CPU 1601 or CPU 1603 may be a Xenon or Core processor from Intel of America or an Opteron processor from AMD of America, or may be other processor types that would be recognized by one of ordinary skill in the art. Alternatively, the CPU 1601, 1603 may be implemented on an FPGA, ASIC, PLD or using discrete logic circuits, as one of ordinary skill in the art would recognize. Further, CPU 1601, 1603 may be implemented as multiple processors cooperatively working in parallel to perform the instructions of the inventive processes described above.

The computing device in FIG. 16 also includes a network controller 1606, such as an Intel Ethernet PRO network interface card from Intel Corporation of America, for interfacing with network 1660. As can be appreciated, the network 1660 can be a public network, such as the Internet, or a private network such as an LAN or WAN network, or any combination thereof and can also include PSTN or ISDN sub-networks. The network 1660 can also be wired, such as an Ethernet network, or can be wireless such as a cellular network including EDGE, 3G, 4G and 5G wireless cellular systems. The wireless network can also be WiFi, Bluetooth, or any other wireless form of communication that is known.

The computing device further includes a display controller 1608, such as a NVIDIA GeForce GTX or Quadro graphics adaptor from NVIDIA Corporation of America for interfacing with display 1610, such as a Hewlett Packard HPL2445w LCD monitor. A general purpose I/O interface 1612 interfaces with a keyboard and/or mouse 1614 as well as a touch screen panel 1616 on or separate from display 1610. General purpose I/O interface also connects to a variety of peripherals 1618 including printers and scanners, such as an OfficeJet or DeskJet from Hewlett Packard.

A sound controller 1620 is also provided in the computing device such as Sound Blaster X-Fi Titanium from Creative, to interface with speakers/microphone 1622 thereby providing sounds and/or music.

The general purpose storage controller 1624 connects the storage medium disk 1604 with communication bus 1626, which may be an ISA, EISA, VESA, PCI, or similar, for interconnecting all of the components of the computing device. A description of the general features and functionality of the display 1610, keyboard and/or mouse 1614, as well as the display controller 1608, storage controller 1624, network controller 1606, sound controller 1620, and general purpose I/O interface 1612 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 17.

Figure 17:
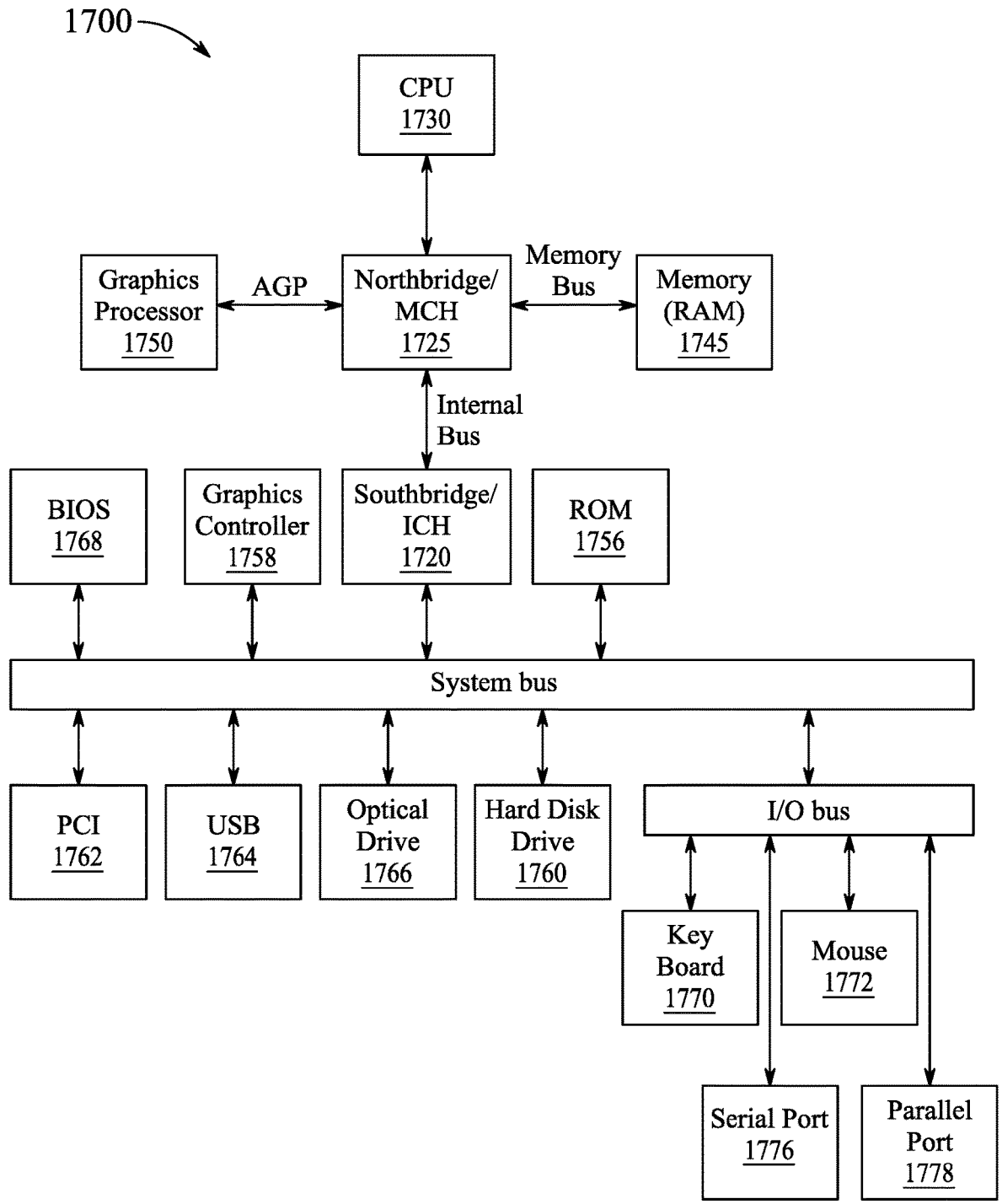
FIG. 17 is an exemplary schematic diagram of a data processing system used within the computing system, according to aspects of the present disclosure.

FIG. 17 shows a schematic diagram of a data processing system, according to certain embodiments, for performing the functions of the exemplary embodiments. The data processing system is an example of a computer in which code or instructions implementing the processes of the illustrative embodiments may be located.

In FIG. 17, data processing system 1700 employs a hub architecture including a north bridge and memory controller hub (NB/MCH) 1725 and a south bridge and input/output (I/O) controller hub (SB/ICH) 1720. The central processing unit (CPU) 1730 is connected to NB/MCH 1725. The NB/MCH 1725 also connects to the memory 1745 via a memory bus, and connects to the graphics processor 1750 via an accelerated graphics port (AGP). The NB/MCH 1725 also connects to the SB/ICH 1720 via an internal bus (e.g., a unified media interface or a direct media interface). The CPU Processing unit 1730 may contain one or more processors and even may be implemented using one or more heterogeneous processor systems.

Figure 18:
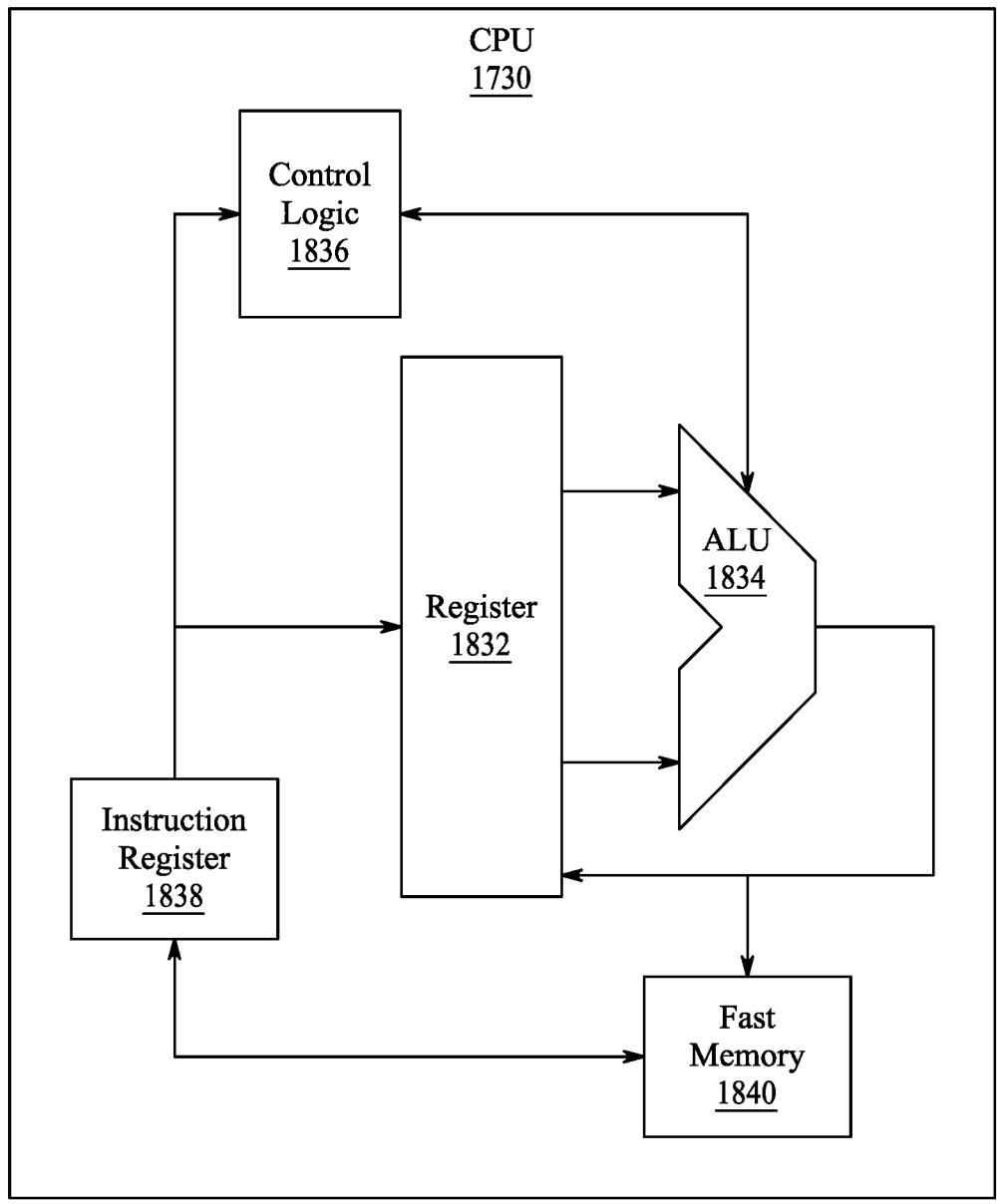
FIG. 18 is an exemplary schematic diagram of a processor used with the computing system, according to aspects of the present disclosure.

For example, FIG. 18 shows one implementation of CPU 1730. In one implementation, the instruction register 1838 retrieves instructions from the fast memory 1840. At least part of these instructions are fetched from the instruction register 1838 by the control logic 1836 and interpreted according to the instruction set architecture of the CPU 1830. Part of the instructions can also be directed to the register 1832. In one implementation the instructions are decoded according to a hardwired method, and in another implementation the instructions are decoded according to a microprogram that translates instructions into sets of CPU configuration signals that are applied sequentially over multiple clock pulses. After fetching and decoding the instructions, the instructions are executed using the arithmetic logic unit (ALU) 1834 that loads values from the register 1832 and performs logical and mathematical operations on the loaded values according to the instructions. The results from these operations can be feedback into the register and/or stored in the fast memory 1840. According to certain implementations, the instruction set architecture of the CPU 1730 can use a reduced instruction set architecture, a complex instruction set architecture, a vector processor architecture, a very large instruction word architecture. Furthermore, the CPU 1730 can be based on the Von Neuman model or the Harvard model. The CPU 1730 can be a digital signal processor, an FPGA, an ASIC, a PLA, a PLD, or a CPLD. Further, the CPU 1730 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 17, the data processing system 1700 can include that the SB/ICH 1720 is coupled through a system bus to an I/O Bus, a read only memory (ROM) 1756, universal serial bus (USB) port 1764, a flash binary input/output system (BIOS) 1768, and a graphics controller 1758. PCI/PCIe devices can also be coupled to SB/ICH 1788 through a PCI bus 862.

The PCI devices may include, for example, Ethernet adapters, add-in cards, and PC cards for notebook computers. The Hard disk drive 1760 and CD-ROM 1766 can use, for example, an integrated drive electronics (IDE) or serial advanced technology attachment (SATA) interface. In one implementation the I/O bus can include a super I/O (SIO) device.

Further, the hard disk drive (HDD) 1760 and optical drive 1766 can also be coupled to the SB/ICH 1720 through a system bus. In one implementation, a keyboard 1770, a mouse 1772, a parallel port 1778, and a serial port 1776 can be connected to the system bus through the I/O bus. Other peripherals and devices that can be connected to the SB/ICH 1720 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan would appreciate that the circuitry described herein may be adapted based on changes on battery sizing and chemistry, or based on the requirements of the intended back-up load to be powered.

Figure 19:
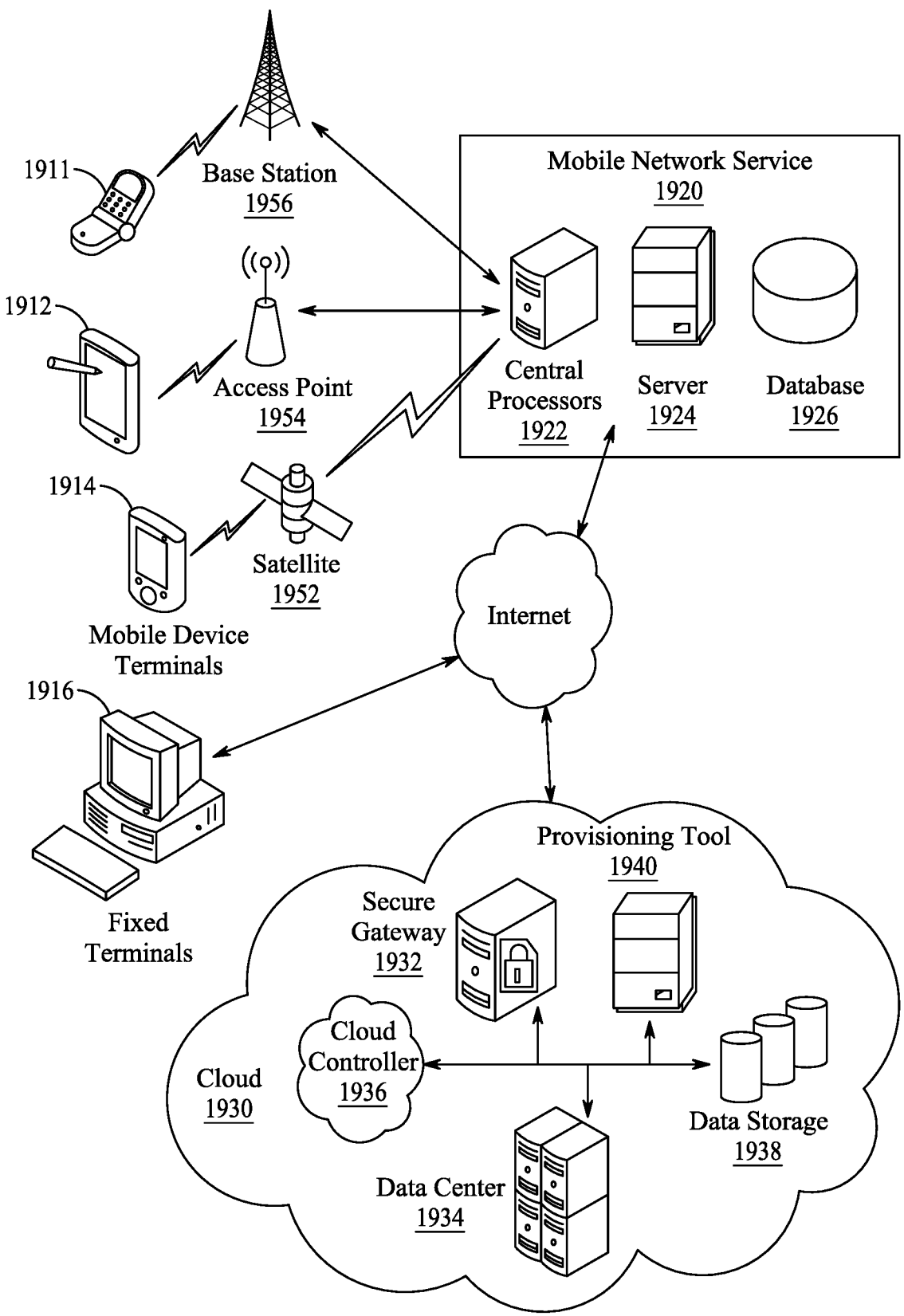
FIG. 19 is an illustration of a non-limiting example of distributed components that may share processing with the controller, according to aspects of the present disclosure.

The functions and features described herein may also be executed by various distributed components of a system. For example, one or more processors may execute these system functions, wherein the processors are distributed across multiple components communicating in a network. The distributed components may include one or more client and server machines, which may share processing, as shown by FIG. 19, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

More specifically, FIG. 19 illustrates client devices including smart phone 1911, tablet 1912, mobile device terminal 1914 and fixed terminals 1916. These client devices may be commutatively coupled with a mobile network service 1920 via base station 1956, access point 1954, satellite 1952 or via an internet connection. Mobile network service 1920 may comprise central processors 1922, server 1924 and database 1926. Fixed terminals 1916 and mobile network service 1920 may be commutatively coupled via an internet connection to functions in cloud 1930 that may comprise security gateway 1932, data center 1934, cloud controller 1936, data storage 1938 and provisioning tool 1940.

The above-described hardware description is a non-limiting example of corresponding structure for performing the functionality described herein. The above-described hardware description is a non-limiting example of corresponding structure for performing the functionality described herein.

Obviously, numerous modifications and variations of the present disclosure are possible in light of the above teachings. It is therefore to be understood that within the scope of the appended claims, the invention may be practiced otherwise than as specifically described herein.

The invention claimed is:

1. A method for synchronizing a utility grid and a microgrid, comprising:
   when operating the utility grid and the microgrid in a grid connected mode:
      controlling, by a grid side converter located at a point of common coupling (PCC) between the utility grid and the microgrid, a microgrid voltage, a microgrid frequency and a microgrid phase angle to match a utility grid voltage, a utility grid frequency and a utility grid phase angle;
      generating, by a diesel generator of the microgrid, a preset reference power at the utility grid frequency by controlling a speed of a diesel generator in a speed droop mode;
      providing, by the utility grid and the microgrid, at least one of a first real power and a first reactive power to each of a plurality of loads;
   then, when operating the microgrid in an island mode:
      generating, by the diesel generator, a second real power and a second reactive power at an output frequency which matches the utility grid frequency of the grid connected mode, by operating the diesel generator at a constant speed;

providing, by a diesel generator controller, the diesel generator output frequency as a reference frequency to a wind turbine;

generating, with the wind turbine, a third real power;

generating, by a photovoltaic array, a fourth real power;

providing, by the microgrid, the second reactive power, the second real power, the third real power and the fourth real power to the plurality of loads;

then, when operating the utility grid and the microgrid in a resynchronization mode:

charging a switched capacitor bank connected to the point of common coupling with the second real power, the third real power and the fourth real power;

controlling, by the diesel generator controller, a plurality of switches of the switched capacitor bank to adjust the second reactive power such that the microgrid voltage, the microgrid frequency and the microgrid phase angle match the utility grid voltage, the utility grid frequency and the utility grid phase angle; and actuating, by a synchro check relay connected to the point of common coupling, a switch to connect the microgrid to the utility grid.

2. The method of claim 1, further comprising:
connecting the diesel generator to an AC-AC voltage source converter;
connecting the wind turbine to a first DC-AC voltage source converter;
connecting the photovoltaic array to a second DC-AC voltage source converter; and
connecting each of the AC-AC voltage source converter, the first DC-AC voltage source converter and the second DC-AC voltage source converter to the point of common coupling.

3. The method of claim 2, wherein operating in the grid connected mode comprises:
receiving, by a proportional integral (SG-PI) speed governor controller connected to the diesel generator, a utility grid frequency reference signal, a utility grid voltage reference signal, a droop reference signal, a power reference signal and a shaft frequency;
storing, by the SG-PI speed governor controller, the utility grid frequency reference signal, the utility grid voltage reference signal, the droop reference signal, the power reference signal and the shaft frequency;
subtracting the shaft frequency from the reference shaft frequency;
generating, by the SG-PI speed governor controller, a power value;
generating a power signal by dividing the power value by a speed droop reference value;
subtracting the power signal from the power reference signal to generate a power error signal;
amplifying, by an amplifier circuit, the power error signal to generate an amplified frequency signal;
adding the amplified frequency signal to the power error signal;
generating a shaft frequency signal;
delaying, by a delay circuit, the shaft frequency signal;
dividing the delayed shaft frequency signal by the utility grid frequency;
generating a torque signal;
transmitting the torque signal to the diesel generator; and
generating, by the diesel generator, the real and reactive power based on the torque signal.

4. The method of claim 2, wherein operating in island mode comprises:
adding, by an adder, a power reference signal and an amplifier feedback signal to generate a power error signal;
amplifying, by an amplifier circuit, the power error signal to generate an amplified frequency signal;
adding the amplified frequency signal to the power error signal;
generating a shaft frequency signal;
delaying, by a delay circuit, the shaft frequency signal;
dividing the delayed shaft frequency signal by the utility grid frequency;
generating a torque signal;
transmitting the torque signal to the diesel generator; and
generating, by the diesel generator, the real and reactive power based on the torque signal.

5. The method of claim 4, further comprising:
transmitting, by the diesel generator controller, the utility grid voltage reference signal and the diesel generator output frequency to the wind turbine; and
transmitting, by the diesel generator controller, the utility grid voltage reference, $V_{ref}$, signal to an MPPT circuit of the photovoltaic array.

6. The method of claim 2, further comprising:
connecting the wind turbine to a doubly fed induction generator, DFIG;
connecting a stator of the wind turbine to a transformer;
connecting a rotor of the wind turbine to a rotor side converter;
connecting the rotor side converter in parallel with a capacitor;
connecting the capacitor in parallel to a grid side converter;
connecting the grid side converter in series with a resistor and an inductor;
connecting the inductor to the transformer; and
connecting the transformer to the first DC-AC voltage source converter.

7. The method of claim 6, further comprising:
in the grid connected mode, controlling the grid side converter in a decoupled D-Q current control mode at the utility grid frequency with a unity power factor to provide a portion of the first real power to the plurality of loads; and
in the island mode, operating the doubly fed induction generator in a constant P-Q control mode at the reference frequency with a unity power factor to provide the third real power to the plurality of loads.

8. The method of claim 7, further comprising:
transmitting, by the diesel generator controller, a set of DFIG voltage reference control signals, $m_{DR}$, and $m_{QR}$, to the rotor side converter, wherein $m_{DR}$ regulates a rotor side DC voltage and a rotor side active power of the rotor side converter, and $m_{QR}$ regulates a rotor side AC voltage of a reactive power of the rotor side converter.

9. The method of claim 8, further comprising:
transmitting, by the diesel generator controller, a set of grid voltage reference control signals, $m_{DG}$, and $m_{QG}$, to the grid side converter, wherein $m_{DG}$ regulates a grid side DC voltage and a grid side active power of the grid side converter, and $m_{QG}$ regulates a grid side AC voltage of a reactive power of the grid side converter.

10. The method of claim 2, further comprising:
generating a voltage, $V_{PV}$, and a current, $I_{PV}$, by the photovoltaic array, PV;

applying the voltage, $V_{PV}$, and the current, $I_{PV}$, to a maximum power point tracking, MPPT, circuit;

receiving, from the controller of the diesel generator, a reference voltage, $V_{ref}$;

subtracting the voltage, $V_{PV}$, from the voltage reference, $V_{ref}$, to generate an error voltage value;

applying the error voltage value to a photovoltaic array proportional integral, PV-PI, controller;

generating, by the PV-PI controller, a duty cycle control signal based on the error voltage value;

applying the voltage, $V_{PV}$, the current, $I_{PV}$, and the duty cycle signal to a DC-DC buck converter connected in parallel with the photovoltaic array;

generating a DC voltage, $V_{DC}$, by the DC-DC buck converter; and connecting the DC-DC buck converter to the second DC-AC voltage source converter; and converting the DC voltage, $V_{DC}$, by the second DC-AC voltage source converter, to a three phase voltage, wherein each phase has a magnitude of the DC voltage at a frequency of the duty cycle signal.

11. The method of claim 10, further comprising:
calculating, by the PV-PI controller, the duty cycle signal based on $$\text{Duty} = (V_{ref} - V_{PV}) \cdot \left(k_P + \frac{k_I}{s}\right),$$

where $k_p$ is a proportional constant of the PV-PI controller, $k_I$ is an integral constant of the PI controller, and s is an output variable of a Laplace transform of the PV-PI controller;

when operating in the grid connected mode:
setting a frequency of the duty cycle signal to match the utility grid frequency;
controlling the second DC-AC voltage source converter in a decoupled D-Q current control mode at the utility grid frequency with a unity power factor to provide a portion of the first real power to the plurality of loads;
then, when operating in the island mode:
setting the frequency of the duty cycle signal to match the reference frequency; and
controlling the second DC-AC voltage source converter in a decoupled d-q current control mode at the reference frequency with a unity power factor to provide the fourth real power to the plurality of loads.

12. The method of claim 11, further comprising:
transmitting, by the diesel generator controller, a set of photovoltaic array voltage reference control signals, $m_D$, and $m_Q$, to the second DC-AC voltage source converter, wherein $m_D$ regulates the DC voltage and the active power, and $m_Q$ regulates the AC voltage.

13. A system for synchronization of a utility grid and a microgrid, comprising:
a utility grid including a grid side controller, wherein the utility grid is configured to operate at a utility grid voltage, a utility grid frequency and a utility grid phase angle;
a grid side converter configured to transmit the utility grid voltage, the utility grid frequency and the utility grid phase angle to the microgrid;
a diesel generator located in the microgrid in parallel with the utility grid;
a diesel generator controller connected to the diesel generator, wherein the diesel generator controller is configured to calculate a power reference from the utility grid voltage and store the utility grid voltage, the utility grid frequency, and the power reference;
a wind turbine located in the microgrid in parallel with the utility grid;
a photovoltaic array located in the microgrid in parallel with the utility grid;
a point of common coupling switchably connected between the utility grid and the microgrid;
a synchro check relay connected to the point of common coupling;
a switched capacitor bank connected between the synchro check relay and the microgrid;
a plurality of loads connected to the microgrid;
wherein, when operating in a grid connected mode:
the microgrid is configured to match a microgrid voltage, a microgrid frequency and a microgrid phase angle to the utility grid voltage, the utility grid frequency and the utility grid phase angle respectfully, generate at least one of a first real power and a first reactive power, and transmit the at least one of a first real power and a reactive power to each of the plurality of loads;
wherein the diesel generator is configured to operate in a speed droop mode;
wherein, when operating in an island mode:
the diesel generator controller is configured to provide the stored utility grid frequency and power reference to the diesel generator;
the diesel generator is configured to operate at a constant angular speed to generate a second real and reactive power at a diesel generator frequency, which matches the stored power reference and stored utility grid frequency respectively;
the diesel generator controller is configured to transmit the stored utility grid voltage and the diesel generator frequency as a wind turbine reference voltage and a wind turbine reference frequency respectively to the wind turbine and to transmit the stored utility grid voltage and diesel generator frequency to the photovoltaic array as a photovoltaic array reference voltage and photovoltaic array reference frequency respectively;
wherein the diesel generator, the wind turbine and the photovoltaic array are configured to generate at least one of a first real power and a reactive power and transmit at least one of the first real power and the reactive power to each of the plurality of loads;
wherein, when operating in a resynchronization mode:
the switched capacitor bank is configured to be charged by the first real power produced by the microgrid;
the diesel generator controller is configured to actuate a plurality of switches of the switched capacitor bank to adjust the reactive power such that the microgrid voltage, the microgrid frequency and the microgrid phase angle match the utility grid voltage, the utility grid frequency and the utility grid phase angle; and
the synchro check relay is configured to actuate the switch to connect the microgrid to the utility grid.

14. The system of claim 13, further comprising:
an AC-AC voltage source converter connected to the diesel generator;
a first DC-AC voltage source converter connected to the wind turbine; and a second DC-AC voltage source converter connected to the photovoltaic array,
wherein each of the AC-AC voltage source converter, the first DC-AC voltage source converter and the second DC-AC voltage source converter are connected to the point of common coupling.

15. The system of claim 14, further comprising in the grid connected mode:
a proportional integral (SG-PI) speed governor controller electrically connected to the diesel generator, wherein the proportional integral (SG-PI) speed governor controller is configured to:
subtract a shaft frequency of the diesel generator from a reference shaft frequency,
generate a power value,
divide the power value by a droop reference value, and
generate a power signal by dividing the power value by a speed droop reference value;
wherein the diesel generator controller comprises:
a subtractor configured to subtract the power signal from the power reference signal to generate a power error signal;
an amplifier circuit configured to receive the power reference, compare the power reference to the real and reactive power to calculate a power error signal, and generate a shaft frequency signal based on the power error signal; and
a delay circuit configured to delay the shaft frequency signal.

16. The system of claim 14, wherein in the island mode, the diesel generator controller comprises:
an amplifier circuit configured to receive the power reference, compare the power reference to the real and reactive power to calculate a power error signal, and generate a shaft frequency signal based on the power error signal;
a delay circuit configured to delay the shaft frequency signal;
a divider configured to divide the delayed shaft frequency signal by the utility grid frequency and generate a torque signal and transmit the torque signal to the diesel generator; and
wherein the diesel generator is configured to use the torque signal to generate a second real power and the reactive power.

17. The system of claim 14, further comprising:
a doubly fed induction generator, DFIG, connected to the wind turbine;
a transformer connected to a stator of the wind turbine;
a rotor side converter connected to a rotor of the wind turbine;
a capacitor connected in parallel with the rotor side converter;
a grid side converter connected in parallel with the capacitor;
a resistor and an inductor connected in series between the grid side converter and the transformer; wherein the transformer is connected to the first DC-AC voltage source converter;
wherein, when operating in the grid connected mode, the grid side converter is configured to operate in a decoupled D-Q current control mode at the utility grid frequency with a unity power factor to provide a third real power to the plurality of loads; and
wherein, when operating in the island mode, the doubly fed induction generator is configured to operate in a constant P-Q control mode at the wind turbine reference frequency with a unity power factor to provide the third real power to the plurality of loads.

18. The system of claim 14, further comprising:
wherein the photovoltaic, PV, array, is configured to generate a voltage, $V_{PV}$, and a current, $I_{PV}$;
an MPPT circuit connected to the PV array, wherein the MPPT circuit is configured to receive the voltage, $V_{PV}$, the current, $I_{PV}$, and the photovoltaic array reference voltage, and compare the photovoltaic array reference voltage to the voltage, $V_{PV}$ to generate a voltage error signal;
a photographic array proportional integral, PV-PI, controller connected to the MPPT circuit, wherein the PV-PI controller is configured to generate a duty cycle signal;
a DC-DC buck converter connected to the PV array and the PV-PI controller, wherein the buck converter is configured to receive the voltage, $V_{PV}$, the current, $I_{PV}$ from the PV array and the duty cycle signal from the PV-PI controller and generate a DC voltage;
wherein the DC-DC buck converter is connected to the second DC-AC voltage source converter, wherein the second DC-AC voltage source converter is configured to convert the DC voltage to a three phase voltage, wherein each phase has a magnitude of the DC voltage at the duty cycle frequency.

19. The system of claim 14, further comprising:
wherein the PV-PI controller, is configured to calculate the duty cycle signal based on $$\text{Duty} = (V_{ref} - V_{PV}) \cdot \left(k_P + \frac{k_I}{s}\right),$$

where $k_p$ is a proportional constant of the PV-PI controller, $k_I$ is an integral constant of the PI controller, and s is an output variable of a Laplace transform of an integral controller;
wherein, when operating in the grid connected mode:
the PV-PI controller is configured to set a frequency of the duty cycle signal to match the utility grid frequency; and
second DC-AC voltage source converter is configured to use a decoupled d-q current control mode at the frequency of the duty cycle with a unity power factor to provide a fourth real power to the plurality of loads;
wherein, when operating in the island mode;
the PV-PI controller is configured to set a frequency of the duty cycle signal to match the photovoltaic array reference frequency; and
the second DC-AC voltage source converter is configured to use a decoupled d-q current control mode at the photovoltaic array reference frequency with a unity power factor to provide the fourth real power to the plurality of loads.

20. A method for synchronizing a utility grid and a microgrid, comprising:
when operating the utility grid and the microgrid in a grid connected mode:
controlling the microgrid at a utility grid voltage, a utility grid frequency and a utility grid phase angle;
generating, by a diesel generator of the microgrid, a preset reference power at the utility grid frequency by controlling a speed of a diesel generator in a speed droop mode;

providing, by the utility grid and the microgrid, at least one of a first real power and a reactive power to each of a plurality of loads;
then, when operating the microgrid in an island mode:
  operating the diesel generator at a constant speed based on the utility grid frequency to output a second real power and the reactive power at a reference frequency;
  operating the wind turbine in a decoupled d-q mode at the reference frequency with unity power factor to generate a third real power;
  generating, by a photovoltaic array, a fourth real power;
  providing the reactive power, the second real power, the third real power and the fourth real power to the plurality of loads;
then, when operating the utility grid and the microgrid in a resynchronization mode: charging a switched capacitor bank connected to the point of common coupling with the second real power, the third real power and the fourth real power; and
actuating, by a synchro check relay connected to the point of common coupling, a switch to connect the microgrid to the utility grid.

\* \* \* \* \*